(12) United States Patent
Rand et al.

(10) Patent No.: US 12,738,723 B2
(45) Date of Patent: Sep. 15, 2026

(54) EXTENSION MEMBERS AND METHODS OF USE

(71) Applicant: Affordable Wire Management, LLC, Bedminster, NJ (US)

(72) Inventors: Scott Robert Rand, Bedminster, NJ (US); Daniel Robert Smith, Chandler, AZ (US); Peter Mark Hruby, Scottsdale, AZ (US)

(73) Assignee: Affordable Wire Management, LLC, Bedminster, NJ (US)

( * ) Notice: Subject to any disclaimer, the term of this patent is extended or adjusted under 35 U.S.C. 154(b) by 21 days.

(21) Appl. No.: 18/850,365

(22) PCT Filed: Mar. 24, 2023

(86) PCT No.: PCT/US2023/064942
§ 371 (c)(1),
(2) Date: Sep. 24, 2024

(87) PCT Pub. No.: WO2023/183928
PCT Pub. Date: Sep. 28, 2023

(65) Prior Publication Data

US 2025/0219378 A1 Jul. 3, 2025

Related U.S. Application Data

(60) Provisional application No. 63/269,942, filed on Mar. 25, 2022.

(51) Int. Cl.
*H02G 7/05* (2006.01)

(52) U.S. Cl.
CPC .................................. *H02G 7/053* (2013.01)

(58) Field of Classification Search
CPC ......... H02G 7/053; H02G 3/32; H02G 3/0456
USPC ............................................... 248/74.2, 68.1
See application file for complete search history.

(56) References Cited

U.S. PATENT DOCUMENTS 3,559,910 A * 2/1971 Babb ........................ F16L 3/14 248/59
3,923,277 A * 12/1975 Perrault .................... F16L 3/00 211/208
5,445,348 A * 8/1995 Caldwell ................. F16L 3/243 174/149 R
6,459,233 B1 * 10/2002 Liang .................... H02J 7/0045 320/105

(Continued)

FOREIGN PATENT DOCUMENTS

FR 2885671 A1 11/2006
WO 2023183928 A2 9/2023

*Primary Examiner* — Bradley Duckworth
(74) *Attorney, Agent, or Firm* — Mintz, Levin, Cohn, Ferris, Glovsky and Popeo, P.C. US

(57) ABSTRACT

The extension member described herein includes a cost-effective and labor-efficient design for large-scale deployment in energy generation and transmission infrastructures. An extension member is provided, and includes a body extending between a proximal end and a distal end. A cable clamp can be positioned on the distal end of the body, where the cable clamp can include a channel configured to selectively receive a cable. A fastener body can be positioned at the proximal end of the body and can be configured to couple the body to a support structure.

22 Claims, 54 Drawing Sheets

(56) References Cited

U.S. PATENT DOCUMENTS

| | | | | |
|---|---|---|---|---|
| 6,883,761 | B2 * | 4/2005 | Boon | F16L 3/237 248/74.1 |
| 7,025,309 | B2 * | 4/2006 | Goodwin | F16L 3/13 248/62 |
| 8,840,071 | B2 * | 9/2014 | Oh | F16L 3/1075 248/65 |
| 10,177,551 | B1 * | 1/2019 | Smith | H02G 7/22 |
| 10,548,644 | B2 * | 2/2020 | George | A61B 17/7053 |
| 11,349,291 | B2 * | 5/2022 | Smith | H02G 3/30 |
| 11,979,008 | B2 * | 5/2024 | Rand | F16L 3/06 |
| 12,074,417 | B2 * | 8/2024 | Rand | F16L 3/06 |
| 12,294,206 | B2 * | 5/2025 | Rand | H02G 3/30 |
| 2005/0184202 | A1 | 8/2005 | Cox et al. | |
| 2006/0249633 | A1 | 11/2006 | Korczak et al. | |
| 2014/0270677 | A1 * | 9/2014 | Sievers | G02B 6/4471 385/136 |
| 2019/0210539 | A1 * | 7/2019 | Rouleau | B60R 9/0485 |
| 2019/0234531 | A1 * | 8/2019 | Brouwer | F16L 3/23 |
| 2019/0379187 | A1 | 12/2019 | Christensen et al. | |
| 2022/0359102 | A1 * | 11/2022 | Michael | H02G 3/0456 |

* cited by examiner 514
514
518
114
512
503
506
512
507
507
504

EXTENSION MEMBERS AND METHODS OF USE

CROSS-REFERENCE TO RELATED APPLICATIONS

The present application claims priority under 35 U.S.C. 371 to PCT Application No. PCT/US2023/064942, filed on Mar. 24, 2023 and entitled "EXTENSION MEMBERS AND METHODS OF USE,", which claims priority under 35 U.S.C. § 119(e) to U.S. Provisional Patent Application No. 63/269,942, entitled "SOLAR HEX ROD EXTENSION MEMBER," filed on Mar. 25, 2022, the entire contents of which are hereby expressly incorporated by reference herein in their entirety.

FIELD

The present application generally relates to cable hangers, and more specifically, to Utility-Scale Solar Power Generation cable hangers with extension members.

BACKGROUND

Energy production and transmission infrastructures utilize a number of cable types to convey electrical current, and/or signal data from source facilities to consumer locations. In large-scale solar power plants, cables can convey electrical current and signal data from solar panels to other production and/or transmission equipment within the plant. The cables can be arranged in underground or above-ground configurations. Above-ground cable configurations can require cables to be supported in the air in a secure and safe manner, which is capable of withstanding harsh environmental conditions, as well as eliminating the possibility of cables coming in contact with edges of the metal structures typically found on large-scale solar power plants. In some regions, the cost of labor to install the cables and cable-supporting hardware is greater than the material cost of the cables and cable-supporting hardware and so above-ground cable configurations can require cables and cable-supporting hardware to be installed quickly to meet demanding project deadlines and labor budgets.

SUMMARY

Extension members and methods of use are provided.

In an aspect, an extension member is provided. The extension member can include a body extending between a proximal end and a distal end. A cable clamp can be positioned on the distal end of the body, where the cable clamp includes a channel configured to selectively receive a cable. A fastener body can be positioned at the proximal end of the body and can be configured to couple the body to a support structure.

The cable clamp can have a variety of configurations for inserting and retaining cables therein. For example, in some aspects, the cable clamp can be configured to allow movement of the cable within the channel in a horizontal plane parallel to the body. In some aspects, the cable clamp can be configured to allow the cable to be rigidly coupled within the channel at a plurality of angles relative to the width of the body within a horizontal plane parallel to the body. In other aspects, the cable clamp can include at least one projection configured to deform and at least partially encompass the cable within the channel. In certain aspects, the cable can be configured to move relative to the cable clamp while positioned within the channel. In some aspects, the cable clamp can be integral with the body. In other aspects, the cable clamp can be selectively removable from the body. In some aspects, the cable clamp can further include an internally threaded hole positioned adjacent the channel and can be configured to receive a setscrew, where the setscrew is configured to couple the cable within the channel.

In some aspects, the fastener body can be a projection extending from the proximal end of the body and positioned within an aperture of the support structure. In other aspects, the fastener body can be an aperture extending into the proximal end of the body and configured to receive a fastener body extending from the support structure.

In some aspects, the extension member can further include at least one mounting aperture positioned on the body between the distal end and the proximal end.

The body can have a variety of configurations for coupling to a support structure. For example, in some aspects, the body can be formed from the same material as the cable arranged within the channel. In other aspects, a cable tensioning member can be configured to be selectively positioned on the body. In certain aspects, the body can include a curved surface configured to abut against the cable positioned within the channel.

In another aspect, a method is provided that includes positioning a body on a support structure via a fastener body arranged on the support structure or on a proximal end of the body. A cable can be positioned within a channel formed by a cable clamp positioned on a distal end of the body through a gap in the cable clamp. A projection of the cable clamp can be deformed such that the cable is at least partially encompassed by the projection within the channel, thereby securing the cable within the channel.

In some aspects, the deforming of the projection can further include deforming the projection to an installation position such that the gap is reduced to a value smaller than the diameter of the cable positioned within the channel, wherein the cable is configured to move relative to the body, and deforming the projection to a locked position, wherein the projection contacts the cable.

In some aspects, the method can further include moving the cable relative to the body after securing of the cable within the channel.

In some aspects, the method can further include reducing the length of the body. In certain aspects, reducing the length of the body can include removing a portion of the body.

In an aspect, an extension member is provided and includes a body having a distal end, a proximal end, and an aperture extending therebetween along at least a portion of the body. A channel can be positioned on the distal end of the body and configured to receive a cable therein. At least one projection can extend from the distal end of the body, the projection configured to deform and at least partially encompass the cable within the channel. An internally threaded hole can be positioned on the proximal end of the body and configured to receive a threaded body extending from a support structure.

In some aspects, the extension member can further include at least one mounting aperture positioned on the body between the distal end and the proximal end.

In some aspects, the cable can be configured to be rigidly coupled within the channel at a plurality of angles relative to the width of the body within a horizontal plane parallel to the body.

In an aspect, an extension member is provided and can include a body extending between a proximal end and a distal end. A first cable clamp can be positioned on the distal end of the body, where the cable clamp includes a first channel configured to selectively receive a first cable. A second cable clamp can be positioned on the proximal end of the body, where the cable clamp includes a second channel configured to selectively receive a second cable. At least one mounting aperture can be positioned on the body between the distal end and the proximal end, the mounting aperture can be configured to receive a projection extending from a support structure to secure the body to the support structure.

In some aspects, each of the first cable clamp and the second cable clamp can further include a projection configured to deform relative to the body. In other aspects, each of the first cable clamp and the second cable clamp can further include an internally threaded hole positioned adjacent the channel and configured to receive a setscrew, where the setscrew is configured to couple the cable within the channel.

BRIEF DESCRIPTION OF THE DRAWINGS

These and other features will be more readily understood from the following detailed description taken in conjunction with the accompanying drawings, in which.

DETAILED DESCRIPTION

Figures 1, 2:
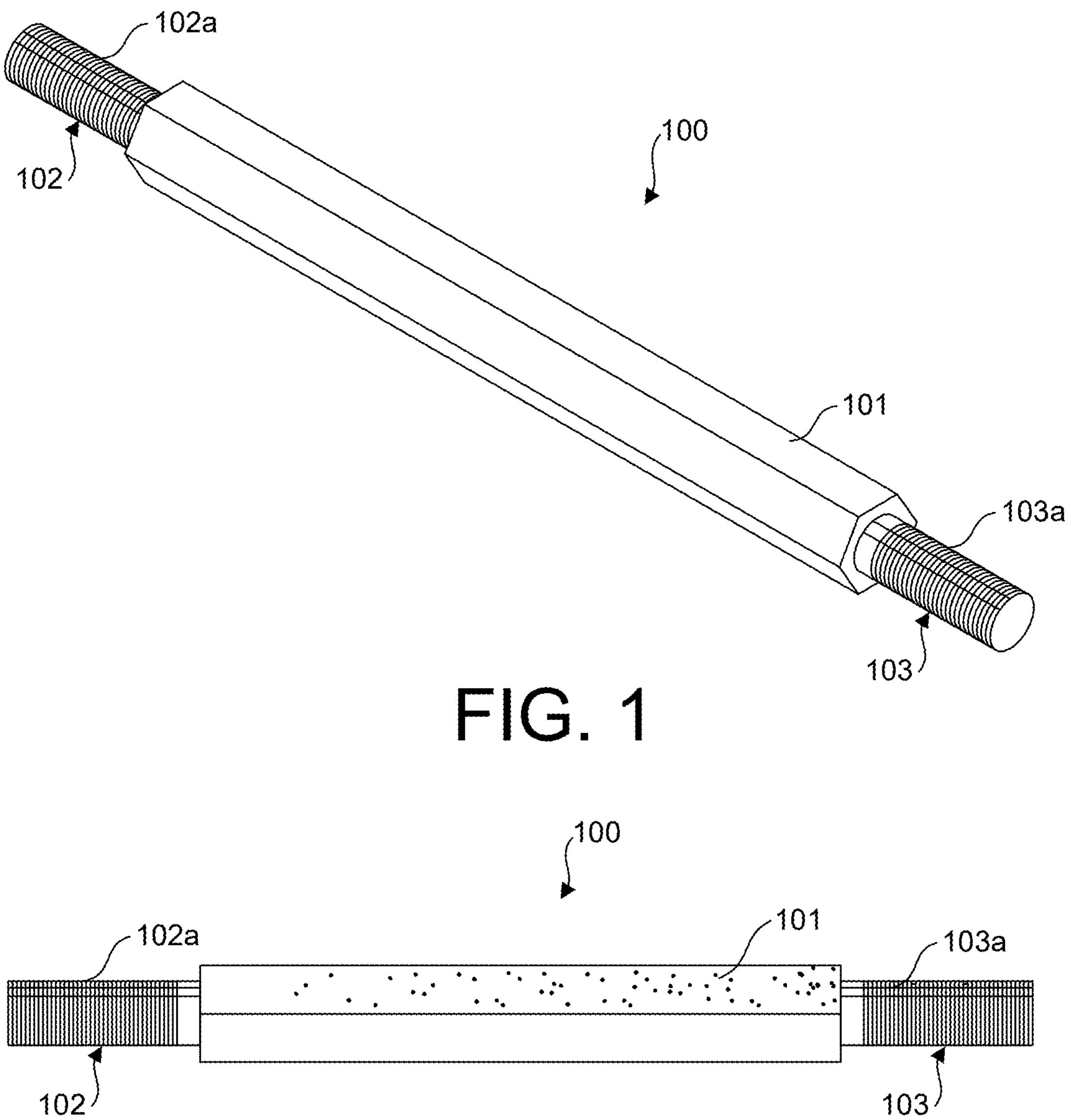
FIG. 1 is a perspective view of one aspect of an extension member.
FIG. 2 is a side view of the extension member of FIG. 1.

Certain exemplary aspects will now be described to provide an overall understanding of the principles of the structure, function, manufacture, and use of the devices and methods disclosed herein. One or more examples of these aspects are illustrated in the accompanying drawings. Those skilled in the art will understand that the devices and methods specifically described herein and illustrated in the accompanying drawings are non-limiting exemplary aspects and that the scope of the present invention is defined solely by the claims. The features illustrated or described in connection with one exemplary aspect may be combined with the features of other aspects. Such modifications and variations are intended to be included within the scope of the present invention.

Energy production and transmission infrastructures utilize a number of cable types to convey electrical current, signal data, and grounding paths from source facilities to consumer locations. In large-scale solar power plants, cables can convey electrical current, signal data, and ground paths from solar panels to other production and/or transmission equipment within the plant. Additionally, conventional solar panels are often attached to a single-axis solar tracker, which rotates the solar panel from East to West throughout the day such that the solar panels follow the sun, maximizing their energy output. The cables to those solar panels can be arranged in underground or aboveground configurations.

The aboveground cable configurations, such as those used in utility-scale solar power generation and transmission systems, can be deployed and managed using a messenger cable and a cable hanger system. The cable hanger can support the cables, such as power cables, in an organized and serviceable manner. A cable hanger can couple to support structures, such as a messenger cable, which is typically a stranded wire rope that is used to mechanically support the cable hangers and cables. The messenger cable can be routed between solar trackers, posts, columns, or other vertically oriented components located throughout an electrically connected grid to convey the cables from one location to another. When the messenger cable is coupled to the solar tracker, this creates scenarios where the rotating solar panels and tracker components can cause the cabling to contact and rub on the sheet steel components of the solar tracker or on the solar panels, creating pinching and abrasion conditions on the cable, which can lead to electrical shock hazards due to the outer layer of the cable wearing through. In addition, windy conditions typically found on large-scale solar power plants can cause the cables, hangers, and messenger cable to sway potentially rubbing and abrading on the vertically oriented components located on the power plant. In order to prevent such a scenario, an extension member can be used to support the messenger cable support system and the cabling far enough away from the moving components such that contact will not occur with the cabling.

The large-scale solar power plant messenger cable extension members disclosed herein are commonly an assembly consisting of a clamping member configured to secure and couple the messenger cable to the extension member, an extension member configured to extend the clamping member from vertically orientated components, a bolting member used to secure and couple the extension member to the vertically oriented components with the use of a internally-threaded nut. It is advantageous to combine the extension member and bolting member of a cable extension devices in order to increase the installation efficiency of the cable extension devices. Using a single component rather than two separate components provides labor benefits during field use, for example, because installing a single device is faster than installing two separate devices. In addition, a single component can be advantageous over the current method of using two separate components due to less material use, and thus a more cost-effective solution compared to two separate components.

Aspects of an extension member described herein combine an extension member and bolting member into a singular component. This is advantageous to the solar construction and installation companies since a singular component is less material and cost than two separate components. The singular-component aspect of the extension member will result in less material and components on the solar power plant than traditional extension devices, which is easier to manage and keep track of during the construction phase of a solar power plant, which saves the solar construction and installation companies time and money. An additional benefit is that the singular-component aspect of the extension member will result in few shipping boxes than traditional extension devices, which is easier to manage and keep track of during the construction phase of a solar power, which saves the solar construction and installation companies time and money. Also, the singular-component aspect of the extension member results in less parts for an installer to carry around a large-scale solar plant, thus increasing installer productivity as there is less weight to carry and less parts to manage. By being made of a single component, the extension member disclosed herein results in fewer lost parts as small components, such as the bolting member, can easily be dropped and lost in dirt, tall grass, or snow typically found on large-scale solar power plants. In addition, the singular-component aspect of the extension member results in fewer components that need to be installed which is faster for the installer than traditional extension devices, which saves the solar construction and installation companies time and money. Additionally, the singular-component aspect of the extension member results in fewer components that need to be inspected for quality, which saves the solar construction and installation companies time and money.

Extension members disclosed herein are configured to be coupled with every vertically oriented component that is near where cabling is deployed and routed along an array of solar panel infrastructure. On large-scale solar plants, this can result in tens of thousands of extension devices needing to be installed, so solar construction and installation companies are constantly developing methods to reduce the time it takes to install extension devices found on large-scale solar power plants. The benefits of the extension members described above reduce the time it takes to install extension devices found on large-scale solar power plants.

Extension members can have various implementations, which is used to extend a messenger cable. Implementations of an extension member disclosed herein can include a body extending between a proximal end and a distal end, a cable clamp positioned on the distal end of the body, where the cable clamp includes a channel configured to selectively receive a cable, and a fastener body positioned at the proximal end of the body and configured to couple the body to a support structure. In some implementations, the body that vary in size and length.

An exemplary aspect of an extension member 100 is depicted in FIGS. 1-4. The extension member 100 can be configured for us as a large-scale solar power plant messenger cable extension device that combines the extension member and bolting member into a singular component. Additionally, the extension member 100 can be known as a Solar Hex Rod. The extension member 100 is configured to secure a messenger cable clamp on vertically oriented components across a large-scale solar plant, where an above-ground wire management system is deployed. The extension member 100 can be attached to the support structure that supports solar panels or moveable electrical components.

The extension member 100 incudes a hexagonal extension body 101, a first round body 102, and a second round body 103. The round body 102 and the round body 103 extend from opposite ends of the extension body 101. In an exemplary aspect, the round bodies 102, 103 are integral with the extension body 101. Additionally, the round bodies 102, 103 can be substantially similar such that the round bodies 102, 103 can be interchangeable with one another. Positioned on the round body 102 is a threaded surface **102*a*. Additionally, a threaded surface 103*a* is positioned on the round body 103. The threaded surface 102*a*, 103*a* are configured to allow a threaded nut or component to be fixedly coupled to the extension body 101. In an exemplary aspect, the extension body 101** can vary in size and length to accommodate site-specific mechanical loads and varying extension requirements.

In some aspects, the round bodies 102, 103 can vary in size and length to accommodate site-specific mechanical loads and varying thicknesses of vertically oriented components. Additionally, the threaded surfaces **102*a*, 103*a* can vary in thread type (e.g., height, pitch) to accommodate a specific threaded component being attached to the extension body 101. Even though the round bodies are depicted as including threaded surfaces, other forms of securement means can be used, such as deforming the round bodies 102, 103 to form a rivet. Additionally, different cross-sectional shapes (e.g., square, rectangle, triangle) for the round bodies 102, 103 can be used such than a torque can be transmitted along the extension body 101**.

The extension member 100 can be made from material that will not galvanically corrode with materials, such as a Galvanized Steel, Aluminum, or Copper Wire Rope Messenger Cable, or Steel Posts or Steel Structures that the Solar Hex Rod couples to, ensuring compliance with the galvanic corrosion and coating requirements of the Solar Safety Standard, UL2703. Additionally, the extension member 100 can be made from material that will last at least 35 years in an outdoor and UV-exposed environment.

In an exemplary aspect, the extension member 100 is manufactured as one single piece. The extension member 100 can be manufactured by a cold drawing process and then can be cut to the desired width, lathed, and rolled or cut with threads. In an exemplary aspect, the width across the hexagonal flats of the extension member 100 can be within a range of 0.375-1.5 inches, and preferably around 0.75 inches. The extension member 100 can be manufactured from material such as Grade 8 Steel coated with Zinc. However, various other materials can be used to form the extension member 100, and should be appreciated, such as other grades or alloys of steel, copper, zinc, bronze, aluminum, or plastics, or a combination of such materials.

Figure 3:
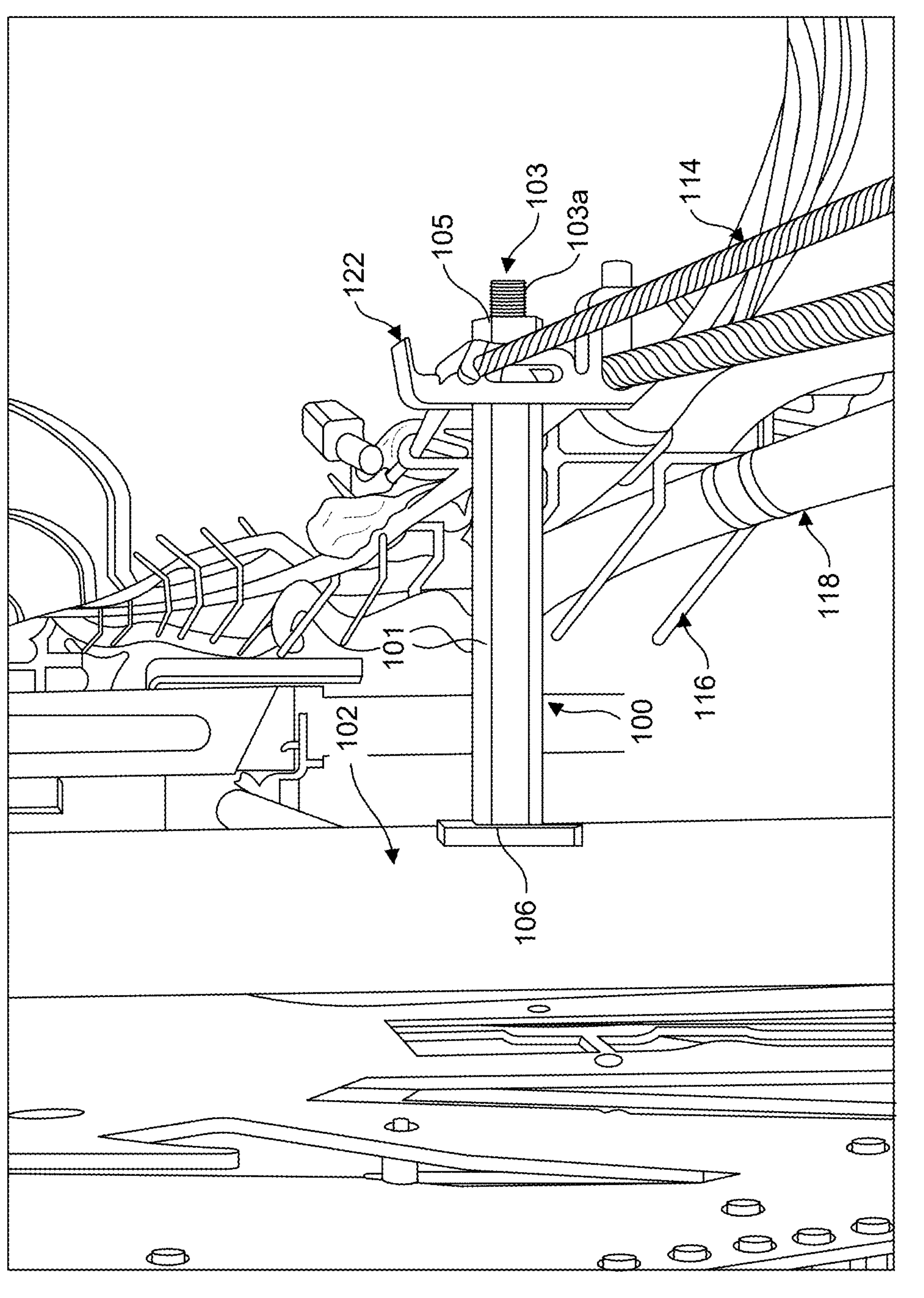
FIG. 3 is a perspective view of the extension member of FIG. 1 positioned on a support structure.

FIG. 3 depicts an extension member assembly, including an extension member 100 secured to a solar panel support structure 120. The extension member assembly includes a messenger cable clamp 122, a messenger cable 114, cable hangers 116, cabling 118, and the solar panel support structure 120. Even though the extension member assembly is depicted as including a messenger cable clamp 122, other forms of threaded and non-threaded components can be used in combination with the extension member 100. For example, a two-piece messenger cable clamp or ground cable clamps could be used. In some exemplary implementations, a cable hanger can also act as the messenger cable clamp, so the cable hanger would be attached directly to the extension member. In another exemplary implementation, a clamp could be used to support electrical enclosure/equipment off of a structure, so the enclosure/equipment would have a bore hole to secure it to the extension member.

In order to properly position the messenger cable clamp 122 to support the cabling 118, the extension member 100 is attached to the support structure 120 by the round body 102. In an exemplary aspect, the support structure 120 includes a threaded hole (not shown) integral with the support structure 120 which the threaded surface 102*a* engages with. Alternatively, the support structure 120 can include a smooth bore hole (not shown) which the round body 102 passes through, and a nut (not shown) is threaded onto the threaded surface 102*a* on the opposite side of the support structure 104 in order to secure the extension member 100 to the support structure 120 or a vertically oriented component. The extension member 100 and nut are torqued to a specified torque value that will securely couple the extension member 100 to the support structure 120 or a vertically oriented component. The specific torque value could be in the range of 50-55 ft-lbs (Foot-Pounds), but can vary depending on the type and size of the threads, such as being within the range of 30-100 ft-lbs. Additionally, a plate 106 can be positioned between the extension member 100 and the support structure 120 which the round body 102 passes through in order to provide support to the extension body 100 as it is secured to the support structure 120, similar to a washer on a bolt. Since the extension member 100 combines the extension member and bolting member into a singular component, the need for additional threaded bolt components to securely couple the extension device to the vertically oriented member is eliminated.

With the extension member 100 coupled to the support structure 120, the messenger cable clamp 122 is inserted onto the round 103. The messenger cable clamp 122 includes a through-bore (not shown) arranged therein to allow the round body 103 to pass through the messenger cable clamp 122. An internally threaded nut 105 is threaded onto the threaded surface 103*a* in order to couple the messenger cable clamp 122 to the extension member 100. In an exemplary aspect, the nut 105 is torqued to a specified torque value that will securely couple the messenger cable clamp 122 to the extension member 100, and could also be used to deform at least a portion of the messenger cable clamp 122 to secure a messenger wire 114 to the messenger cable clamp 122. The specific torque value could be in the range of 50-55 ft-lbs (Foot-Pounds), but can vary depending on the type and size of the threads, such as being within the range of 30-100 ft-lbs.

The extension member 100 can be configured to hold larger or smaller messenger cable clamps 122 depending on the requirements of a deployed usage. For example, the round thread bodies 102, 103 may decrease or increase in diameter. This is advantageous as various messenger cable clamps 122 with varying messenger cable clamp holes may be used depending on site specific requirements.

Figure 4:
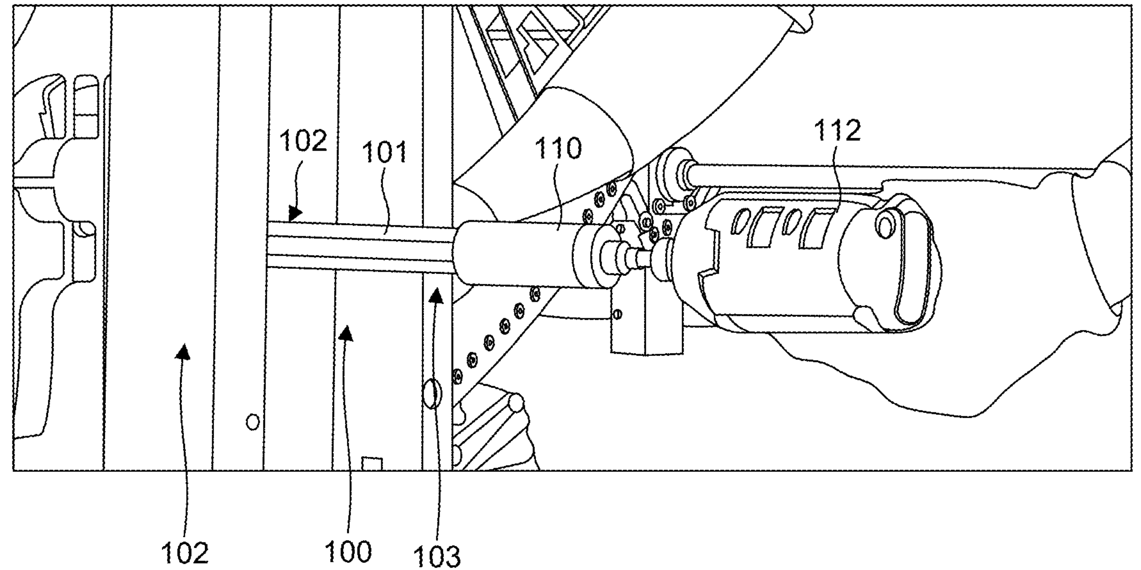
FIG. 4 is perspective view of the extension member of FIG. 3 being installed and coupled to a vertically oriented support structure.
Figures 5, 6:
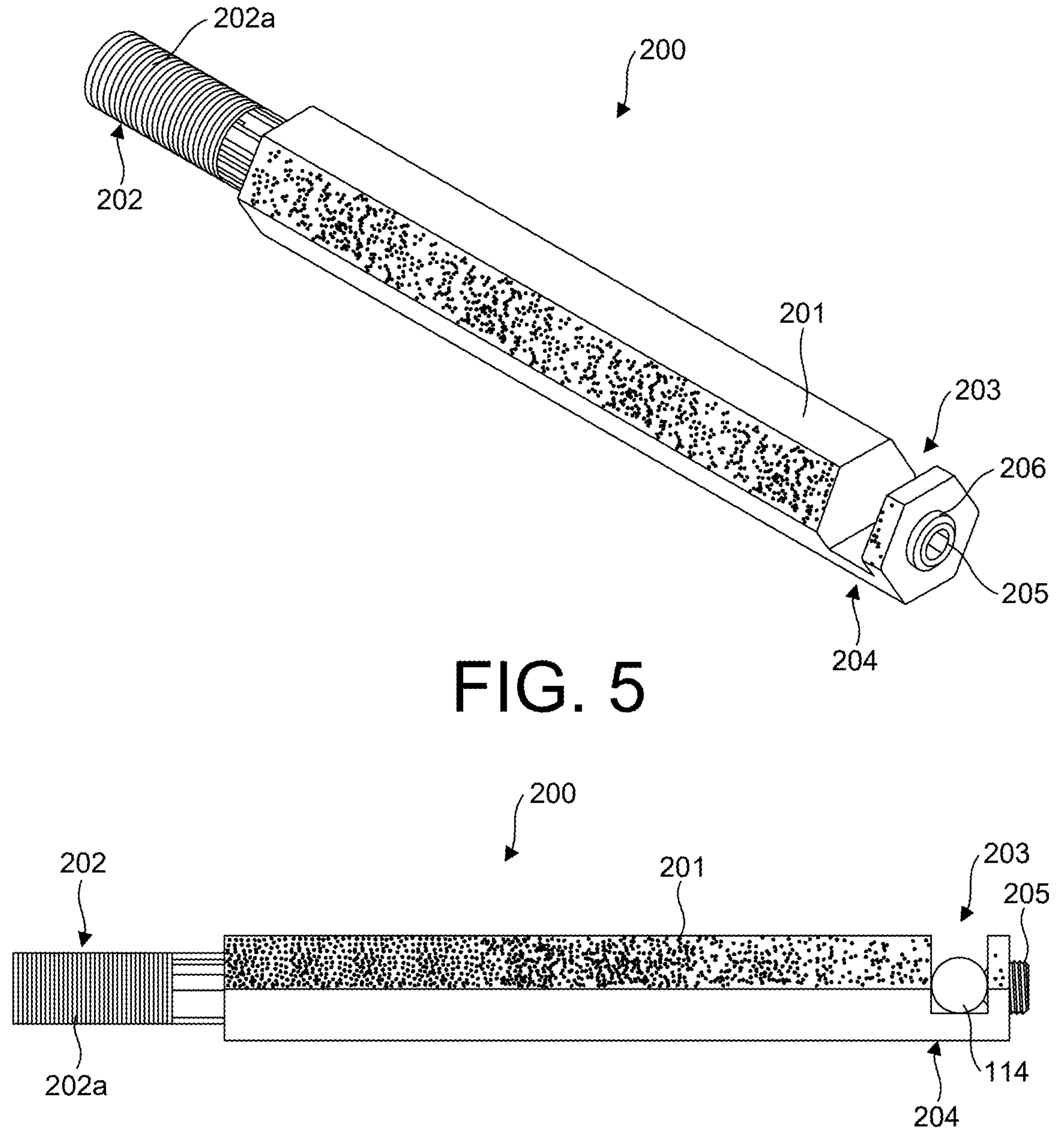
FIG. 5 is a perspective view of another aspect of an extension member.
FIG. 6 is a side view of the extension member of FIG. 5 having a messenger cable coupled therein.
Figure 7:
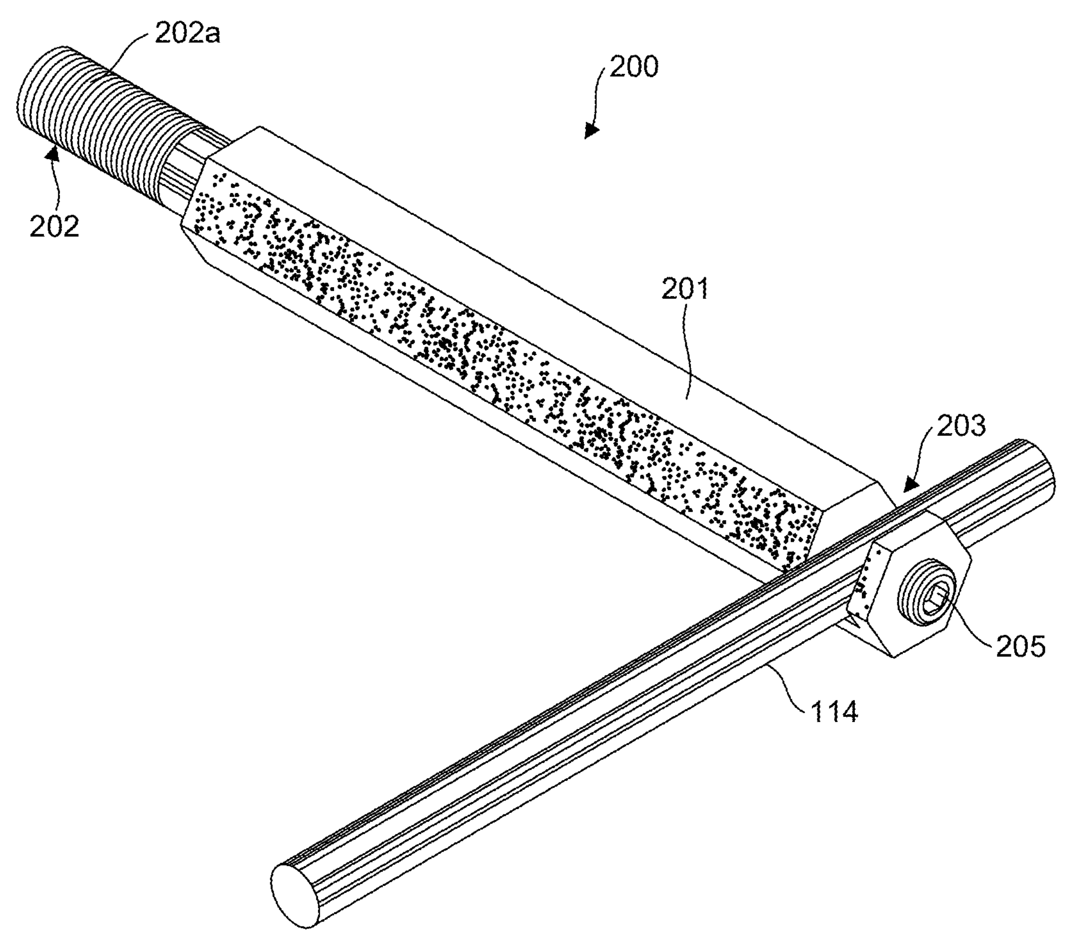
FIG. 7 is a perspective view of the extension member of FIG. 5 with a cable coupled thereto.
Figure 8:
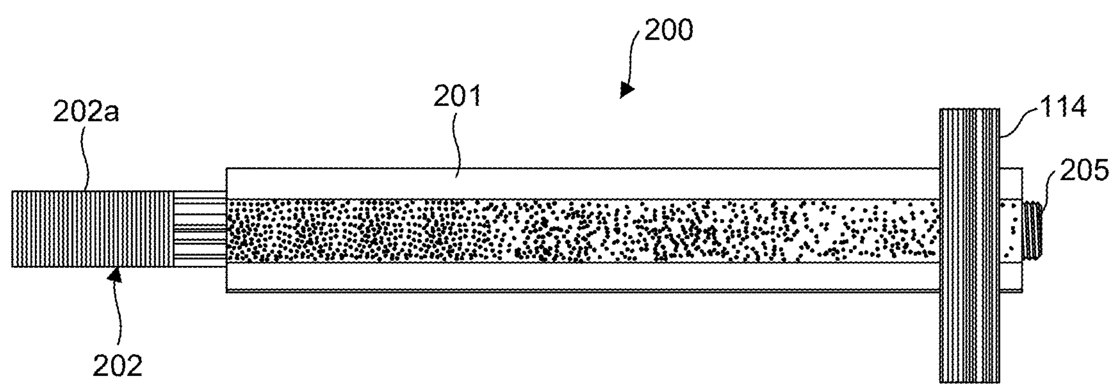
FIG. 8 is a top view of the extension member of FIG. 7.
Figure 9:
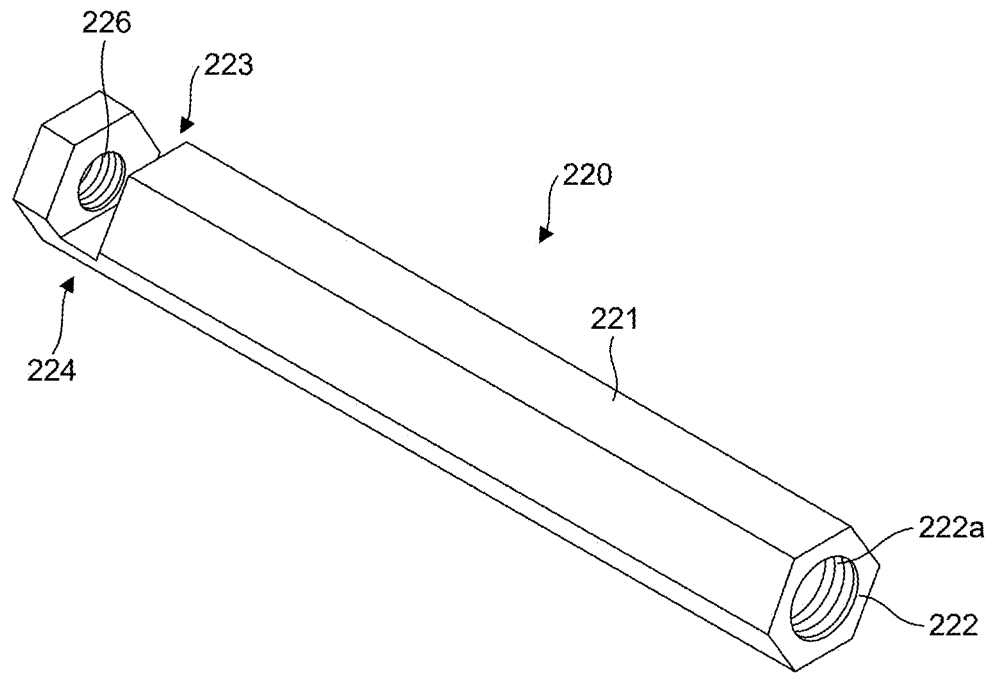
FIG. 9 is a perspective view of another aspect of an extension member.
Figure 10:
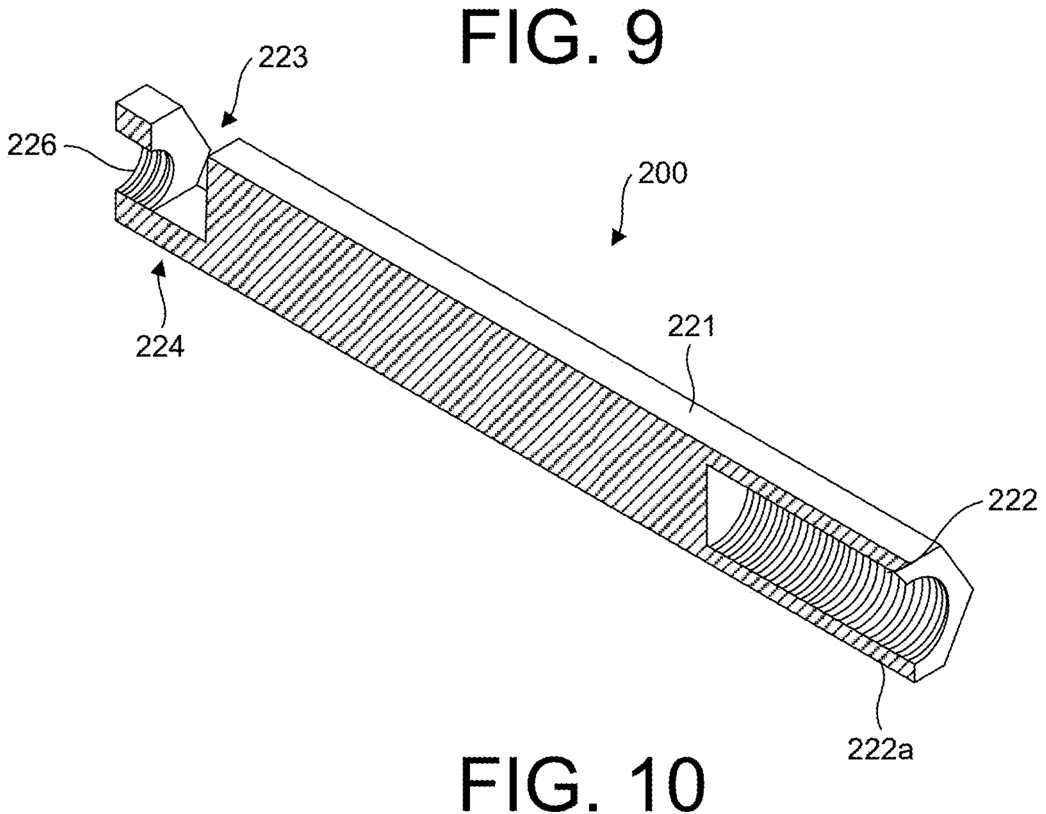
FIG. 10 is a cross-sectional perspective view of the extension member of FIG. 9.
Figure 11:
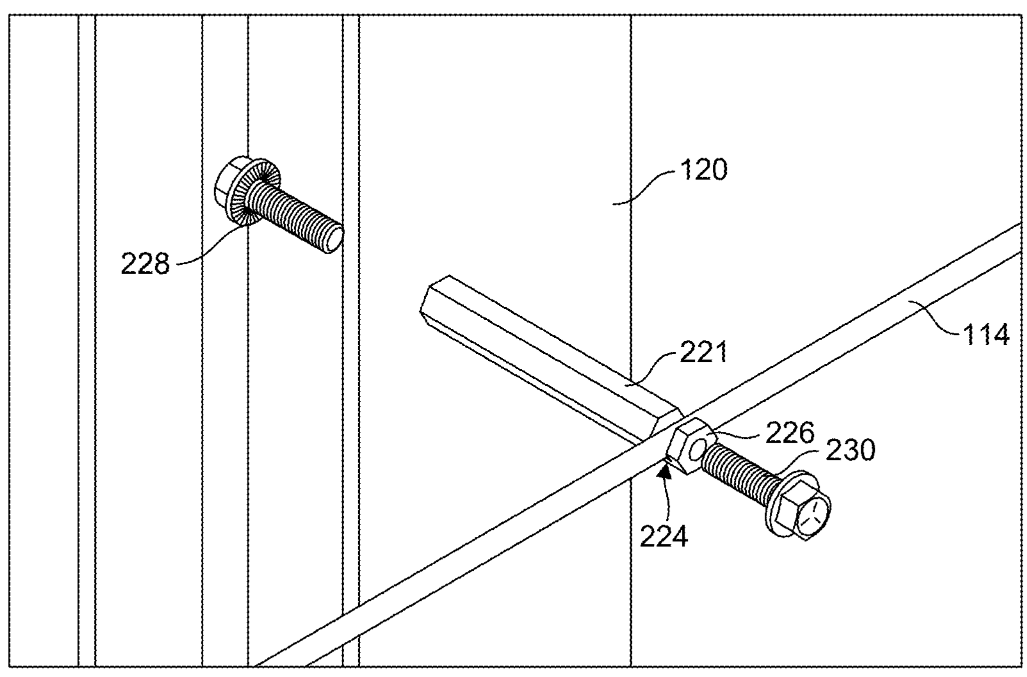
FIG. 11 is an exploded perspective view of the extension member of FIG. 9 positioned on a support structure.
Figure 12:
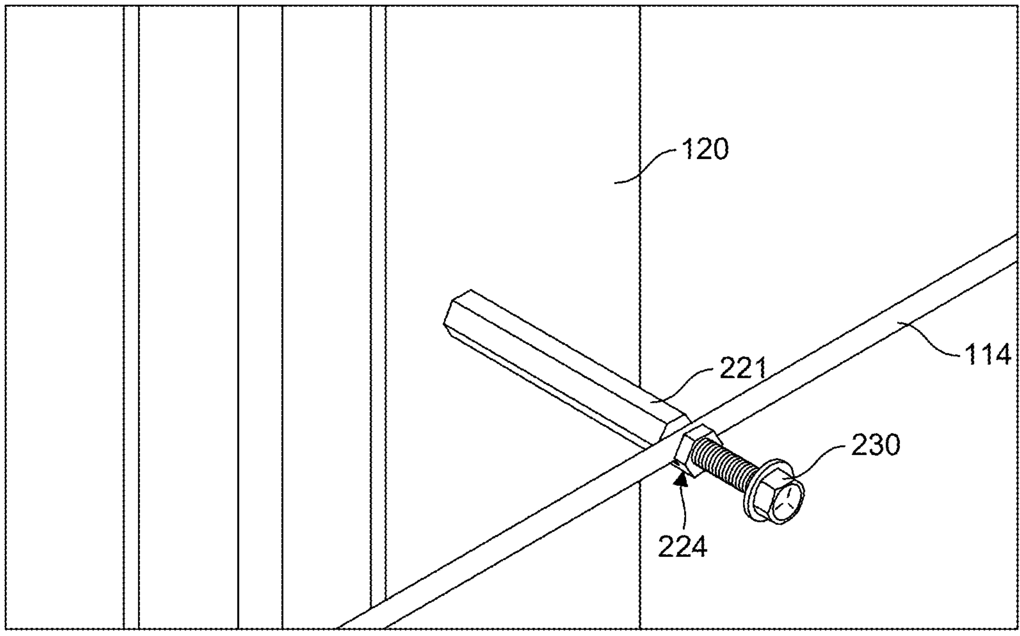
FIG. 12 is a perspective view of the extension member of FIG. 11 positioned on a support structure.
Figure 13:
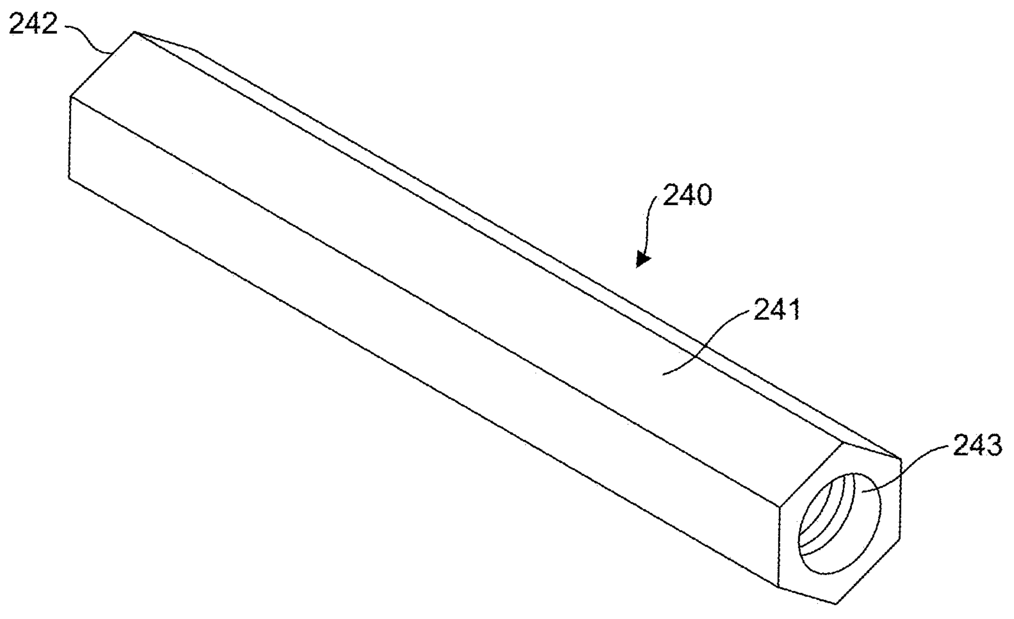
FIG. 13 is a perspective view of another aspect of an extension member.
Figure 14:
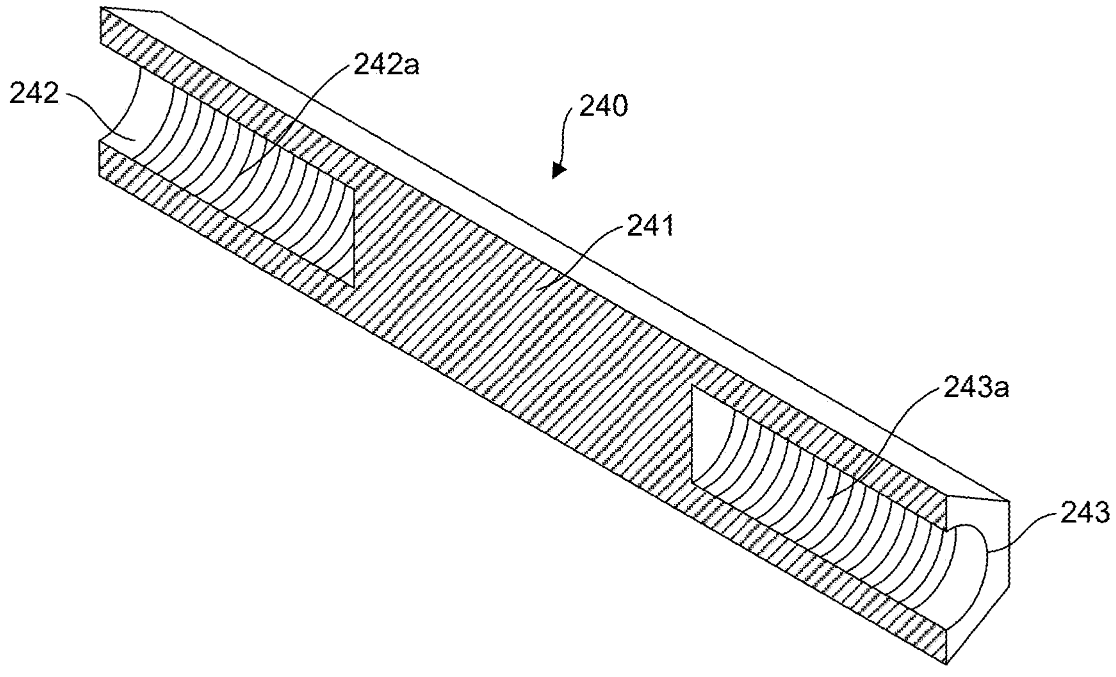
FIG. 14 is a cross-sectional perspective view of the extension member of FIG. 13.
Figure 15:
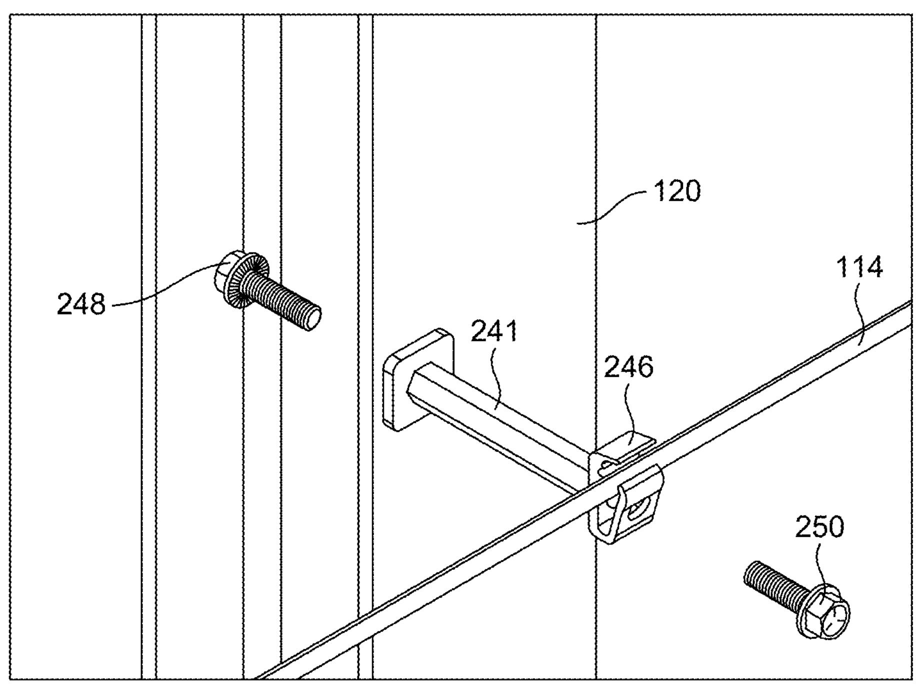
FIG. 15 is an exploded perspective view of the extension member of FIG. 13 positioned on a support structure.
Figure 16:
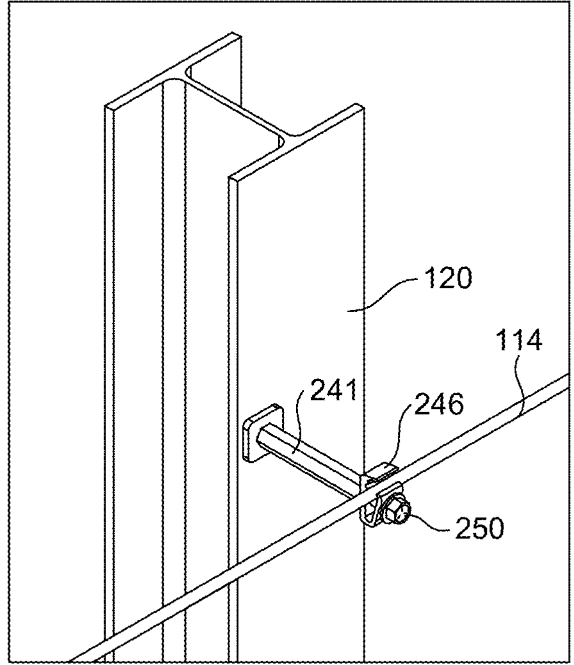
FIG. 16 is a perspective view of the extension member of FIG. 15 positioned on a support structure.
Figure 17:
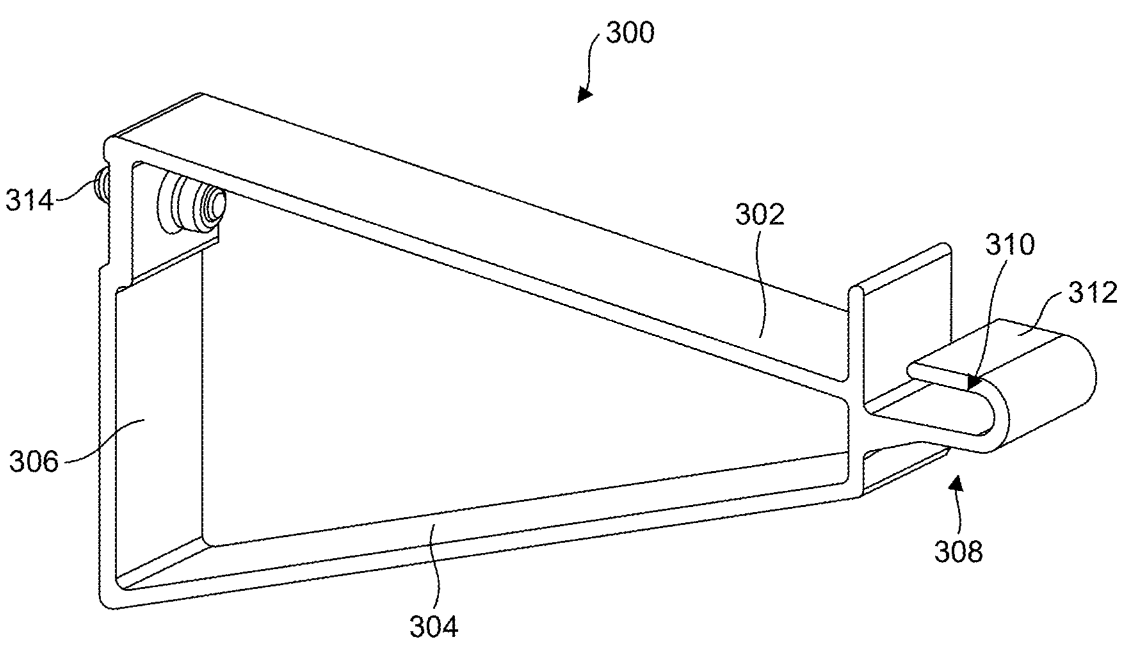
FIG. 17 is a perspective view of another aspect of an extension member.
Figure 18:
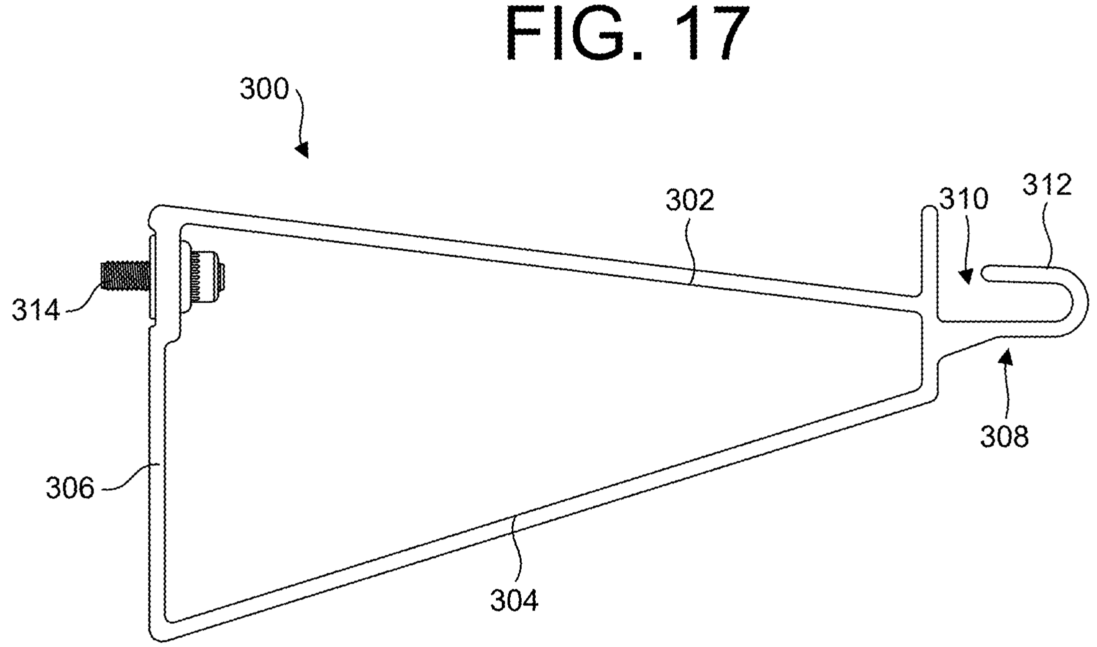
FIG. 18 is a side view of the extension member of FIG. 17.
Figure 19:
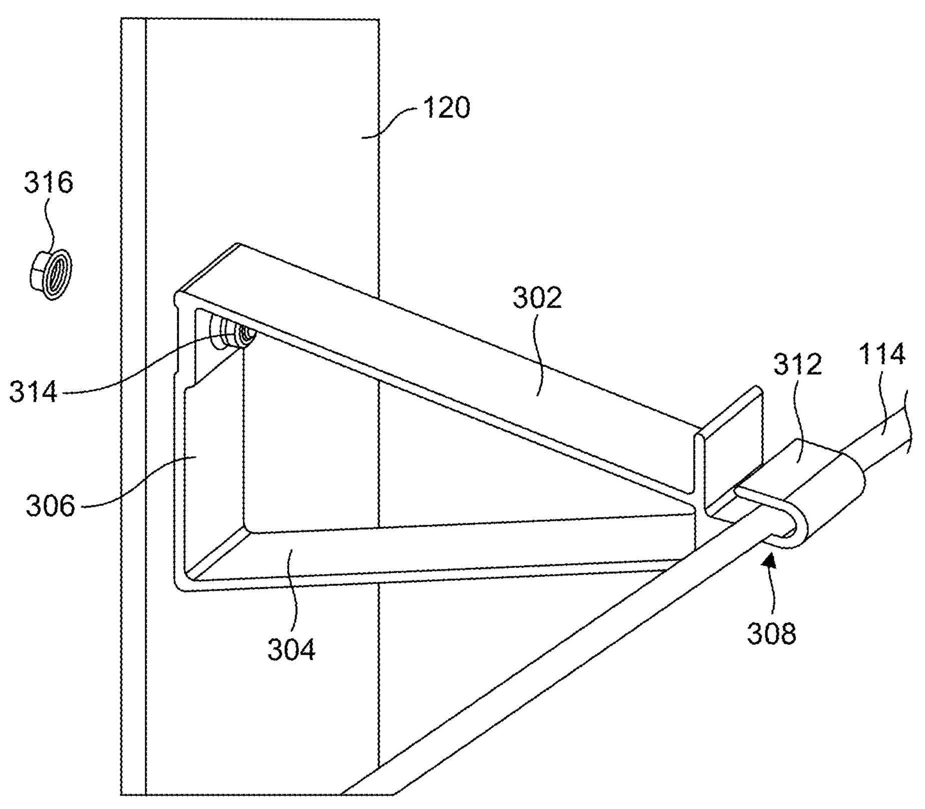
FIG. 19 is an exploded perspective view of the extension member of FIG. 17 positioned on a support structure.

As shown in FIGS. 3-4, the extension member 100 described herein includes features that eliminate need for a separate bolting member, which is advantageous to the current method of using a separate extension member and bolting member to couple the extension device to the solar panel support structure. As shown in FIG. 4, a socket 110 and a power tool 112 can be coupled directly to the hexagonal-shaped extension body 101 when securing and coupling the extension member 100 to the vertically oriented component or support structure 122. This allows for fast and simple installation of the extension member 100 without the need of a separate bolting member.

In the exemplary aspect depicted in FIG. 4, the hexagonal shape of the extension body 101 is advantageous to the installer since the hexagonal-shaped extension body 101 allows for the coupling of a standard torqueing socket 110 having the same socket size. Additionally, the socket size of the extension body 101 can be the same socket size as the internally threaded nut 105 configured to be secured to the round body 103. An example of a standard torqueing socket is a ¾" Socket Size, where the socket size would match the hexagonal width of the extension body 101, which can be within a range of 0.375-1.5 inches, and preferably 0.75 inches. Due to the similar socket size arrangement, an installer can use the same socket 110 and torque valve to couple the extension body 101 to a vertically oriented component or support structure 120 via the round body 102, and then couple as an internally threaded nut 105 to the round body 103 to secure a messenger cable clamp 122 to the extension member 100. This results in faster and easier installation of the extension device, which increases installation efficiency which saves a solar construction and installation company's time and money.

The extension member 100 can be configured to extend further or closer to the support structure 120 or vertically oriented component depending on the requirements of a deployed usage. For example, the extension body 101 may increase or decrease in length. This is advantageous as extension length requirements can vary depending on site specific requirements.

In addition to combining an extension body and a bolting member, an exemplary aspect of an extension member can further combine an extension body, a bolting member, and a cable clamping member into a single component. FIGS. 5-8 depicts an extension member 200 that combines a clamping member, an extension member, and a bolting member for use in a large-scale solar power plant. The combination of a clamping member, an extension member, and a bolting member all into a singular component results in even further material, labor, and installation benefits for the solar construction and installation companies when compared to traditional cable hangers and/or extension members.

The extension member 200 is be substantially similar to the extension member 100, and therefore common features are not described in detail herein. A person skilled in the art would appreciate that the above description of the extension member 100 is also applicable to the additional extension member 200. The extension member 200 includes an extension body 201 with a round body 202, having a threaded surface 202*a* arranged thereon, extending from a first end of the extension body 201. The extension member 200 is coupled to a supporting structure or vertically oriented component using the round body 202 and threaded surface 202*a* similarly to the extension member 100 using the round body 102 and the threaded surface 102*a*.

Unlike the extension member 100, which includes a second round body 103 arranged on the opposite end as the first round body 102, a cable support 204 is arranged on the opposite end of the extension body 201 as the round body 202. The cable support 204 includes a cable supporting channel 203 and an internally threaded hole 206 arranged on the front face of the hexagonal extension body 201, near the cable supporting channel 203. A threaded setscrew 205 is arranged within the hole 206 and is configured to be used in place of a messenger cable clamp such that a messenger cable 114 can be supported, secured, and coupled directly to the extension member 200.

In order to couple the messenger cable 114 to the extension member 200, the messenger cable 114 is arranged within the cable supporting channel 203. The setscrew 205 is torqued to a specified torque value that will securely couple the messenger cable 114 within the cable supporting channel 203, and to the extension member 200. The specific torque value could be in the range of 50-80 ft-lbs (Foot-Pounds), but can vary depending on the type and size of the threads, such as being within the range of 30-100 ft-lbs, and preferably 75 in-lbs. In order to release the messenger cable 114 from the channel 203, the setscrew 205 is torqued in the opposite direction as securing the messenger cable 114 within the cable supporting channel 203 to allow the messenger cable 114 to be removed from the cable supporting channel 203.

FIGS. 9-12 depicts an extension member 220 that combines a clamping member and an extension member for use in a large-scale solar power plant. The extension member 220 is be substantially similar to the extension member 200, and therefore common features are not described in detail herein. A person skilled in the art would appreciate that the above description of the extension member 200 is also applicable to the additional extension member 220. The extension member 220 includes an extension body 221 with an aperture 222, having a threaded surface 222*a* arranged therein, extending into a first end of the extension body 221. The extension member 220 is coupled to a supporting structure 120 or vertically oriented component using a round body 228, such as a screw, passing into the aperture 222, similarly to the extension member 200 using the round body 202 and the threaded surface 202*a*.

Similar to the extension member 200, a cable support 224 is arranged on the opposite end of the extension body 221 as the aperture 222. The cable support 224 includes a cable supporting channel 223 and an internally threaded hole 226 arranged on the front face of the hexagonal extension body 221, near the cable supporting channel 223. A threaded setscrew 230 is arranged within the hole 226 and is configured to be used in place of a messenger cable clamp such that a messenger cable 114 can be supported, secured, and coupled directly to the extension member 220.

In order to couple the messenger cable 114 to the extension member 220, the messenger cable 114 is arranged within the cable supporting channel 223. The setscrew 230 is torqued to a specified torque value that will securely couple the messenger cable 114 within the cable supporting channel 223, and to the extension member 220. In order to release the messenger cable 114 from the channel 223, the setscrew 225 is torqued in the opposite direction as securing the messenger cable 114 within the cable supporting channel 223 to allow the messenger cable 114 to be removed from the cable supporting channel 223.

FIGS. 13-16 depicts an extension member 240. The extension member 240 is be substantially similar to the extension member 220, and therefore common features are not described in detail herein. A person skilled in the art would appreciate that the above description of the extension member 220 is also applicable to the additional extension member 240. The extension member 240 includes an extension body 241 with an aperture 242, having a threaded surface 242*a* arranged therein, extending into a first end of the extension body 241. The extension member 240 is coupled to a supporting structure 120 or vertically oriented component using a round body 248, such as a screw, passing into the aperture 242, similarly to the extension member 200 using the round body 202 and the threaded surface 202*a*. Additionally, the extension member 240 includes an aperture 243, having a threaded surface 243*a* arranged therein, extending into a second end of the extension body 241. A cable clamp 246 is arranged on the second end of the extension body 241, and a setscrew 250 is used to secure the cable clamp 246 to the body 241 by being threaded into the aperture 243.

FIGS. 17-21 depicts an extension member 300 including support beams 302, 304, and 306 secured together to form a hollow body. A cable support 308 can be positioned at the ends of the beams 302 and 304. The cable support 308 include a channel 310 and a projection 312. The channel 310 is configured to receive a cable 114 which is to be supported by the extension member 300. The projection 312 is arranged adjacent to the channel 310 and is configured to be deformable in order to secure the cable 114 within the channel 310. In a non-deformed position, the projection 312 is substantially U-shaped, and provides a large enough gap such that the cable 114 can be positioned within the channel 310. Once the cable 114 is arranged within the channel 310, the projection 312 is deformed to encompass the cable 114 within the channel 310 such that the cable 114 cannot be removed from the channel 310.

Figure 20:
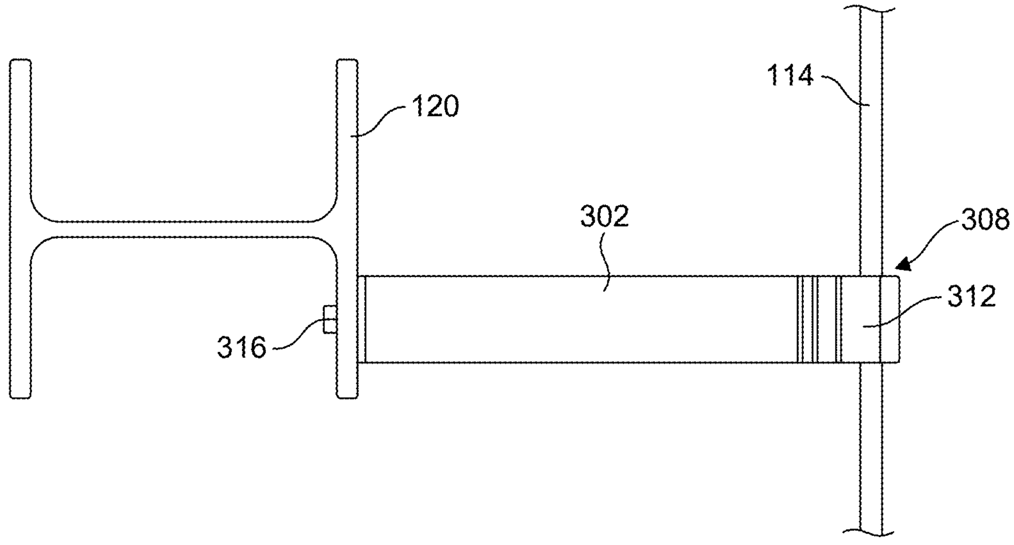
FIG. 20 is a top view of the extension member of FIG. 17 positioned on a support structure with a cable arranged therein.
Figure 21:
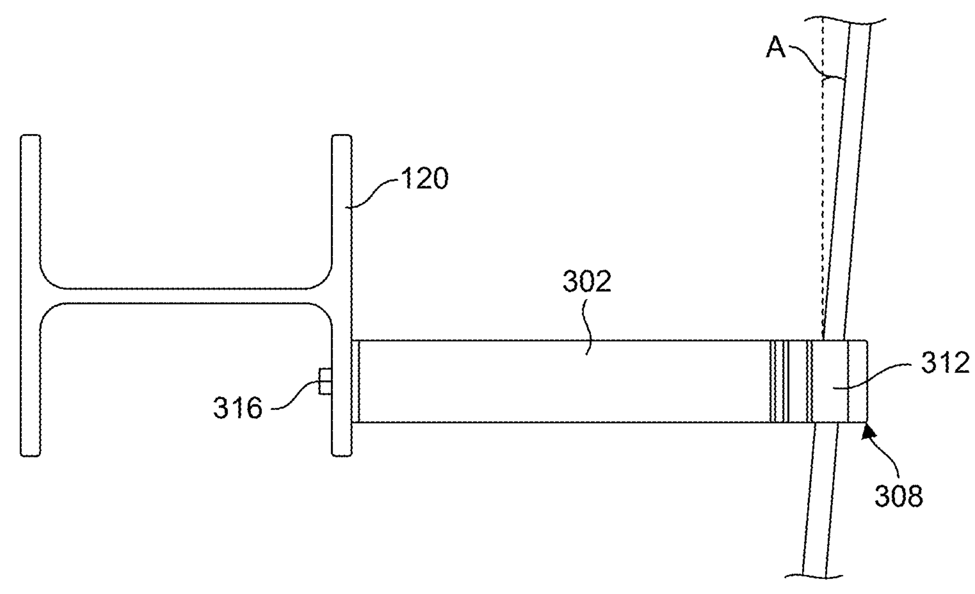
FIG. 21 is a top view of the extension member of FIG. 17 positioned on a support structure with a cable arranged therein.
Figure 22:
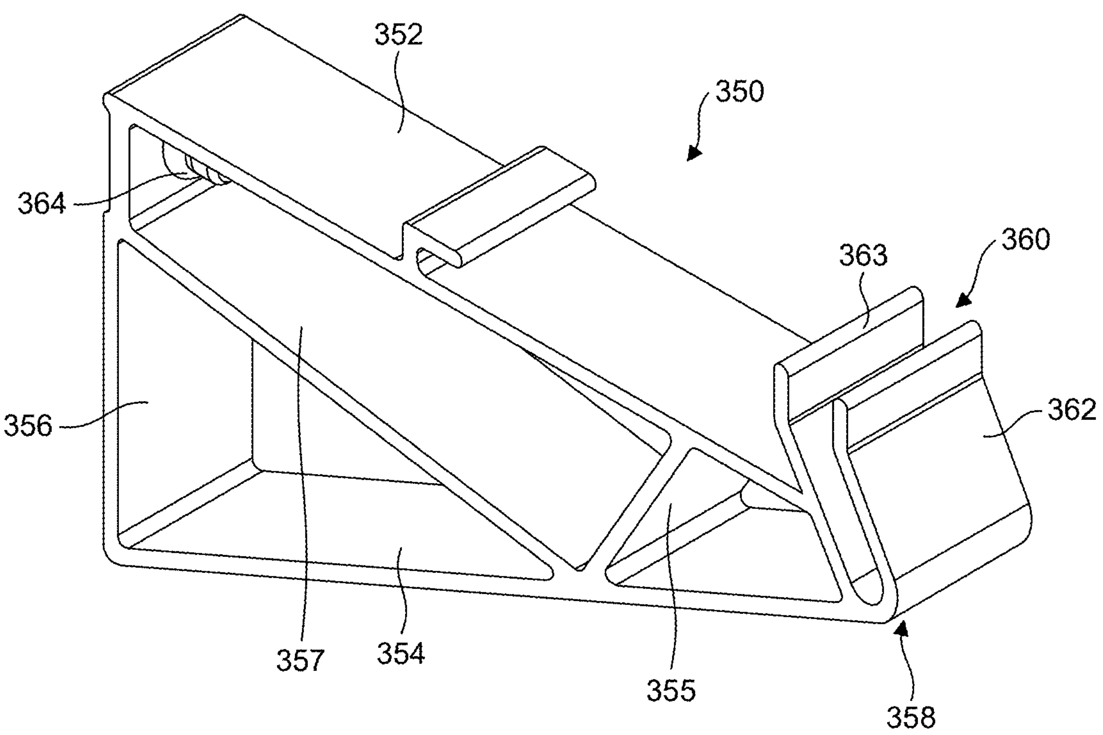
FIG. 22 is a perspective view of another aspect of an extension member.
Figure 23:
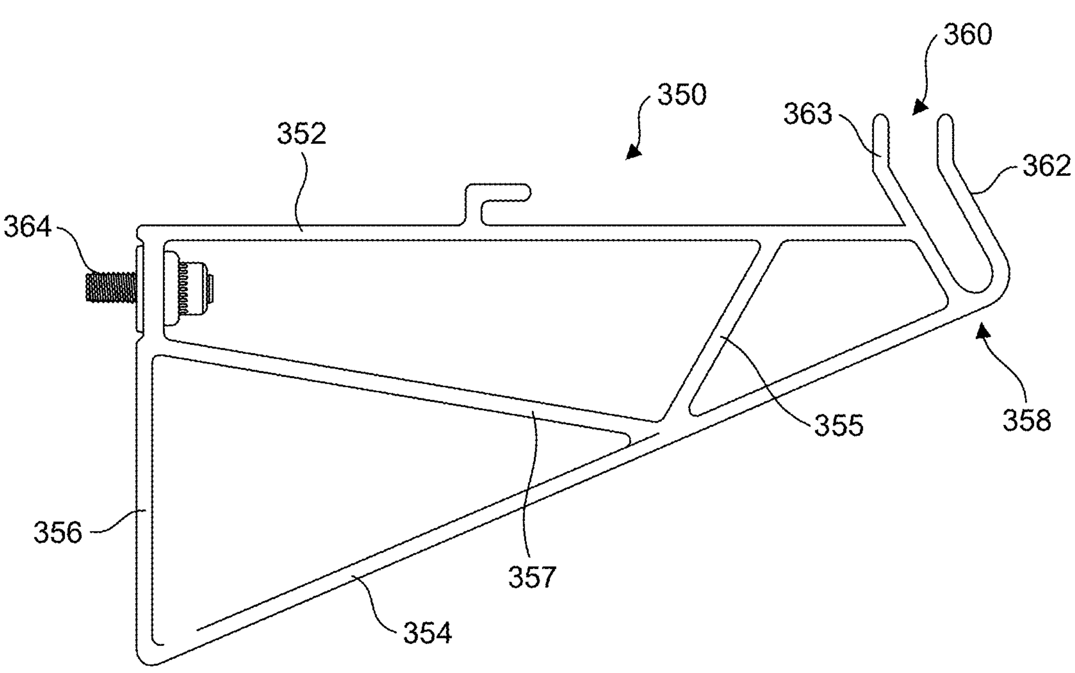
FIG. 23 is a side view of the extension member of FIG. 22.
Figure 24:
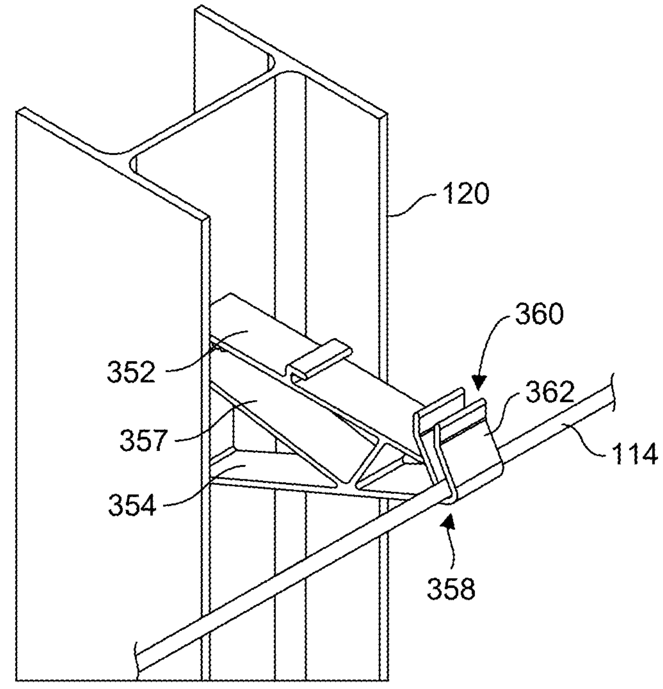
FIG. 24 is a perspective view of the extension member of FIG. 22 positioned on a support structure with a cable arranged therein.
Figure 25:
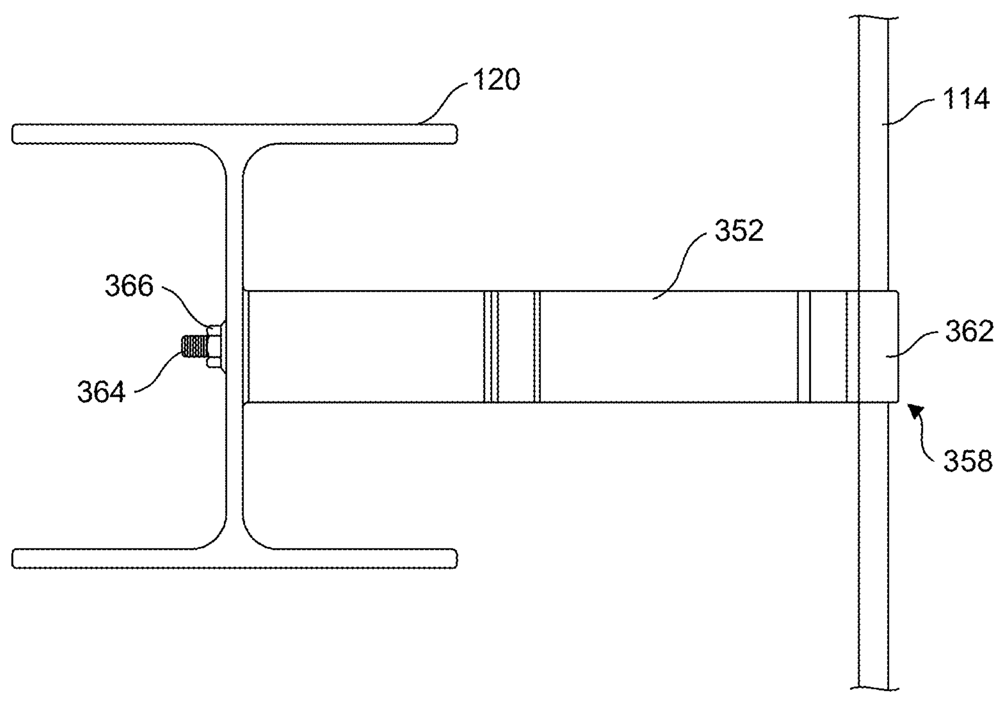
FIG. 25 is a top view of the extension member of FIG. 24 positioned on a support structure with a cable arranged therein.

In an aspect, while the cable 114 may be secured within the channel 310, the cable 114 can still move relative to the cable clamp 308 in a horizontal plane parallel to the beam 302. This plane is depicted in FIGS. 20-21, where the cable 114 can be perpendicular to the beam 302 (FIG. 20), or can be aligned at an angle A within the cable clamp 308 (FIG. 21) in order to prevent crimping or bending of the cable 114 during installation, which could damage the cable 114. Additionally, in an aspect, the cable 114 is locked in place once secured within the channel, and cannot move relative to the body.

In order to secure the extension member 300 to a support structure 120, a bolt 314 is arranged in an aperture positioned through the beam 306. The bolt 314 passes through an aperture in the support structure 120, and is further secured to the support structure 120 using a nut 316.

FIGS. 22-29 depicts an extension member 350. The extension member 350 is be substantially similar to the extension member 300, and therefore common features are not described in detail herein. A person skilled in the art would appreciate that the above description of the extension member 300 is also applicable to the additional extension member 350.

The extension member 350 includes support beams 352, 354, and 356 secured together. Additionally, beams 355 and 357 extend between beams 352, 354, and 354, 356 respectively to provide rigidity to the extension member 350. A cable support 358 can be positioned at the ends of the beams 352 and 354. The cable support 358 include a channel 360 and projections 362, 363. The channel 360 is configured to receive a cable 114 which is to be supported by the extension member 350. The projection 362 is arranged adjacent to the channel 360 and is configured to be deformable in order to secure the cable 114 within the channel 360. In a non-deformed position, the projections 312 are substantially U-shaped, and provide a large enough gap such that the cable 114 can be positioned within the channel 360. Once the cable 114 is arranged within the channel 360, the projection 362 is deformed relative to the projection 363 to encompass the cable 114 within the channel 360 such that the cable 114 cannot be removed from the channel 360.

Figure 26:
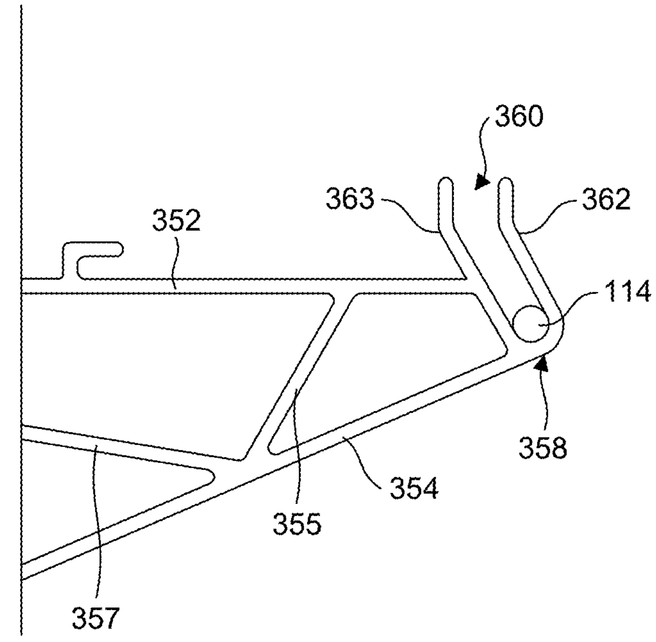
FIG. 26 is a side view of the extension member of FIG. 22 in an non-deformed position.
Figure 27:
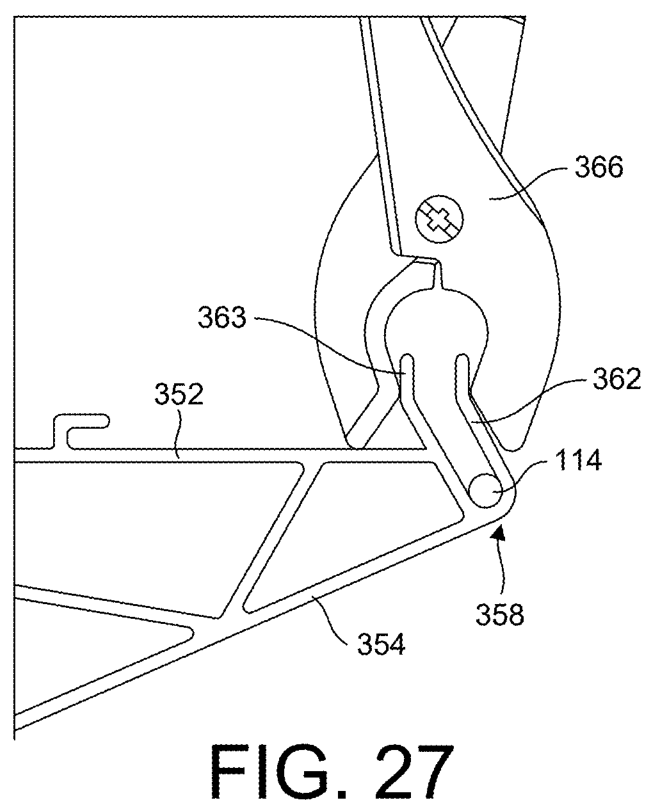
FIG. 27 is a side view of the extension member of FIG. 22 in an non-deformed position.
Figure 28:
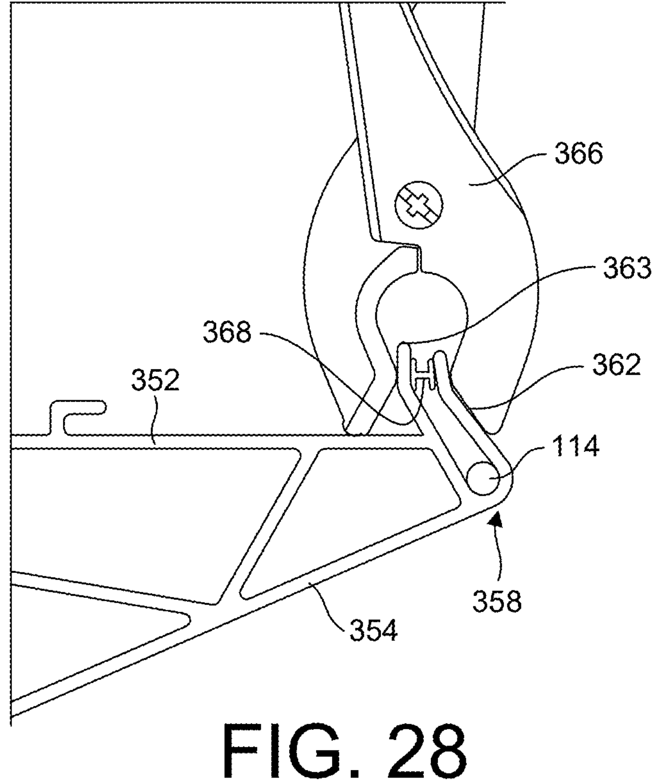
FIG. 28 is a side view of the extension member of FIG. 22 in a deformed position.
Figure 29:
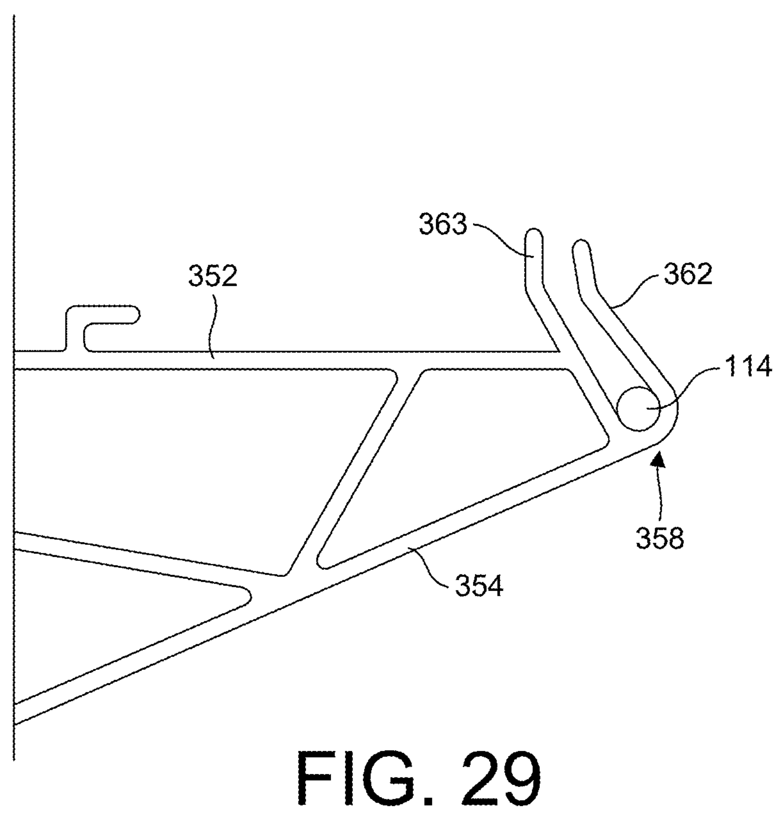
FIG. 29 is a side view of the extension member of FIG. 22 in a deformed position.

The method of insertion is illustrated in FIGS. 26-29. FIG. 26 depicts the cable clamp 358 in a non-deformed position. The cable 114 is free to be inserted and removed from the channel 360. With the cable 114 inserted into the channel 360, a tool 366 can be used to apply a force to the projections 362, 363 (FIG. 27-28) in order to reduce a gap 368 between the projections 362, 363. With the cable clamp 358 in a deformed position, the diameter of the cable 114 is larger than the gap 368, which prevents the cable 114 from being removed from the channel 360. In an aspect, while the cable 114 may be secured within the channel 360, the cable 114 can still move relative to the cable clamp 358 in a horizontal plane parallel to the beam 352. Additionally, the cable 114 may be secured in place and cannot move relative to the body once secured within the channel 360. In the event the cable 114 needs to be removed from the channel 360, the projection 362 can be deformed in order to increase the size of the gap 368.

In order to secure the extension member 350 to a support structure 120, a bolt 364 is arranged in an aperture positioned through the beam 356. The bolt 364 passes through an aperture in the support structure 120, and is further secured to the support structure 120 using a nut 366.

Figure 30:
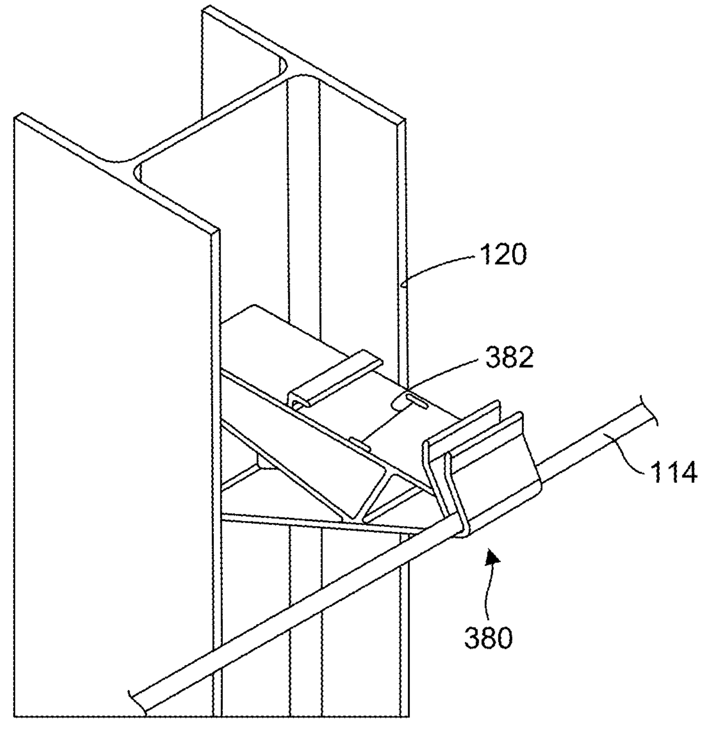
FIG. 30 is a perspective view of another aspect of an extension member.
Figure 31:
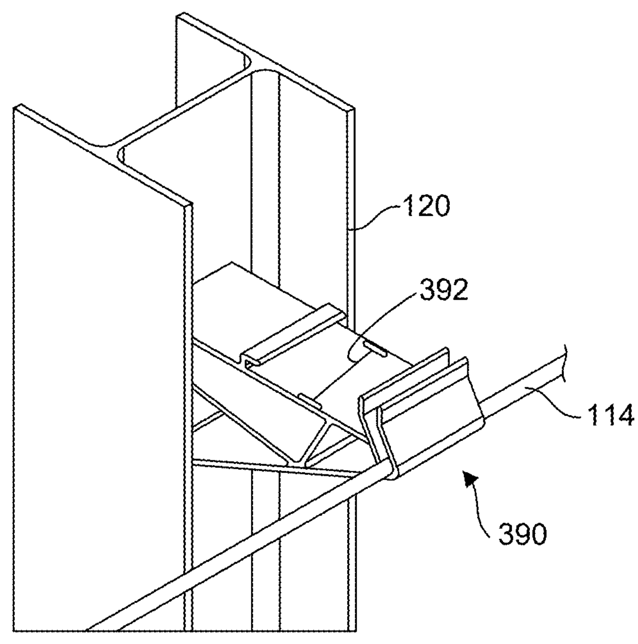
FIG. 31 is a perspective view of another aspect of an extension member.

In some aspects, the width of an extension member can be varied without altering the essential components of the extension member. FIGS. 30 and 31 illustrate aspects of extension members which are similar to the extension member 350, expect that the width of each extension member vary. FIG. 30 illustrates an extension member 380 having a width 382, and FIG. 31 illustrates an extension member 390 having a width 392. The extension members 380. 390 are substantially similar to the extension member 350, and contain like components. The width 382 is smaller than the width 392, which allows the extension member 390 to hold more weight and be more durable. Due to the extrusion manufacturing method of the extension members 350, 380, and 390, the width of the extension members can be varied depending on the required application and projected weight to be held by the extension members.

Figure 32:
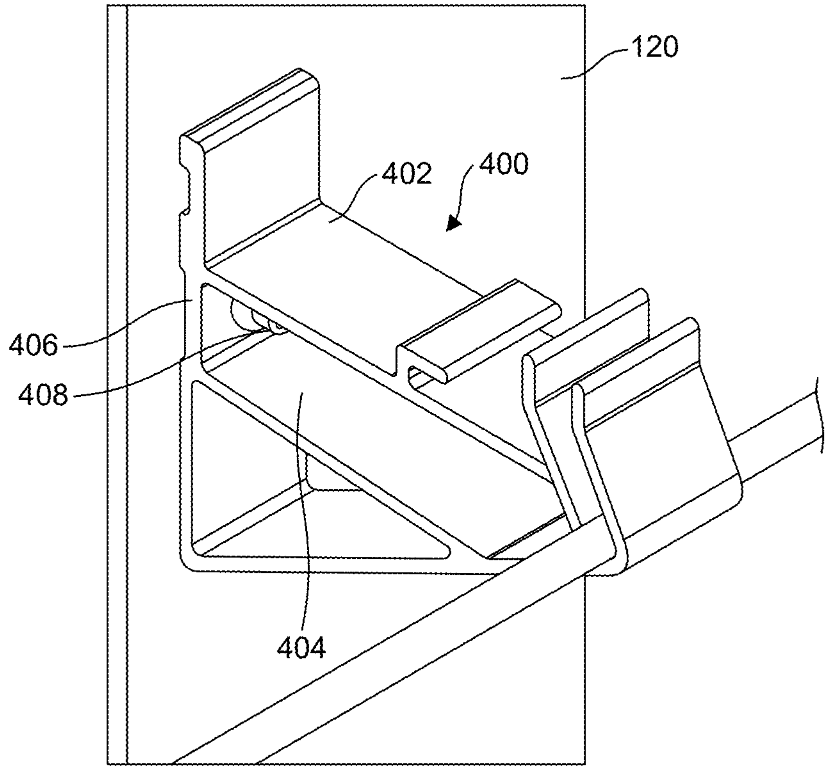
FIG. 32 is a perspective view of another aspect of an extension member.
Figure 33:
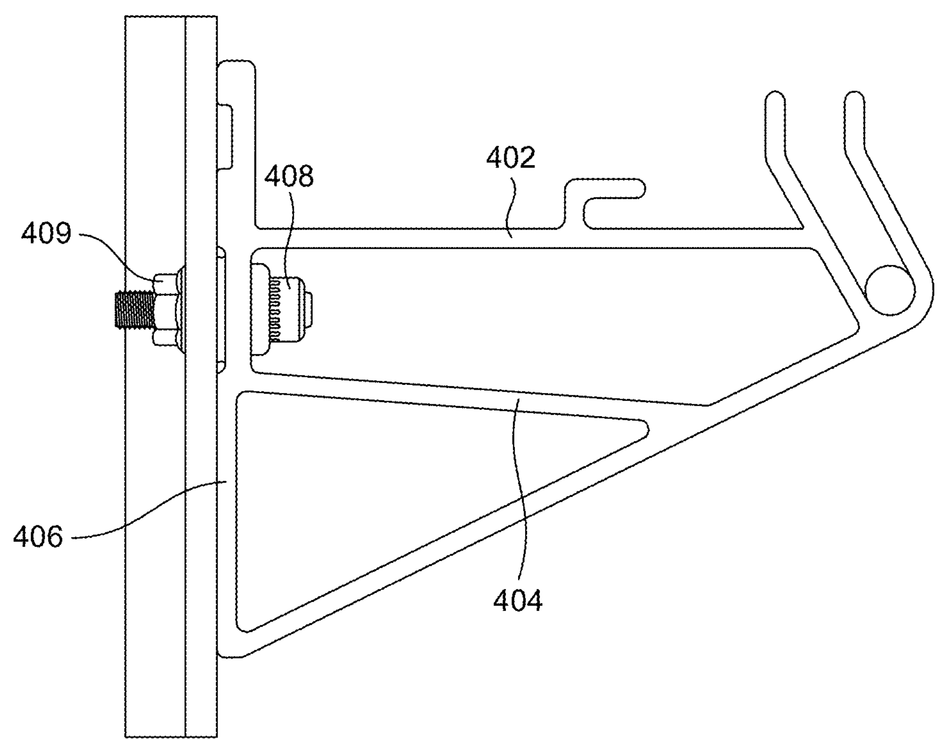
FIG. 33 is a perspective view of the extension member of FIG. 32 positioned on a support structure with a cable arranged therein.

In addition to allowing the width of an extension member to vary depending on application, the mechanism by which the extension member is secured to a support structure can also be varied. FIGS. 32-33 illustrated an aspect of an extension member 400. The extension member 400 is substantially similar to the extension member 350, and contains like components such that similar components will not be described in detail. The extension member 400 includes beams 402, 404, and 406. The beam 406 is perpendicular to the support structure 120, and includes an aperture for a bolt 408 to pass through. The aperture is positioned between the beams 402 and 404, and aligns with an aperture positioned within the support structure 120. The bolt 408 passes through both the apertures of the beam 406 and the support structure 120, and a nut 409 is used to further secure the bolt 408 within the apertures.

Figure 34:
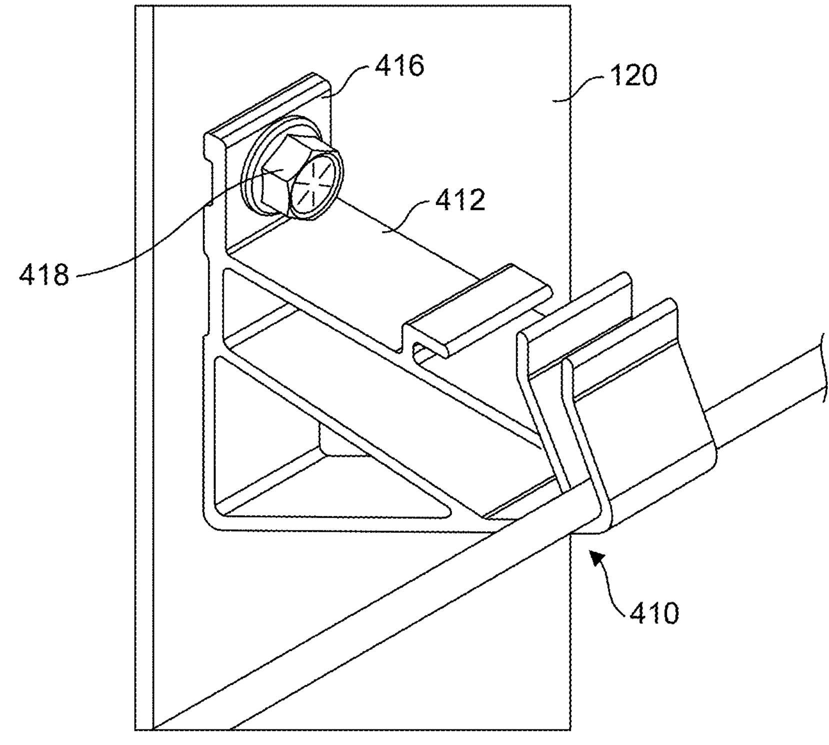
FIG. 34 is a perspective view of another aspect of an extension member.
Figures 35, 36:
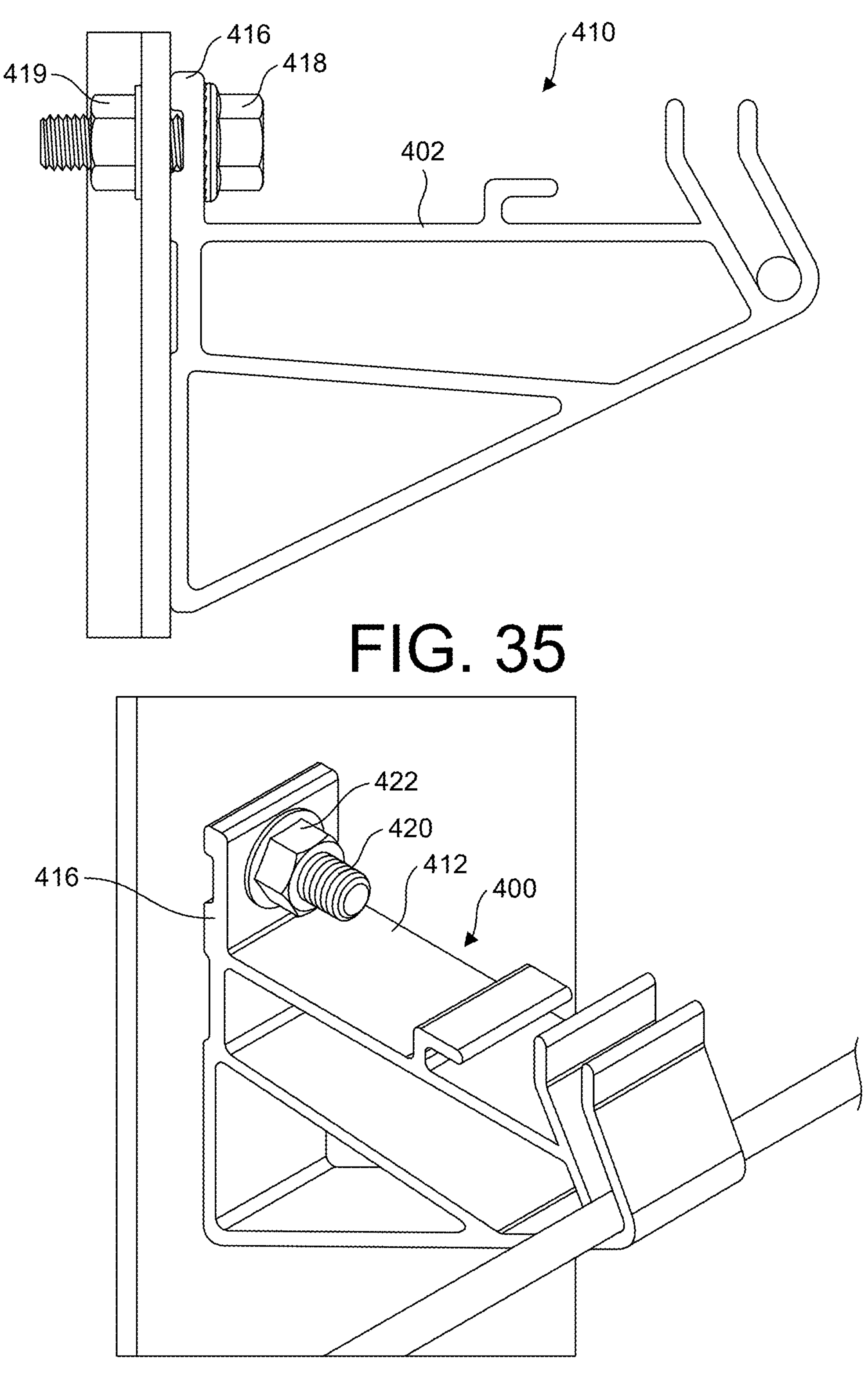
FIG. 35 is a perspective view of the extension member of FIG. 34 positioned on a support structure with a cable arranged therein.
FIG. 36 is a perspective view of another aspect of an extension member.

FIGS. 34-35 illustrated an aspect of an extension member 410. The extension member 410 is substantially similar to the extension member 400, and contains like components such that similar components will not be described in detail. The extension member 410 includes beams 412 and 416. The beam 416 is perpendicular to the support structure 120, and includes an aperture for a bolt 418 to pass through. The aperture is positioned above the beam 412, and aligns with an aperture positioned within the support structure 120. The bolt 418 passes through both the apertures of the beam 416 and the support structure 120, and a nut 419 is used to further secure the bolt 418 within the apertures.

Figures 37, 38:
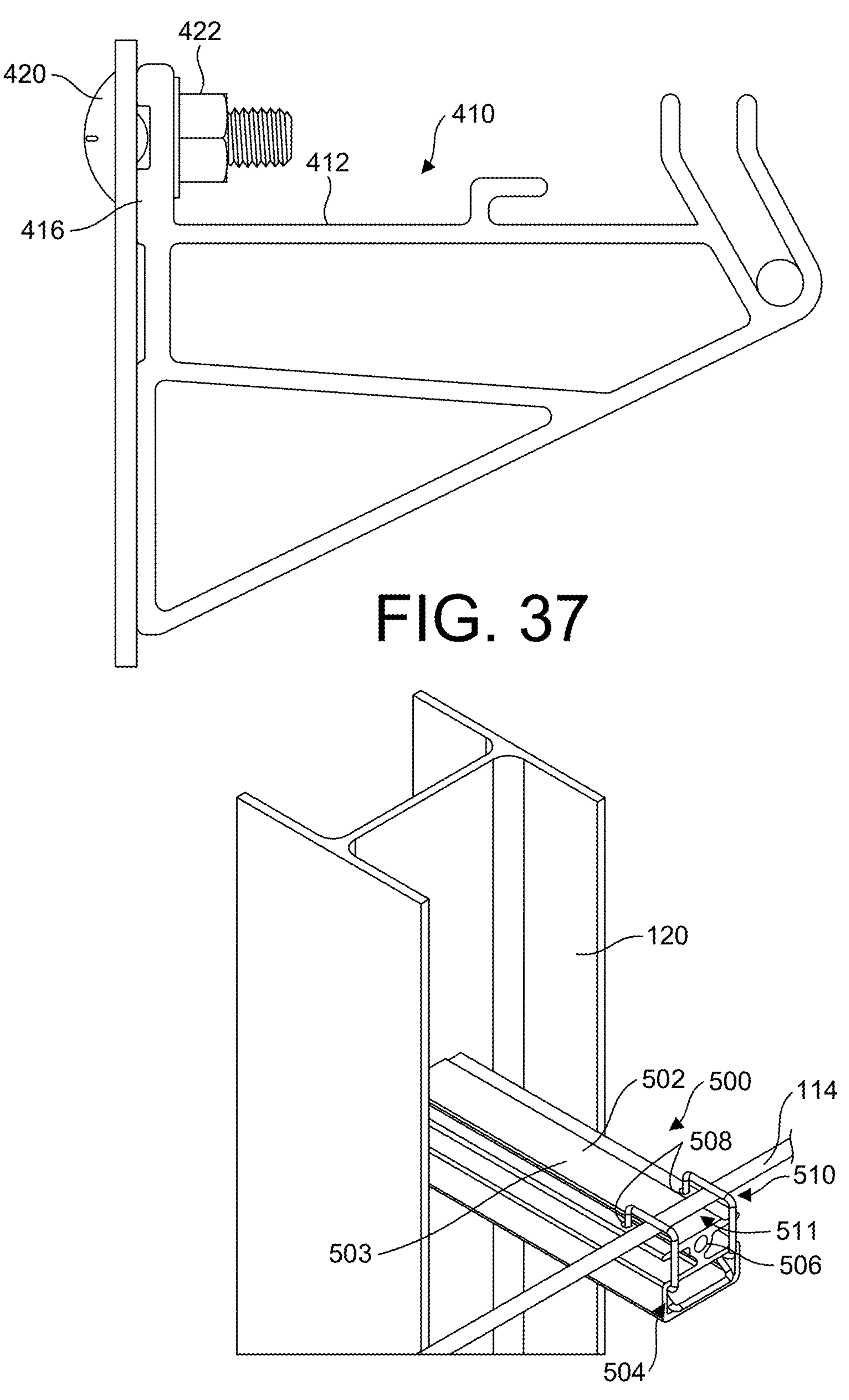
FIG. 37 is a perspective view of the extension member of FIG. 36 positioned on a support structure with a cable arranged therein.
FIG. 38 is a perspective view of another aspect of an extension member positioned on a support structure with a cable arranged therein.

Additionally, FIGS. 36-37 illustrate the extension member 410, where the nut is arranged on the same side of the support structure 120 as the extension member 410. A bolt 420 is passed though an aperture in the support structure 120 and through the aperture in the beam 416. It may be advantageous to place the nut 422 on the same side as the extension member 410 such that an installer can focus on only a single side of the support structure 120.

It can be advantageous to allow for the securing of a cable within a cable clamp without the use of tools, and to allow for adjustment of a cable within the cable clamp without fully securing the cable until the cable is properly installed. FIGS. 38-52 illustrate an extension member 500 which can secure a cable 114 therein without the use of tools. The extension member 500 includes a body 502 and a cable clamp 510. The cable clamp 510 forms a channel 511 with the body 502 when positioned on the body 502. The cable clamp 510 can rotate relative to the body 502 between an insertion, installation, and secured positions.

Figure 39:
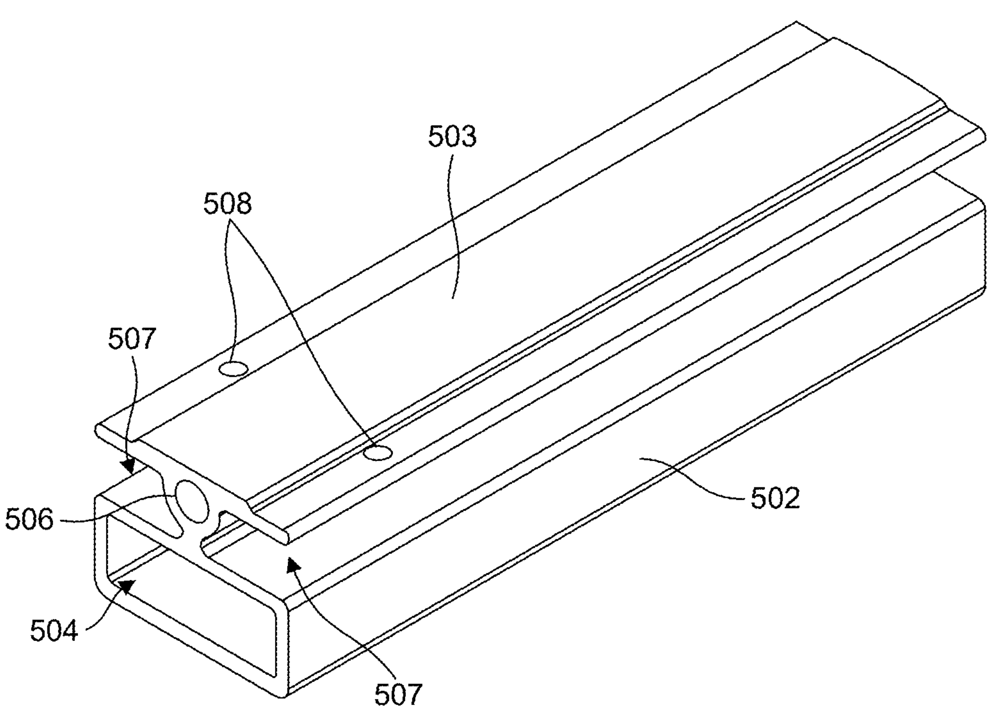
FIG. 39 is a front perspective view of a body of the extension member of FIG. 38.
Figure 40:
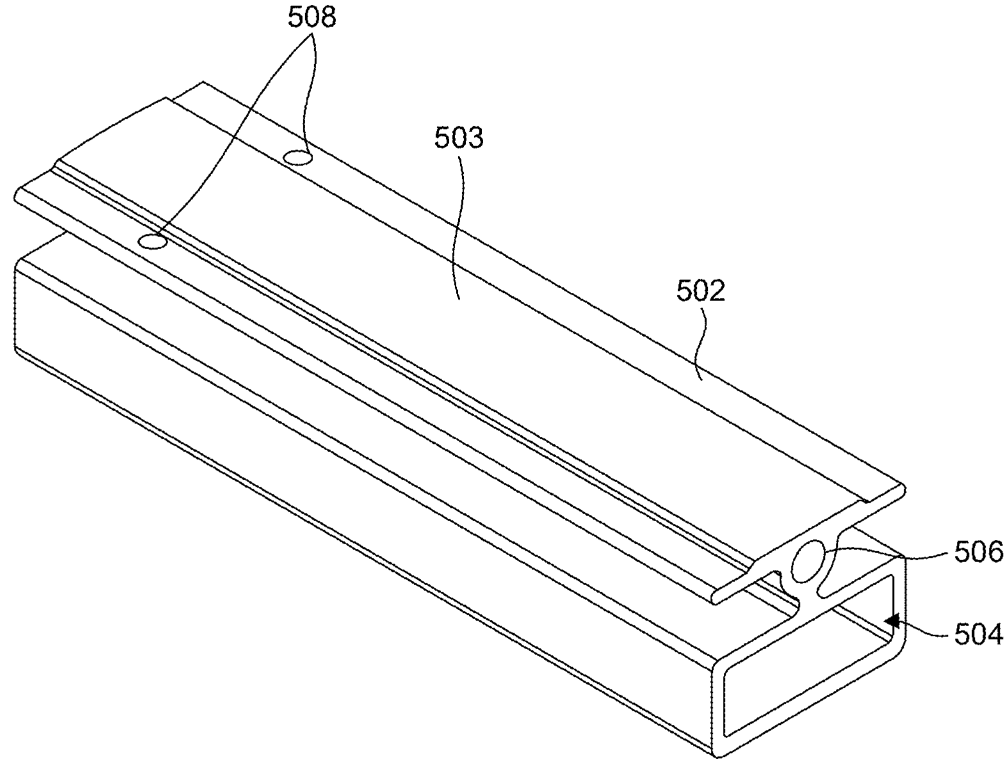
FIG. 40 is a rear perspective view of a body of the extension member of FIG. 38.
Figure 41:
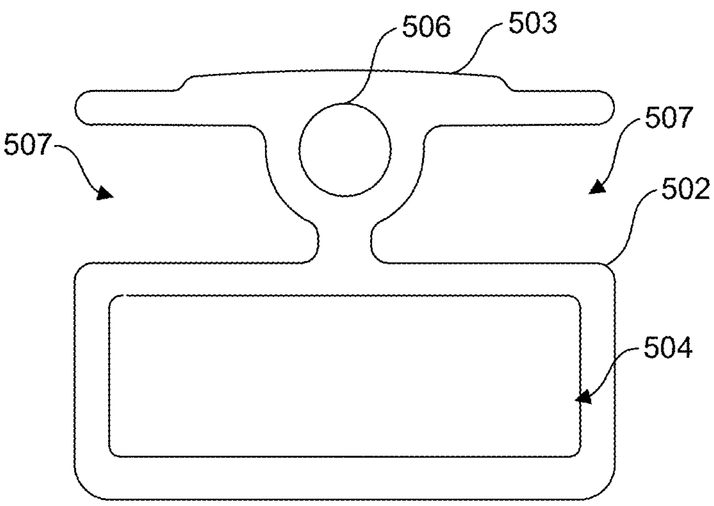
FIG. 41 is a front view of a body of the extension member of FIG. 38.

As shown in FIGS. 39-41, the body 502 includes a curved upper surface 503, a through-bore 504, a through-bore 506, channels 507, and apertures 508. The curved surface 503 is configured to allow a cable to ride along the body 502, and can aid in tensioning the cable during an installation process due to its curved surface 503.

Due to the extrusion manufacturing process, the body 502 has a similar cross-section along its entire length. The through-bores 504, 506 pass through the at least a portion of the body. The through-bore 504 is rectangular in shape, and is configured to receive a portion of the cable clamp 510, as described in more detail below. The through-bore 506 is circular in shape, and can include a threaded inner surface in order to correspond to a threaded bolt on a support structure, or a threaded bolt passing through a support structure. The body 502 is substantially T-shaped, which forms channels 507 running along the length of the body 502. Similar to the through-bore 504, the channels 507 are configured to receive a portion of the cable clamp 510, as described in more detail below. Additionally, the apertures 508 are positioned in the curved surface 503, and are configured to receive a portion of the cable clamp 510, as described in more detail below.

Figure 42:
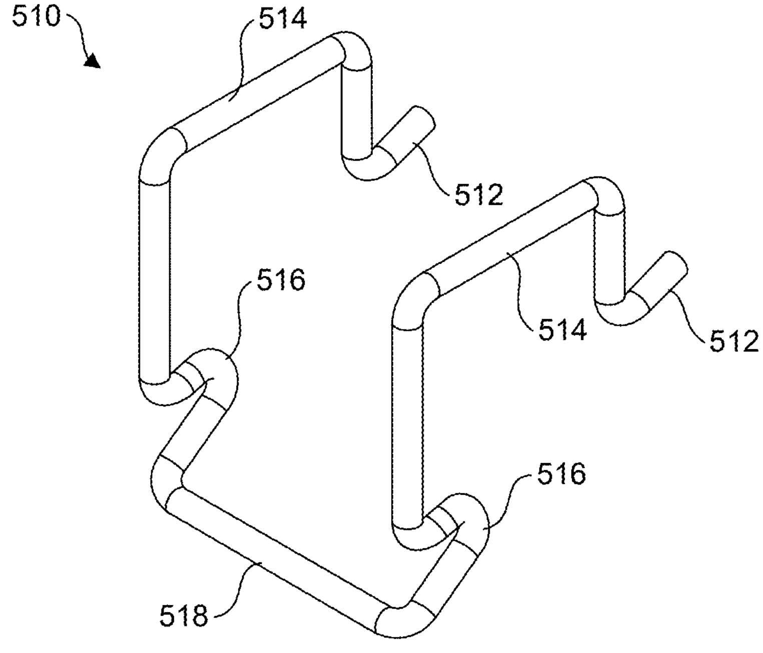
FIG. 42 is a perspective view of a cable clamp of the extension member of FIG. 38.
Figures 43, 44:
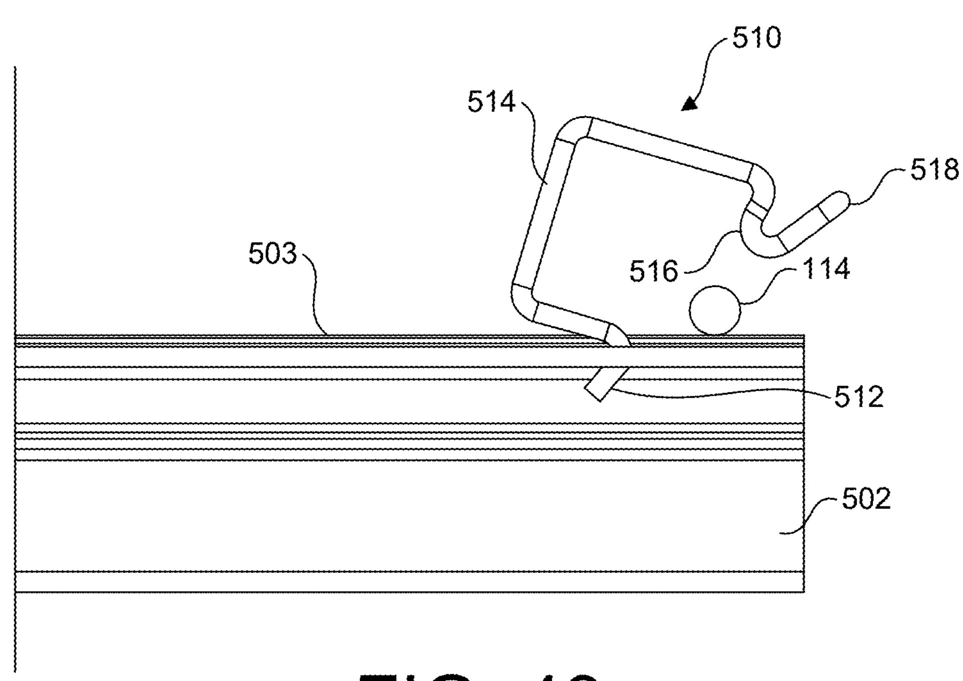
FIG. 43 is a side view of the extension member of FIG. 38 in an insertion position.
FIG. 44 is a front view of the extension member of FIG. 38 in an insertion position.

As illustrated in FIG. 42, the cable clamp 510 includes tabs 512, retention members 514, tabs 516, and handle 518. The cable clamp 510 can be formed from a single piece of bent wire. As shown in FIGS. 43-48, the cable clamp 510 is rotatably coupled to the body 502. The tabs 512 are arranged in the aperture 508, and allow the cable clamp 510 to pivot relative to the body 502. As shown in FIGS. 43-44, a cable 114 can be positioned on the curved surface 503 with the cable clamp rotated to an insertion position.

Figure 45:
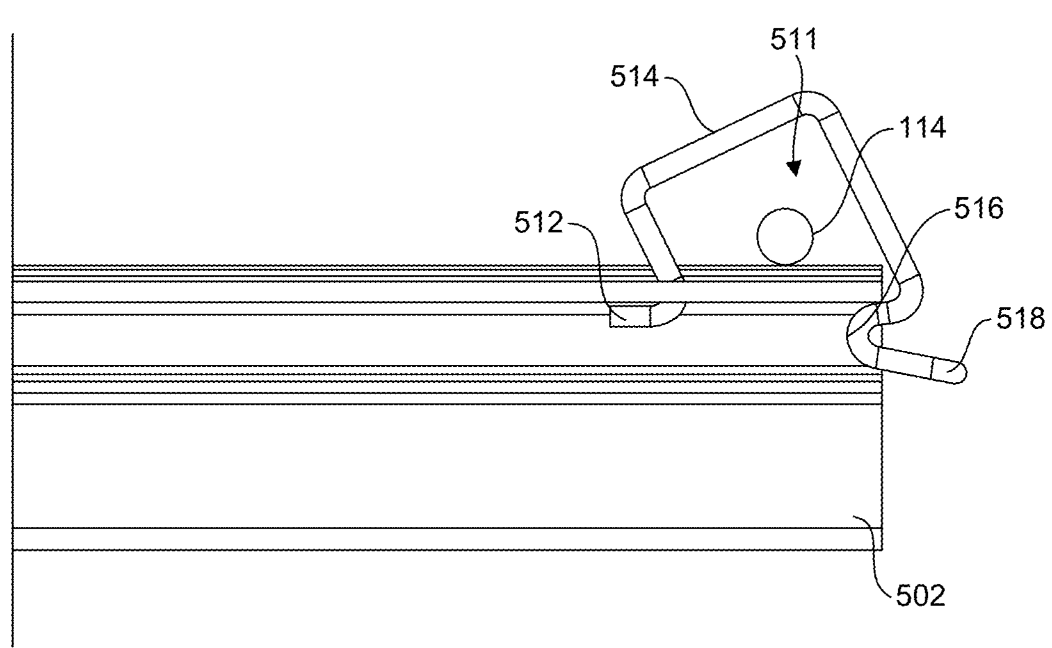
FIG. 45 is a side view of the extension member of FIG. 38 in an installation position.
Figure 46:
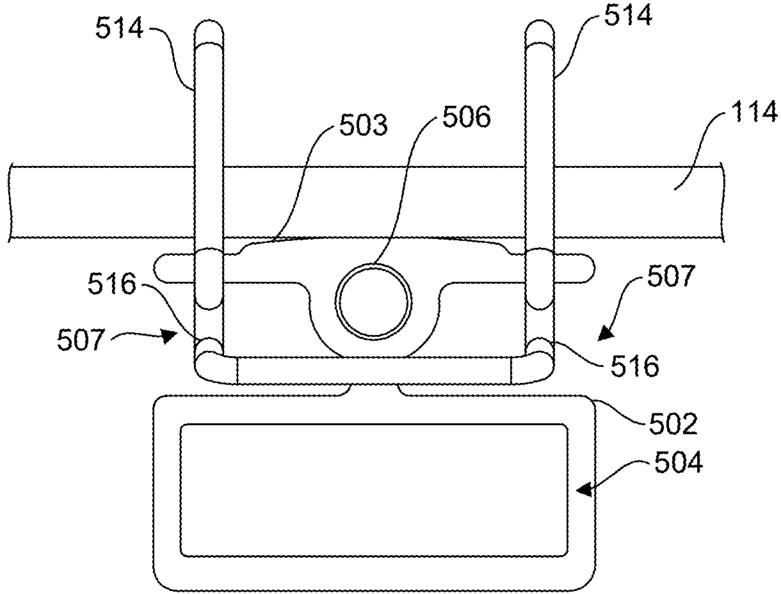
FIG. 46 is a front view of the extension member of FIG. 38 in an installation position.
Figure 47:
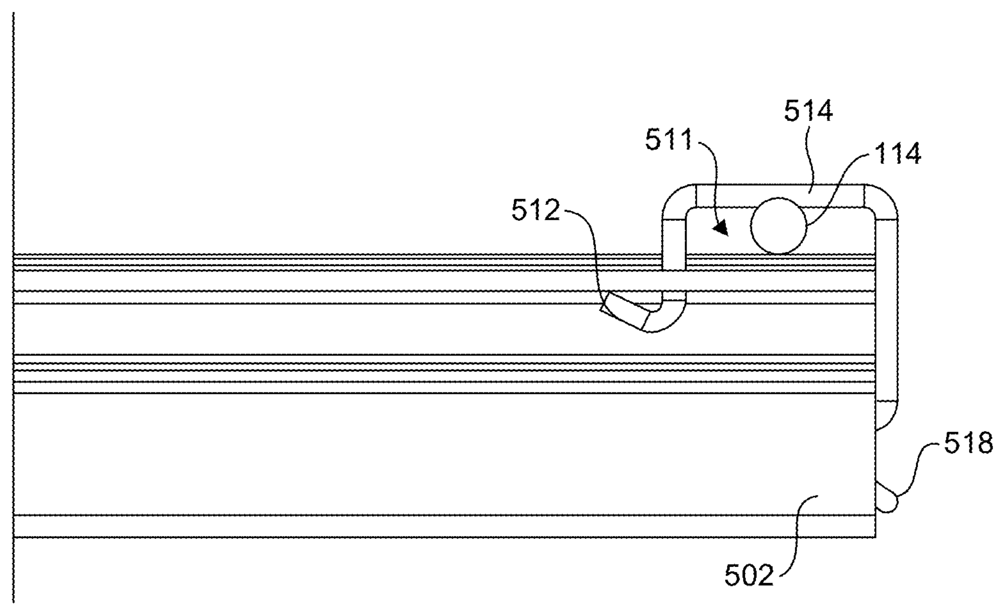
FIG. 47 is a side view of the extension member of FIG. 38 in a secured position.
Figure 48:
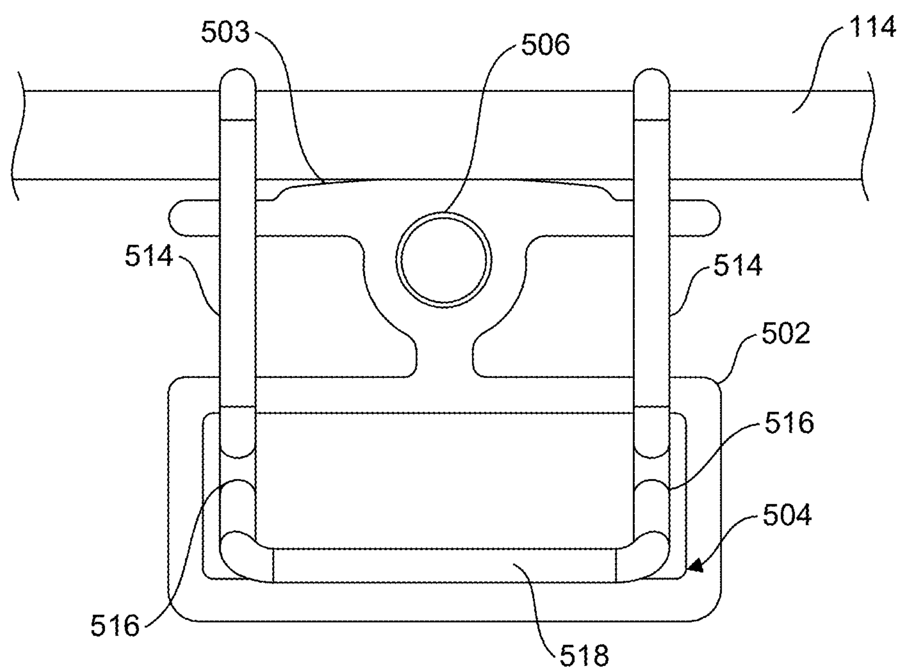
FIG. 48 is a front view of the extension member of FIG. 38 in a secured position.
Figure 49:
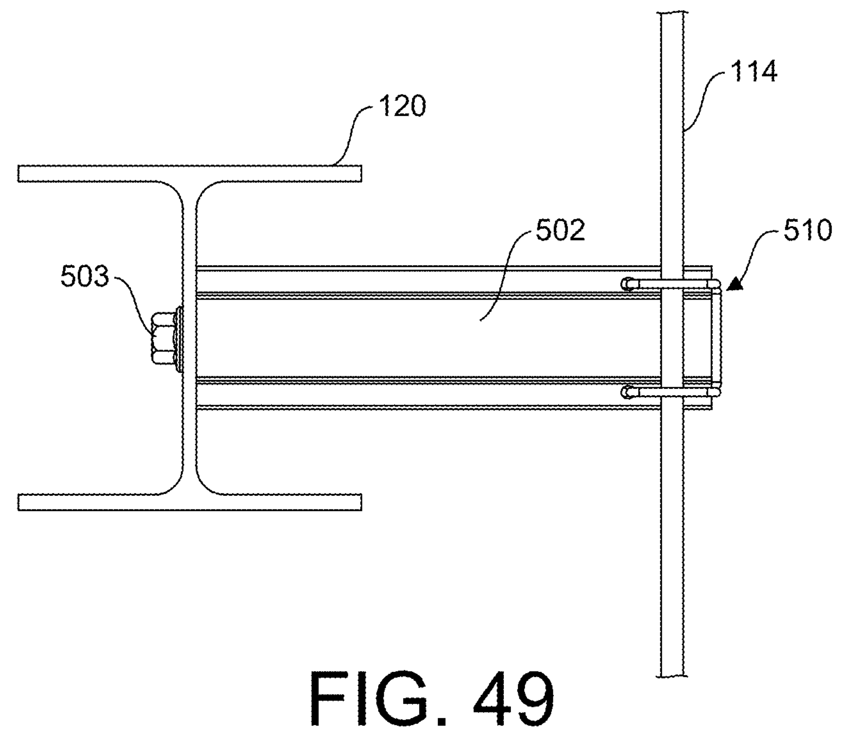
FIG. 49 is a top view of the extension member of FIG. 38.
Figure 50:
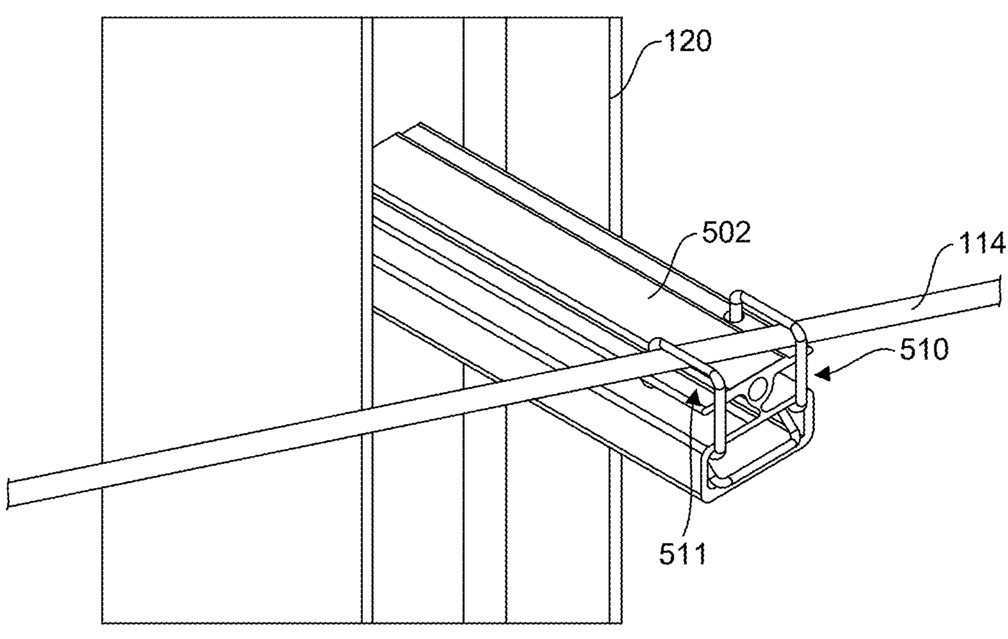
FIG. 50 is a perspective view of the extension member of FIG. 38.
Figure 51:
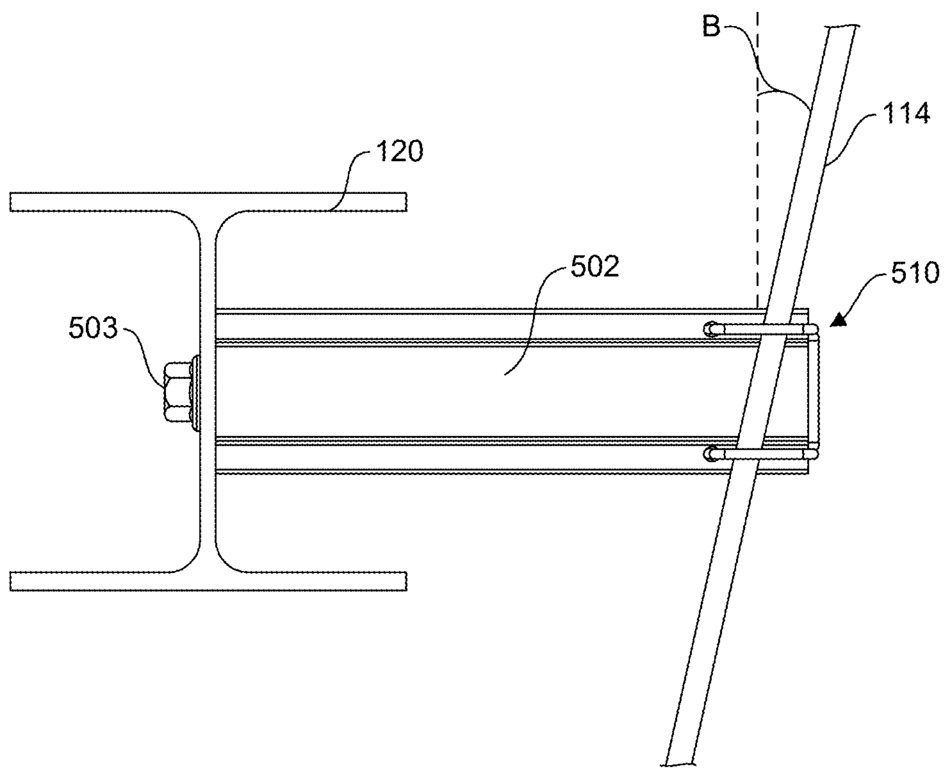
FIG. 51 is a top view of the extension member of FIG. 50.

As stated above, a singular electrical generating facility can include a large number of extension members and cables. Therefore, it is beneficial to allow encompassing of the cables at least partially within cable clamps to allow some movement of the cable relative to the body, without allowing the cable to fall out of the cable clamp during installation of the cable, and then secure the cable to prevent movement relative to the body once in the proper positon. The need for movement is due to misalignment of the support structure which will support a cable 114, and to prevent bends or kinks in the cable 114, the cable clamps allow for an angled cable to still be secured within the channels of the cable clamps without deforming the cable. As illustrated in FIGS. 45-46, with the cable 114 positioned on the surface 503, the cable clamp 510 can be rotated such that the tabs 516 are positioned with then channel 507 of the body 502. The cable clamp 510 deforms along the retention members 514 in order to allow the tabs 516 to snap into place within the channel 507. In this installation position, the cable clamp 510 forms a channel 511 with the body 502 to at least partially encompass the cable 114 within the channel 511. In the installation position, the cable 114 can still me moved relative to the body 502, but cannot fall out of the channel 511 since the retention members 514 and the surface 503 fully surround the cable 114. Once the cable 114 is in its final position, the cable clamp 510 can be rotated to a secured position, as illustrated in FIGS. 47-48. In the secured position, the retention members 514 can contact the cable 114, and provide a friction fit between the cable clamp 510 and the body 502. While in the secured position, the tabs 516 are removed from the channel 507, and are inserted into the through-bore 504. Similarly to how the cable clamp 510 transitions from the insertion position to the installation position, the cable clamp can deform in order to remove the tabs 516 form the channels 507, and to then insert the tabs 516 into the through-bore 504.

Figure 52:
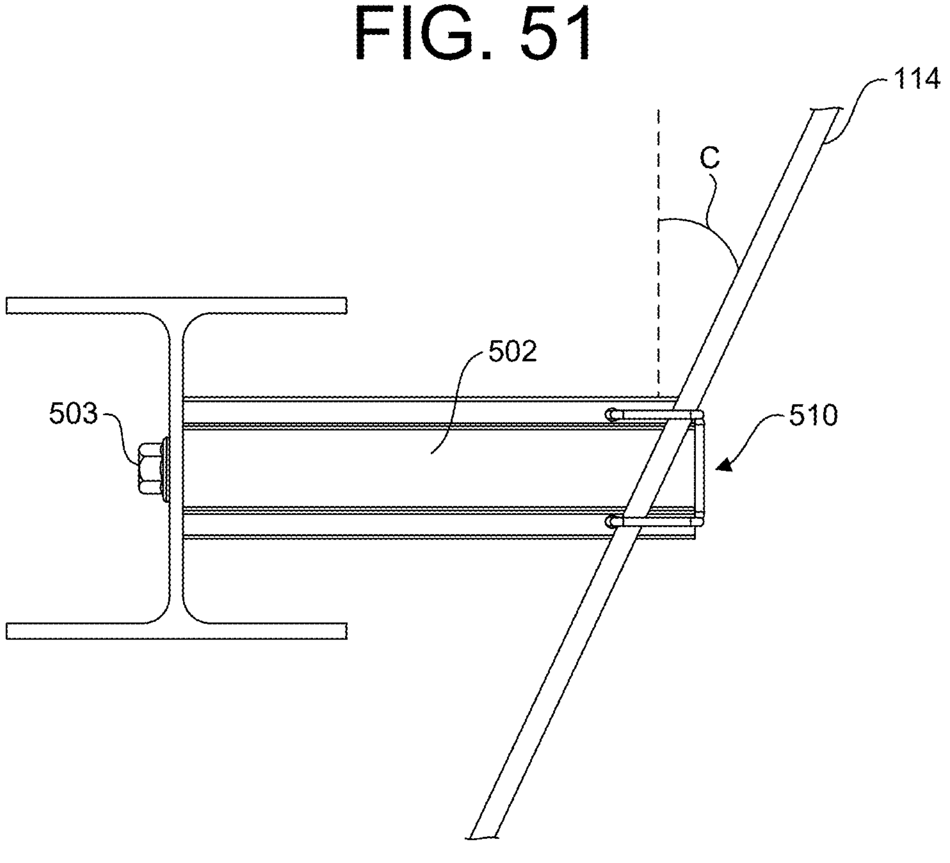
FIG. 52 is a top view of the extension member of FIG. 50.
Figure 53:
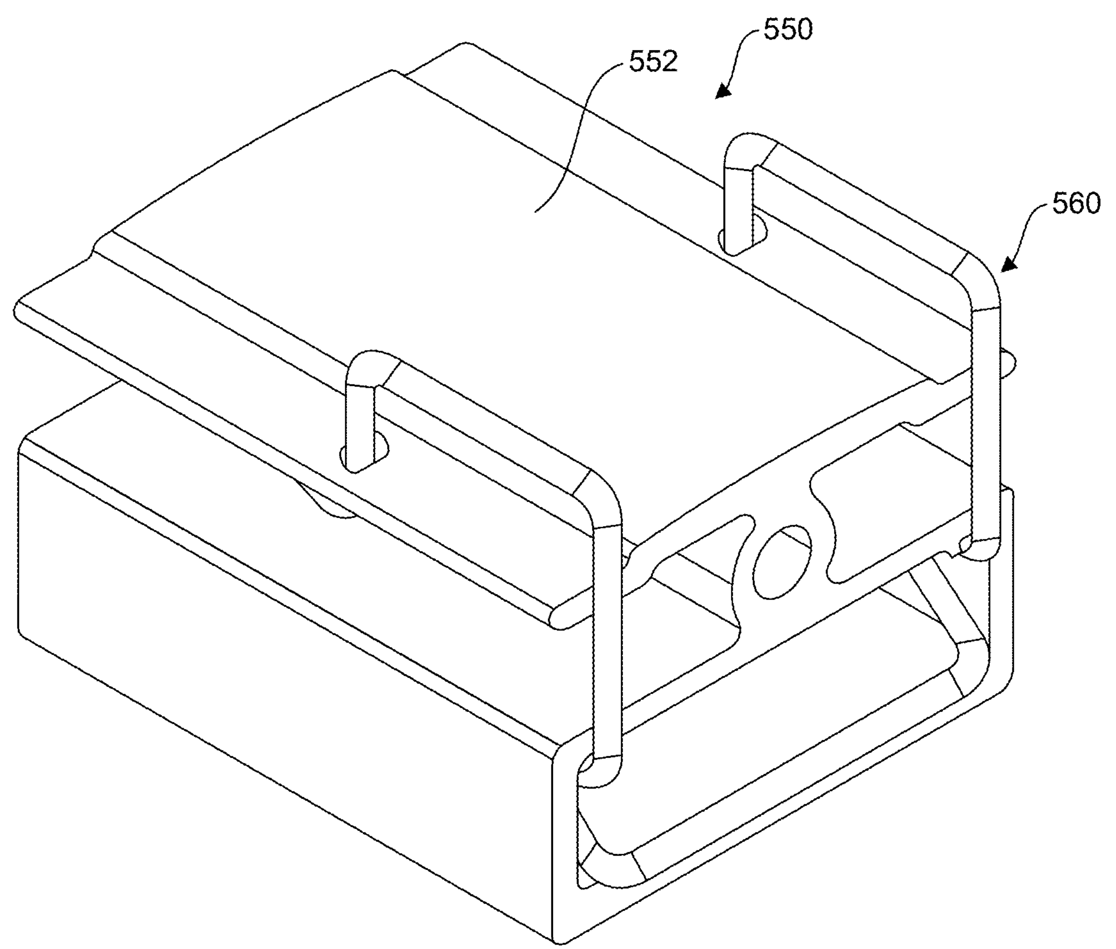
FIG. 53 is a perspective view of another aspect of an extension member.
Figure 54:
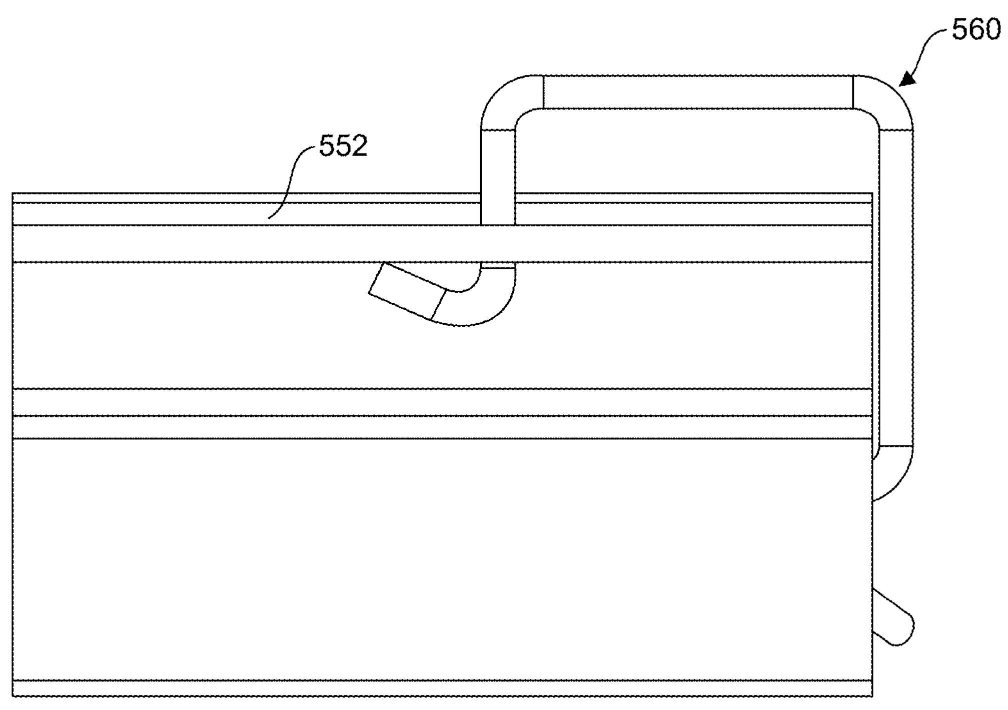
FIG. 54 is a side view of the extension member of FIG. 53.
Figure 55:
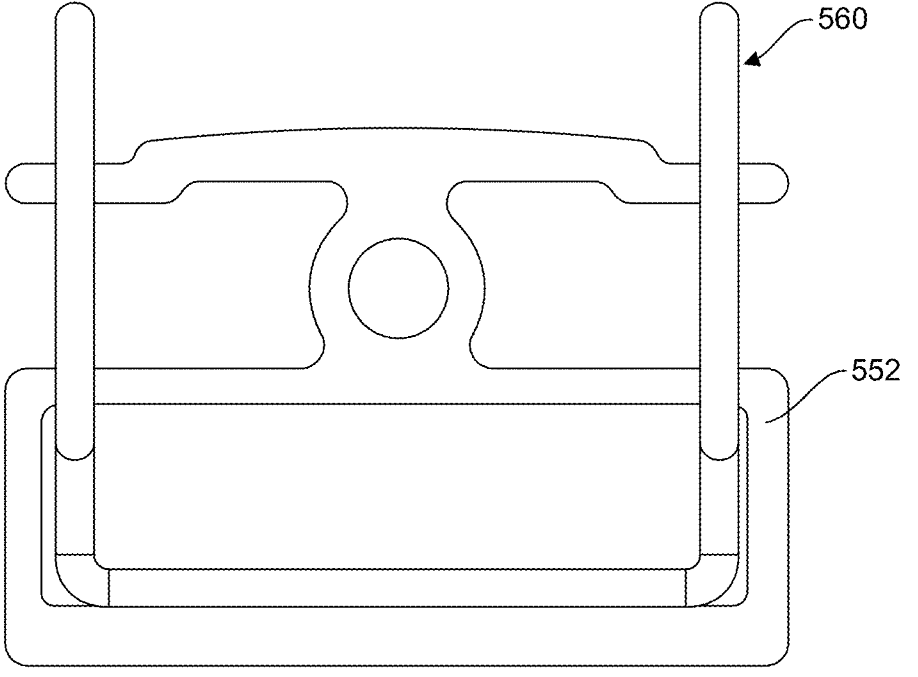
FIG. 55 is a front view of the extension member of FIG. 53.
Figure 56:
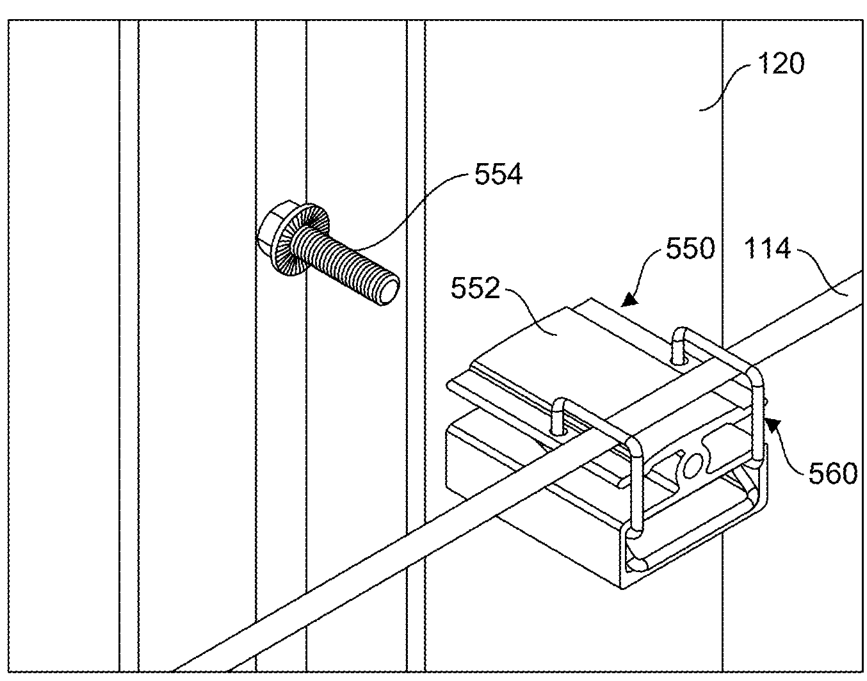
FIG. 56 is an exploded perspective view of the extension member of FIG. 53 positioned on a support structure.
Figure 57:
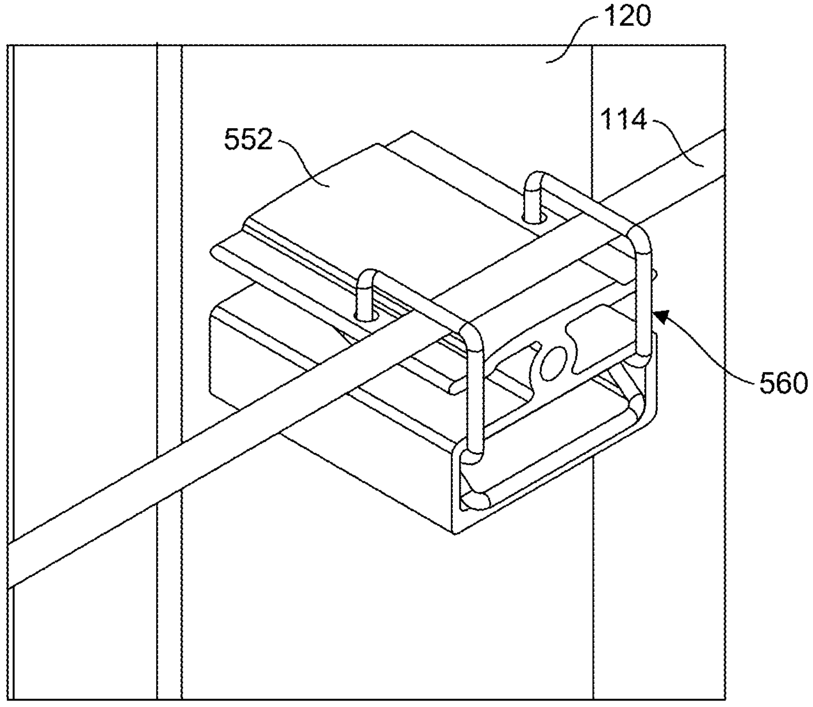
FIG. 57 is a perspective view of the extension member of FIG. 53 positioned on a support structure.
Figure 58:
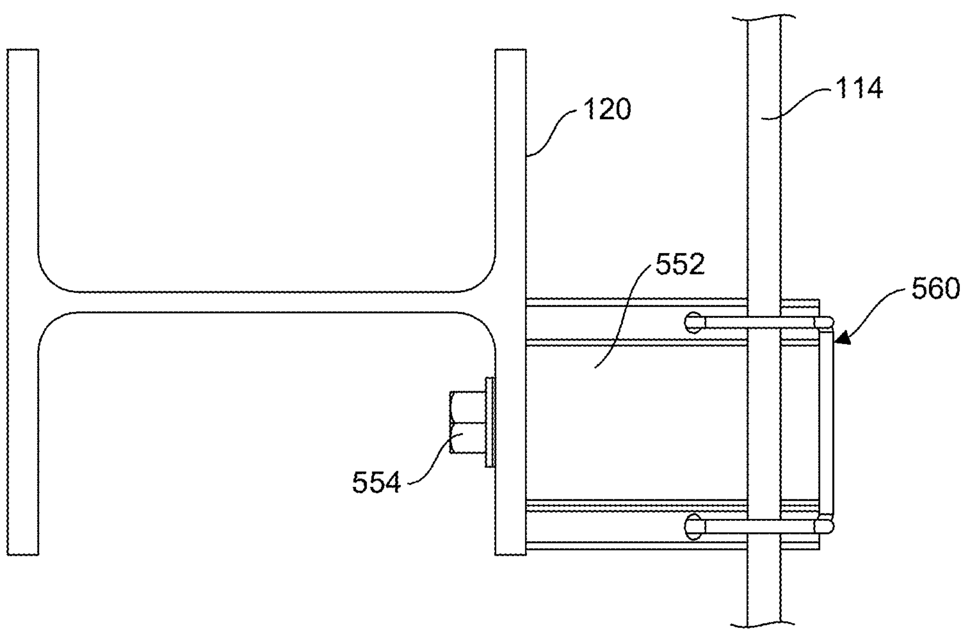
FIG. 58 is a top view of the extension member of FIG. 53.

As illustrated in FIGS. 49-52, the cable 114 can be arranged within the channel 511 perpendicular to the body 502, and can also be arranged at varying angles with respect to the body 502. Since the recess 522 is wider than the cable 114, the cable 114 can pass through the channel at a small angle B (FIG. 51), or a large angle C (FIG. 52.). The cable 114 can be arranged at an angle relative to the body prior to moving the cable clamp 510 to a secured position, which would then prevent movement of the cable 114 relative to the body 502.

Figure 59:
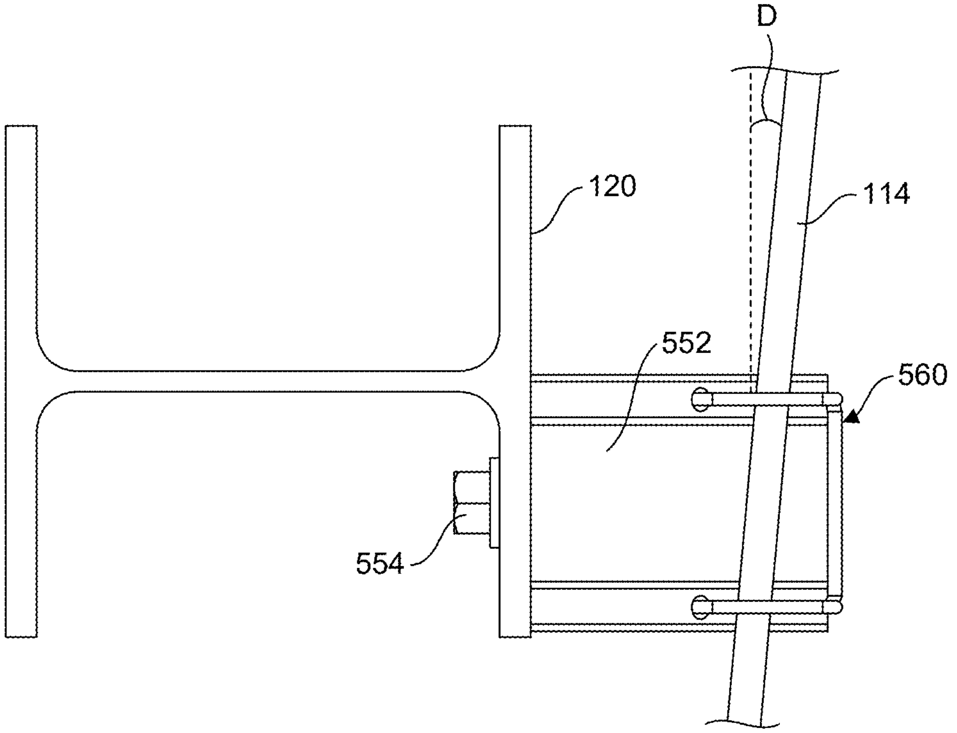
FIG. 59 is a top view of the extension member of FIG. 53.

As stated above, some aspects of extension members can include reducing the width of the body of the extension member depending on the application. Similarly, in some aspects, the length of a body of an extension member can be altered to be application dependent. FIGS. 53-59 illustrated an extension member 550 having a body 552 and a cable clamp 560. The extension member 550 is substantially similar to the extension member 500, such that like components will not be described in detail. The difference between the extension member 500 and the extension member 550 is that the body 552 is smaller in the length than the body 502. Due to the extruded design of the body 550, the body 550 can be cut to any required length. Additionally, the extension member 550 can be secured to a support structure 120 using a threaded bolt 554 (FIG. 56), and can also allow for positioning of the cable 114 at an angle D to prevent beds and kinks in the cable 114 (FIG. 59).

Figure 60:
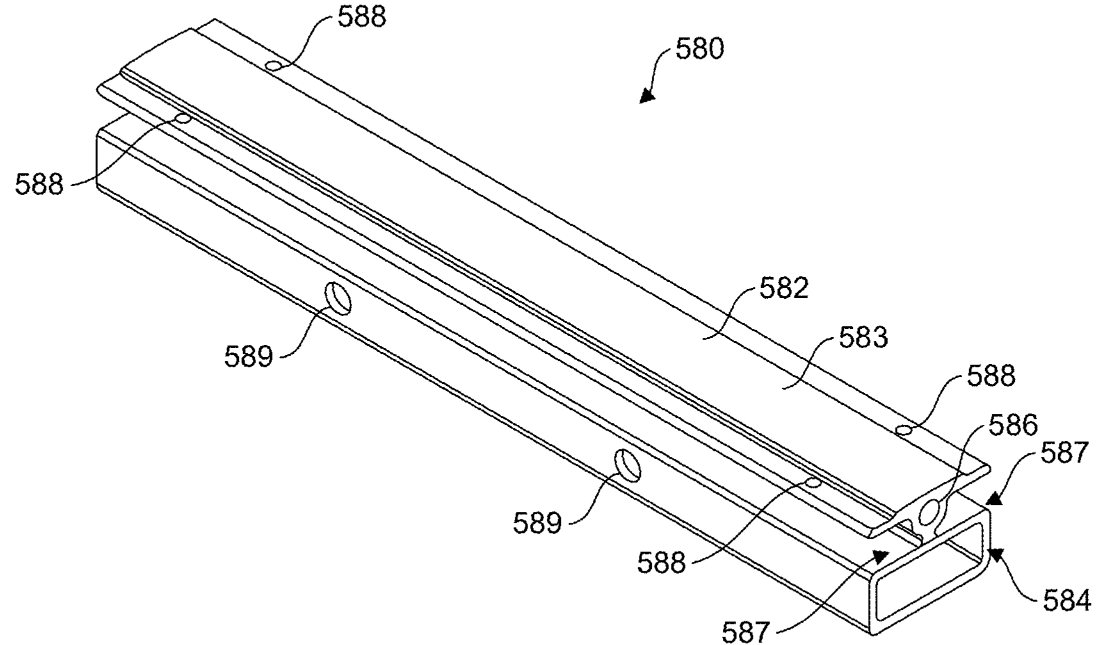
FIG. 60 is a perspective view of another aspect of an extension member.
Figure 61:
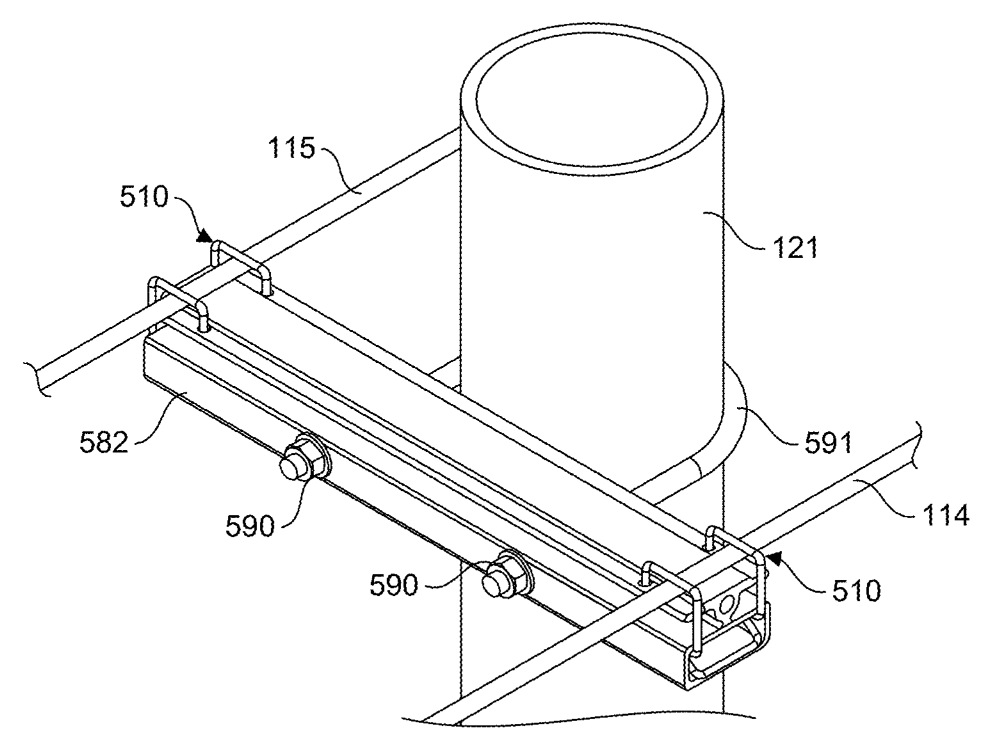
FIG. 61 is a perspective view of the extension member of FIG. 60 positioned on a support structure.
Figure 62:
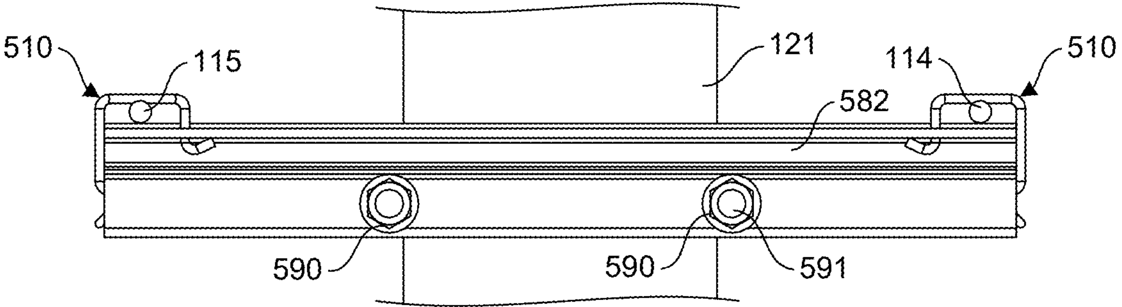
FIG. 62 is a front view of the extension member of FIG. 60 positioned on a support structure.
Figure 63:
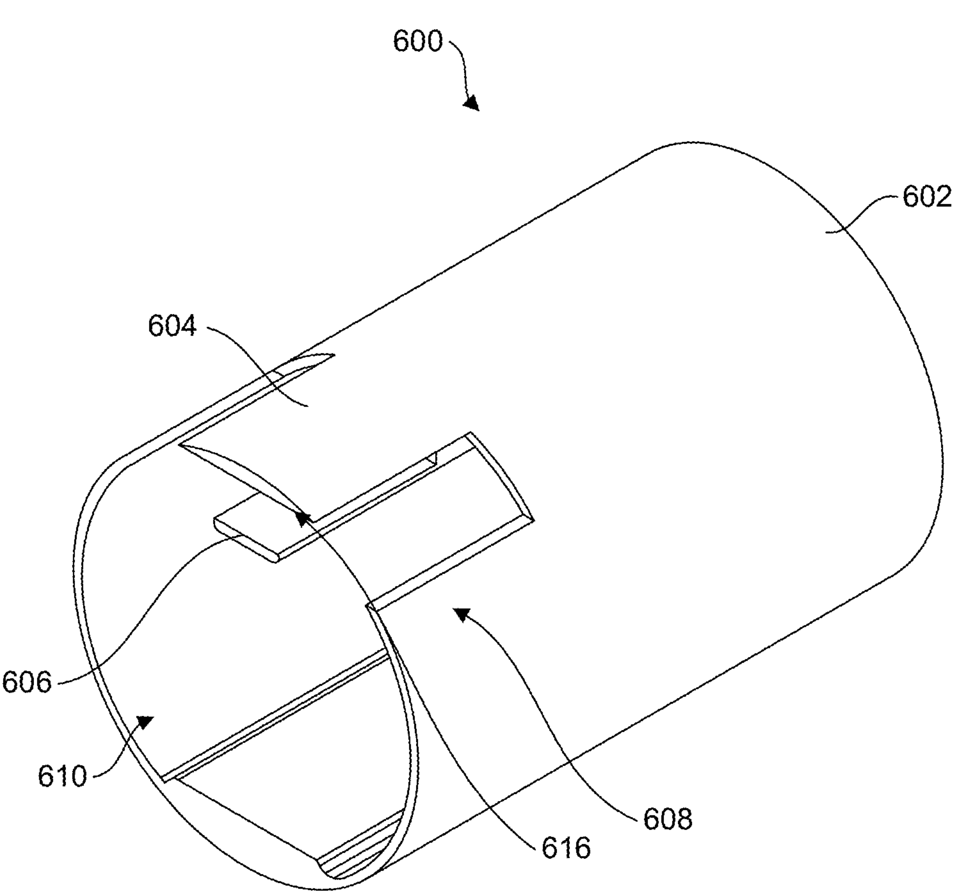
FIG. 63 is a perspective view of another aspect of an extension member.
Figure 64:
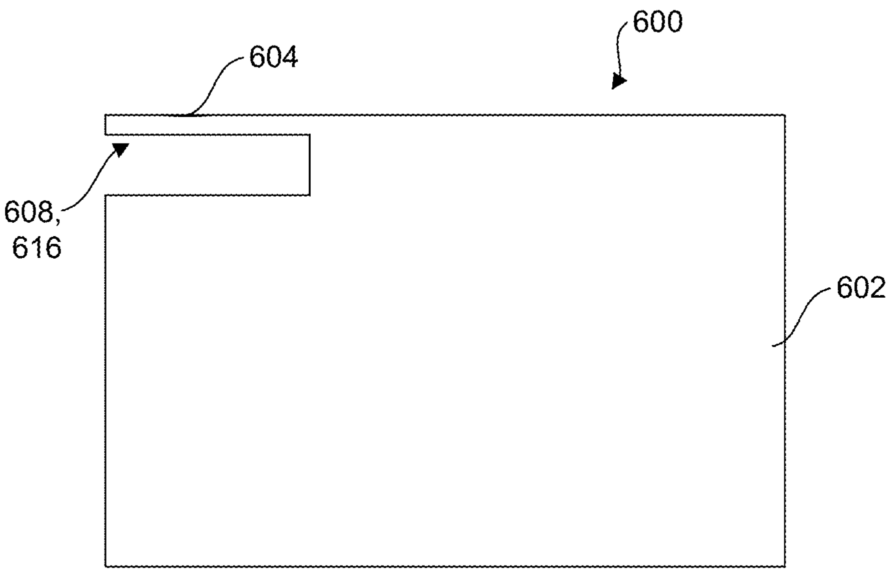
FIG. 64 is a side view of the extension member of FIG. 63.
Figure 65:
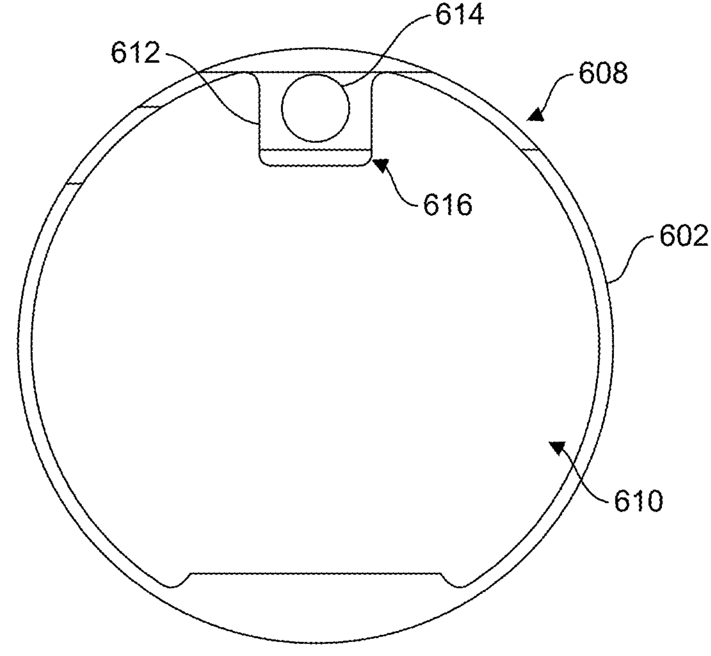
FIG. 65 is a rear view of the extension member of FIG. 63.

In addition to being secured to a support structure on a proximal or distal end, extension members can also be secured to a support structure along the body of the extension member. FIGS. 60-62 illustrate an aspect of an extension member 580. The extension member 580 is substantially similar to the extension member 500, such that like components will not be described in detail. The extension member 580 includes a body 582, curved surface 583, through-bores 584, 586, channels 587, apertures 588, and apertures 589. Unlike the extension member 500, the extension member 580 includes apertures 588 on both ends of the body 582, which allows for two cable clamps 510 to be arranged on the same body 582 (FIG. 61). The cable clamps 510 interact with the body 582 in a substantially similar manner as the extension member 500, in order to encompass cables 114, and 115. The apertures 589 are arranged on the body 582 between the proximal and distal end of the body 582. The apertures 589 are configured to allow a U-bolt 591 to pass therethrough in order to secure the body 582 to the support structure 121. Nuts 590 are positioned on the threaded ends of the U-bolt 591 to secure the body 582 to the U-bolt 591.

Figure 66:
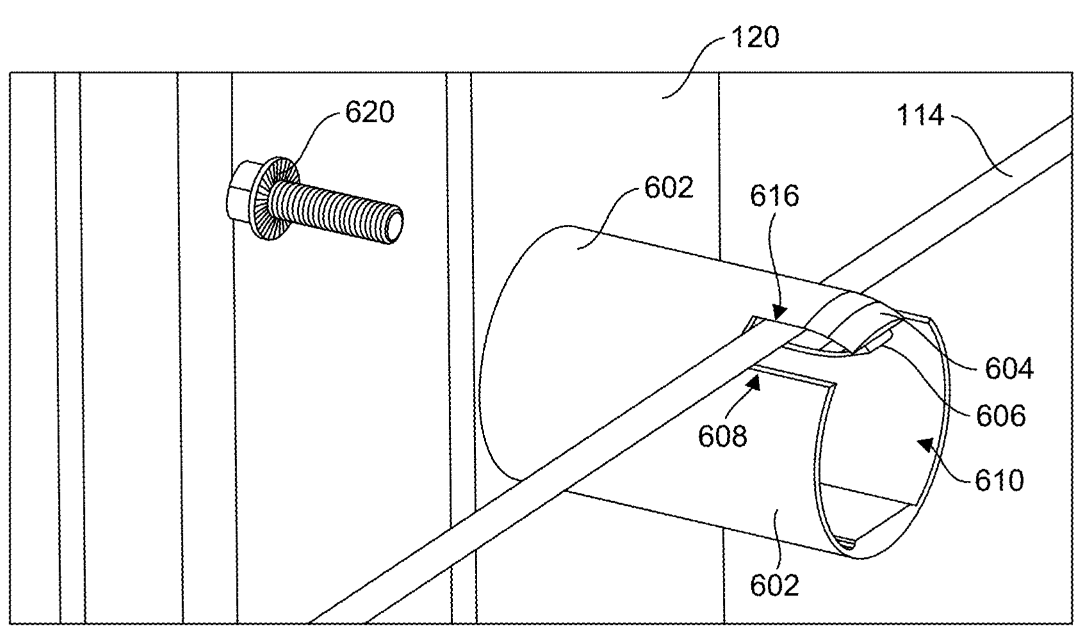
FIG. 66 is an exploded perspective view of the extension member of FIG. 63 positioned on a support structure.
Figure 67:
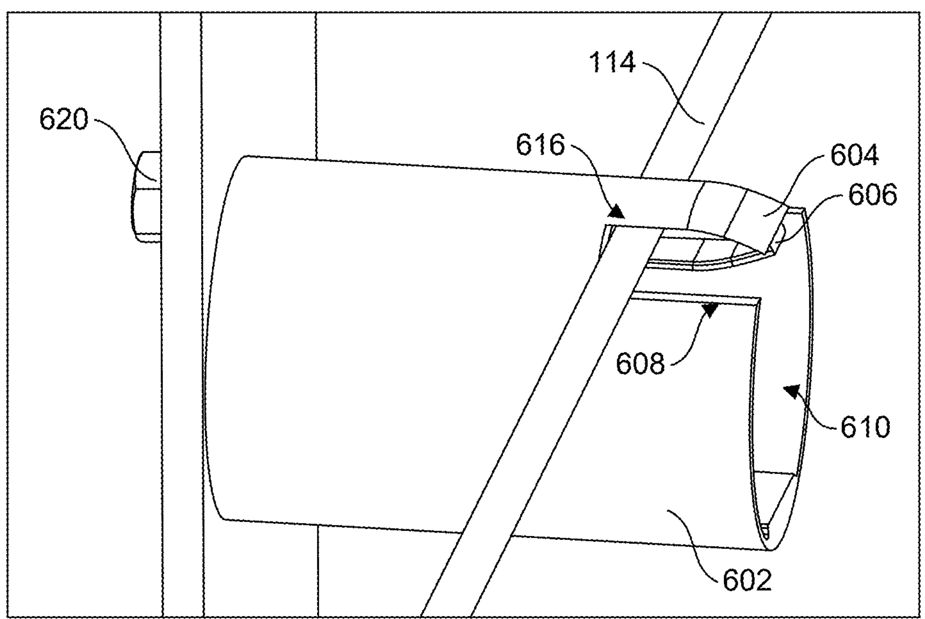
FIG. 67 is a perspective view of the extension member of FIG. 63 positioned on a support structure.
Figure 68:
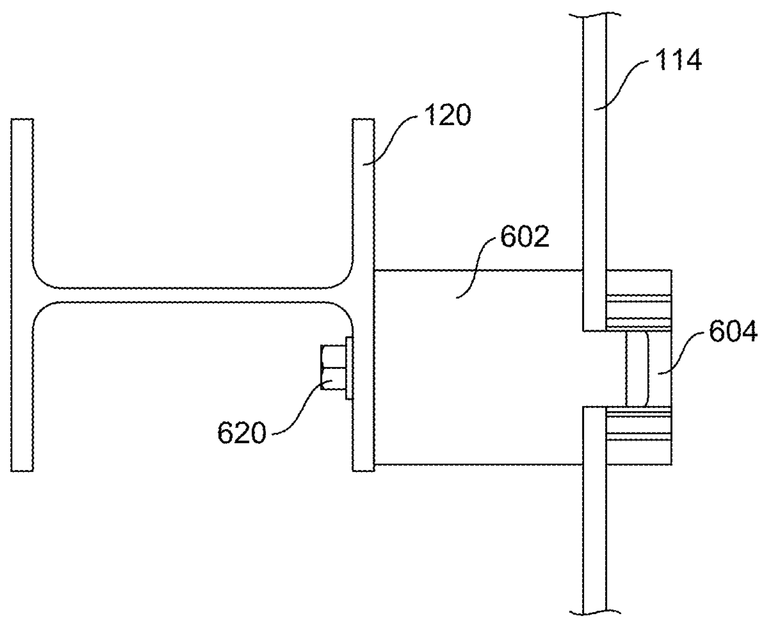
FIG. 68 is a top view of the extension member of FIG. 63 positioned on a support structure.

FIGS. 63-69 depict another aspect of an extension member 600. Similar to the extender members discussed above, the extender member 600 can be formed through an extrusion process, and can be cut to any required length depending on the application due to tis consistent cross-sectional area. The extension member 600 generally includes a body 602, a projection 604, a projection 606, a through-bore 610, and a spine 612. The projections 604, 606 are positioned on a distal end of the body 602, extending from the body 602, and form a channel 616 positioned therebetween. The channel 616 is configured to receive a cable 114, as shown in FIGS. 66-67. A corresponding channel 608 is arranged in the body 602 to allow the cable 114 access to the channel 616, where the channels 608 and 616 are horizontally aligned with one another.

Figure 69:
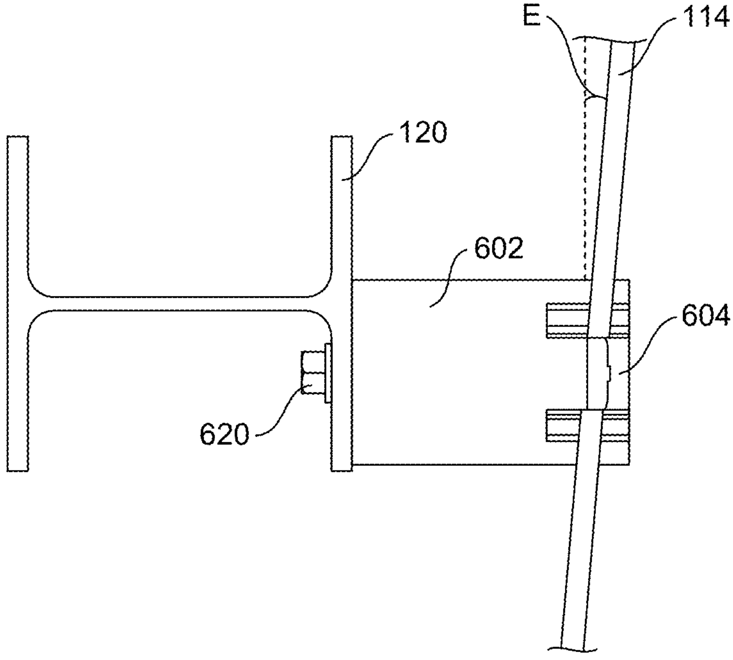
FIG. 69 is a top view of the extension member of FIG. 63 positioned on a support structure.
Figure 70:
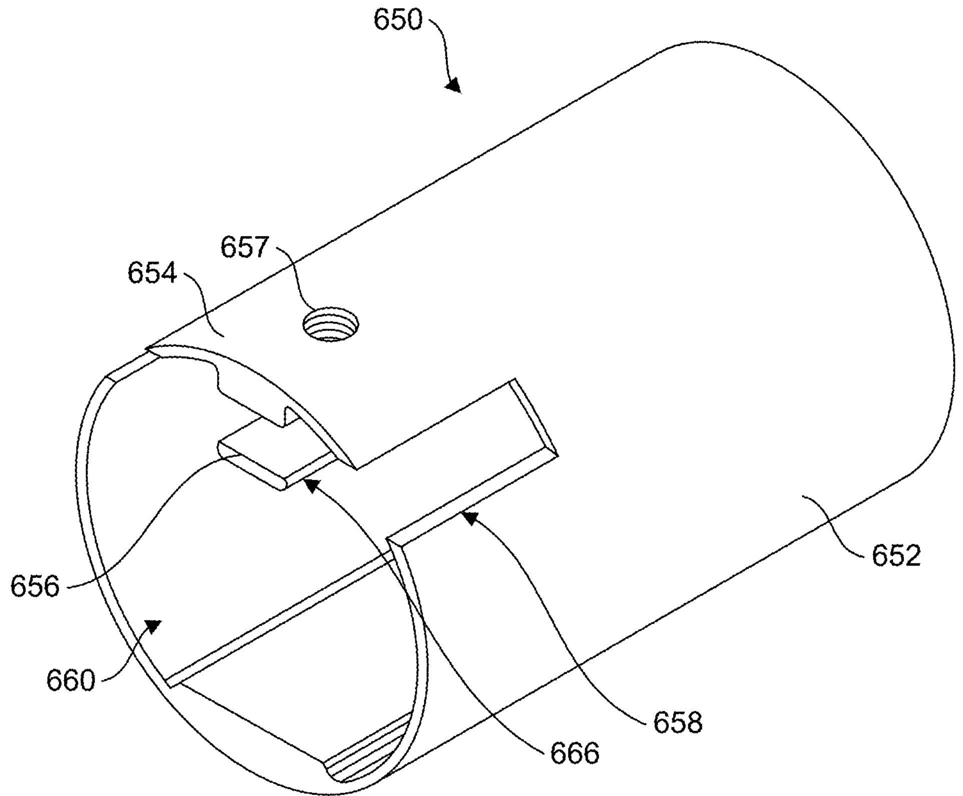
FIG. 70 is a perspective view of another aspect of an extension member.
Figure 71:
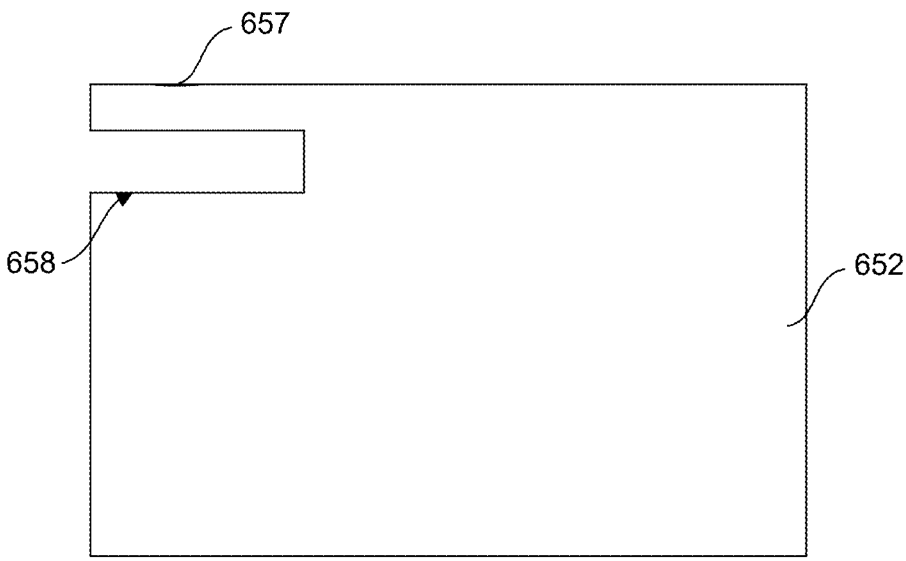
FIG. 71 is a side view of the extension member of FIG. 70.
Figure 72:
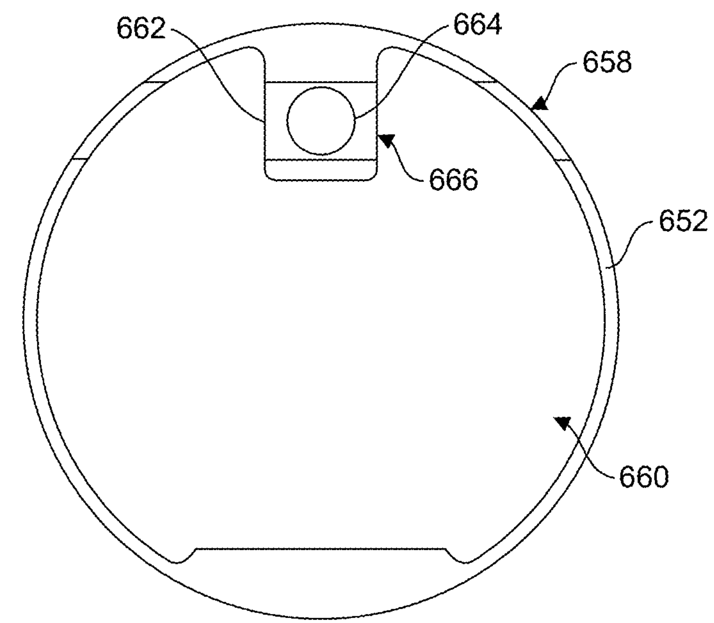
FIG. 72 is a rear view of the extension member of FIG. 70.
Figure 73:
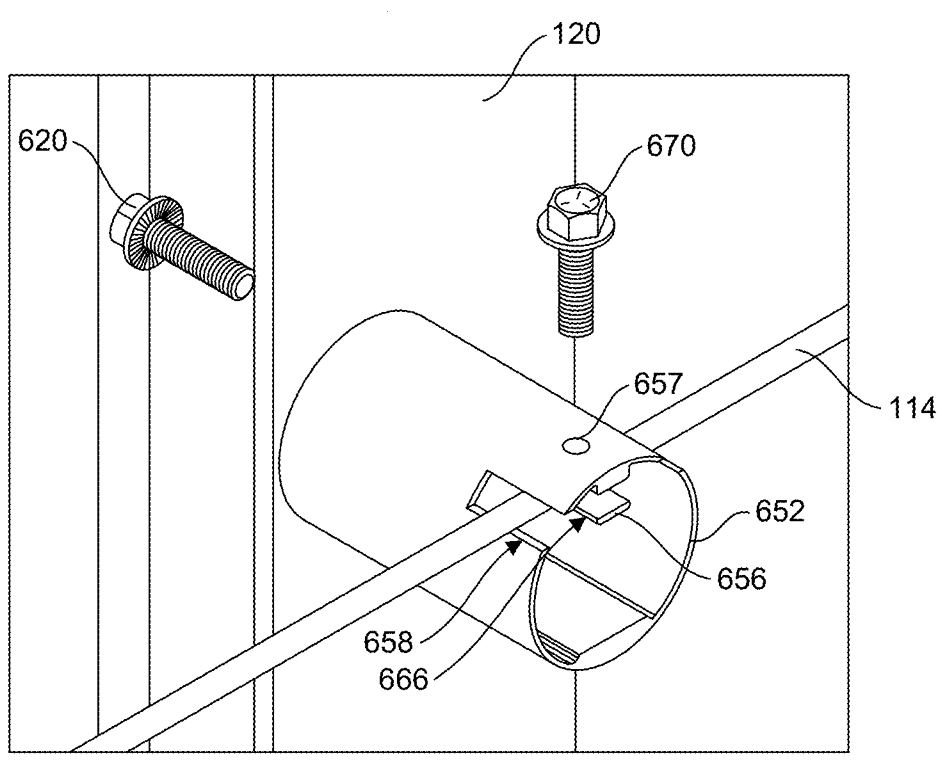
FIG. 73 is an exploded perspective view of the extension member of FIG. 70 positioned on a support structure.
Figure 74:
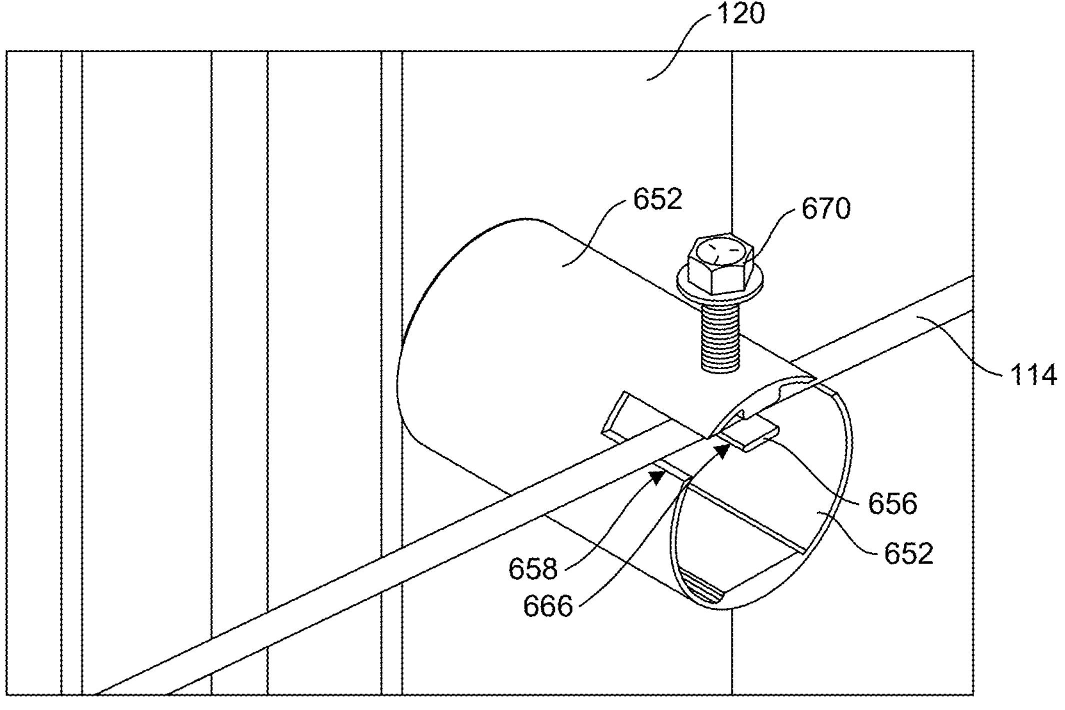
FIG. 74 is a perspective view of the extension member of FIG. 70 positioned on a support structure.
Figure 75:
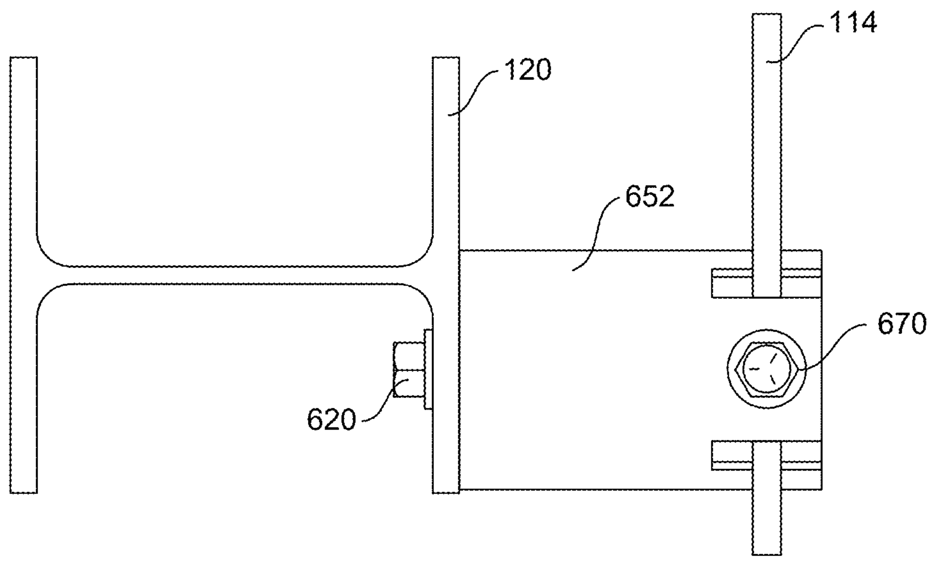
FIG. 75 is a top view of the extension member of FIG. 70 positioned on a support structure.

The spine 612 extends along the length of the body 602, and includes an aperture 614 that extends along the length of the spine 612. A portion of the aperture 614 can include a threaded inner surface for receiving a threaded bolt 620 for securing the extension member 600 to a support structure 120 (FIGS. 66-67). As illustrated in FIGS. 66-67, the projections 604, 606 can be deformed in order to encompass a cable 114 within the channel 616. A force can be applied to the projections 604, 606 in order to bring the ends of the projections 604, 606 to contact one another to prevent the cable 114 from passing therebetween. Similar to the extension members described above, the cable 114 can be perpendicularly aligned within the channel 616 (FIG. 68) or can be angled relative to the body 602 at an angle E (FIG. 69).

Figure 76:
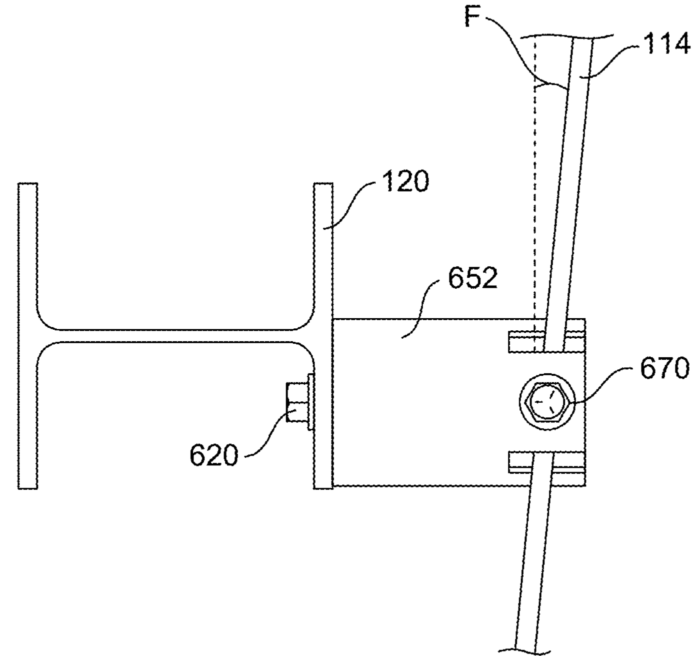
FIG. 76 is a top view of the extension member of FIG. 70 positioned on a support structure.
Figure 77:
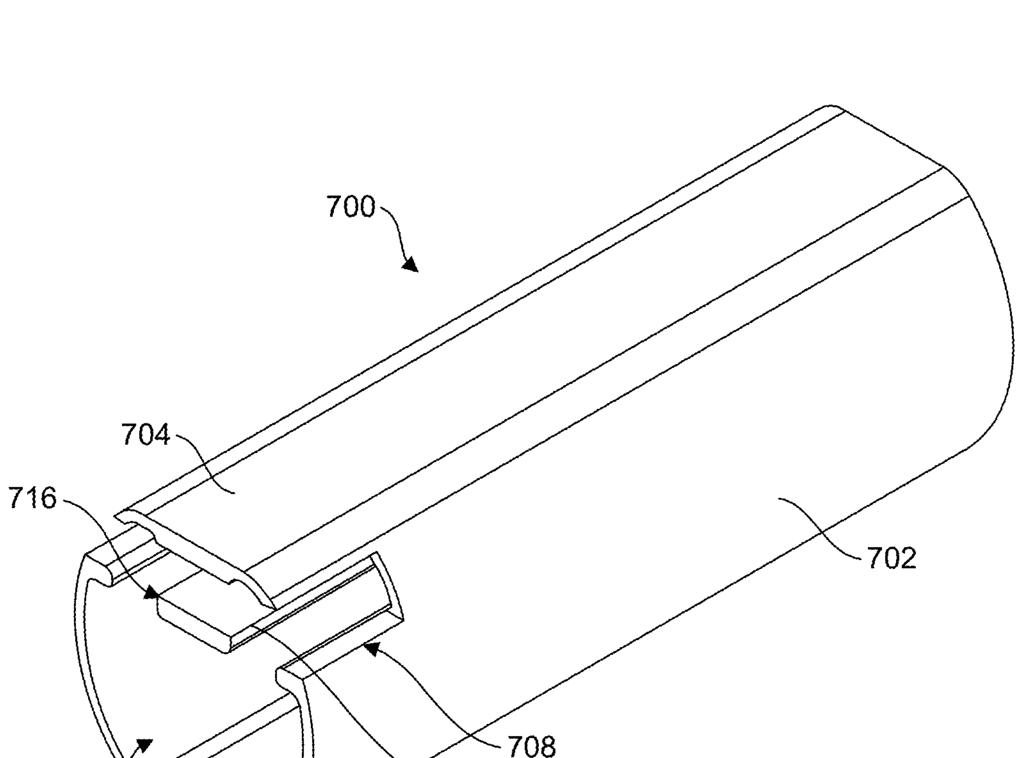
FIG. 77 is a perspective view of another aspect of an extension member.
Figure 78:
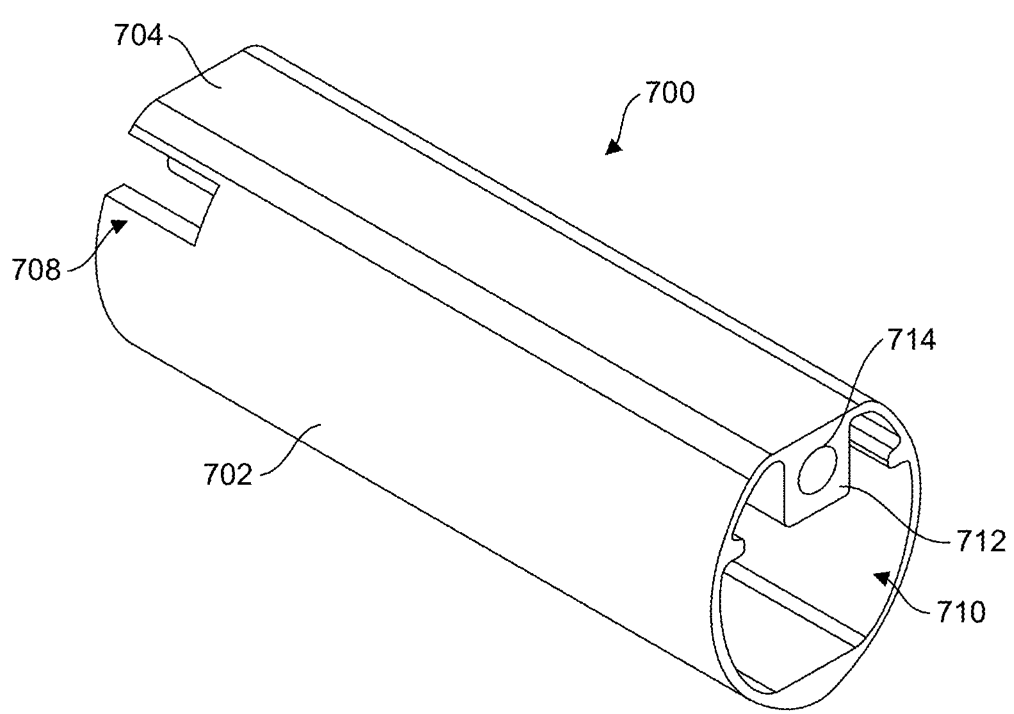
FIG. 78 is a side view of the extension member of FIG. 77.
Figure 79:
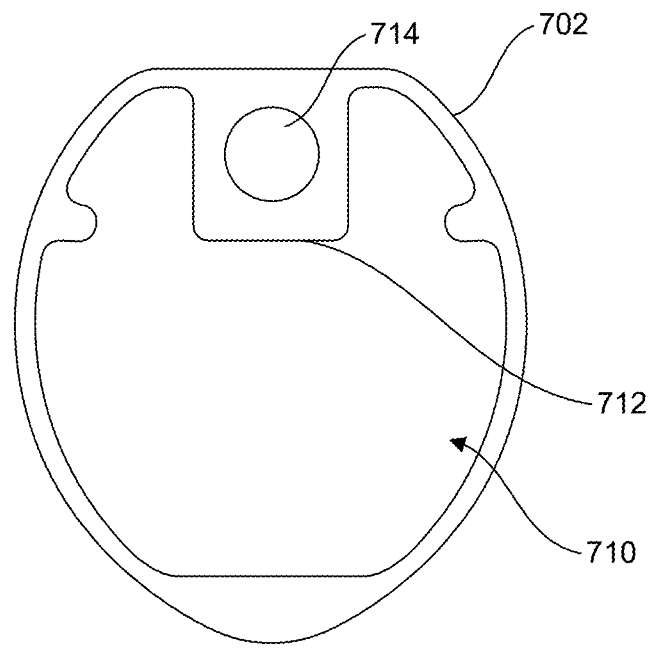
FIG. 79 is a rear view of the extension member of FIG. 77.
Figure 80:
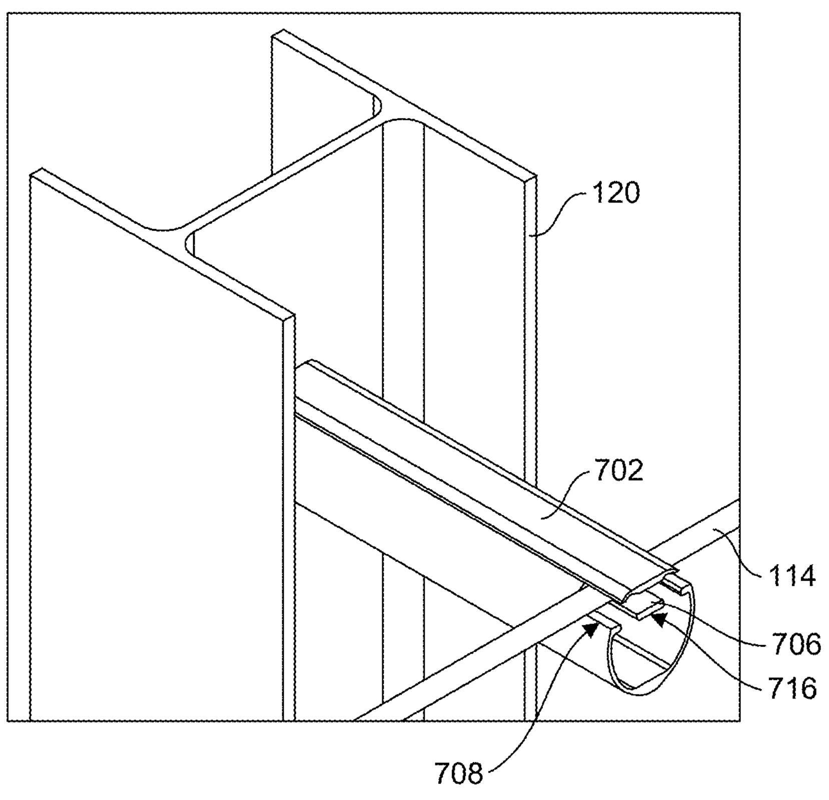
FIG. 80 is a perspective view of the extension member of FIG. 77 positioned on a support structure in a non-deformed position.
Figure 81:
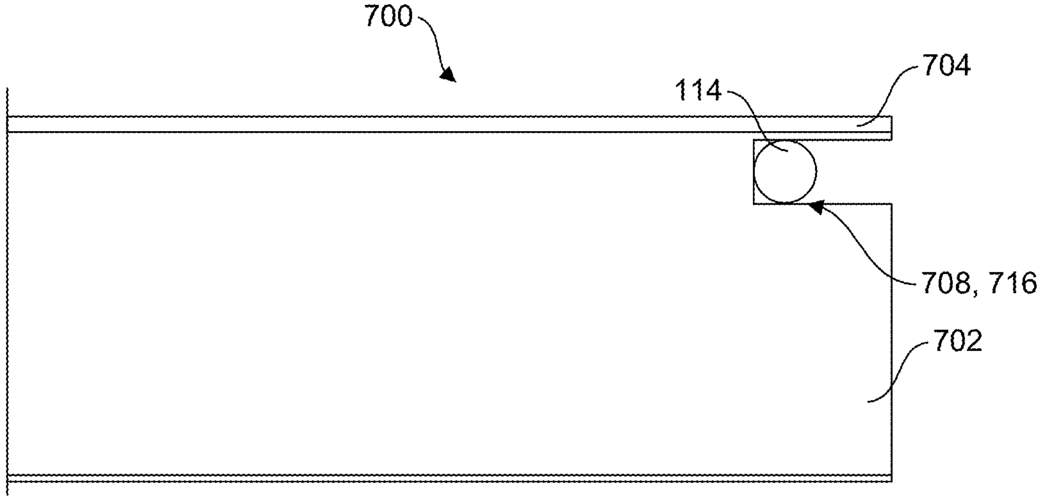
FIG. 81 is a side view of the extension member of FIG. 77 positioned on a support structure in a non-deformed position.

FIGS. 70-76 depict another aspect of an extension member 650. The extension member 650 is substantially similar to the extension member 600, and contains like components such that similar components will not be described in detail. The extension member 650 generally includes a body 652, a projection 654, a projection 656, a channel 658, a through-bore 660, a spine 662, an aperture 664, and a channel 666. A threaded hole 657 is arranged on the projection 654 and passes through the body 652. A threaded bolt 670 is received within the threaded hole 657, and can be tightened down in order to contact and secure a cable 114 within the channel 666. The bolt 670 can be tightened down after the cable 114 has been arranged within the channel 666, where the cable can be perpendicular to the body 652 (FIG. 75), or at an angle F relative to the body 652 (FIG. 76).

FIGS. 77-87 depict another aspect of an extension member 700. The extension member 700 is substantially similar to the extension member 600, and contains like components such that similar components will not be described in detail. The extension member 700 generally includes a body 702, a projection 704, a projection 706, a through-bore 710, and a spine 712. The projections 704, 706 are positioned on a distal end of the body 702, extending from the body 702, and form a channel 716 positioned therebetween. The channel 716 is configured to receive a cable 114, as shown in FIGS. 80-87. A corresponding channel 708 is arranged in the body 702 to allow the cable 114 access to the channel 716, where the channels 708 and 716 are horizontally aligned with one another.

Figure 82:
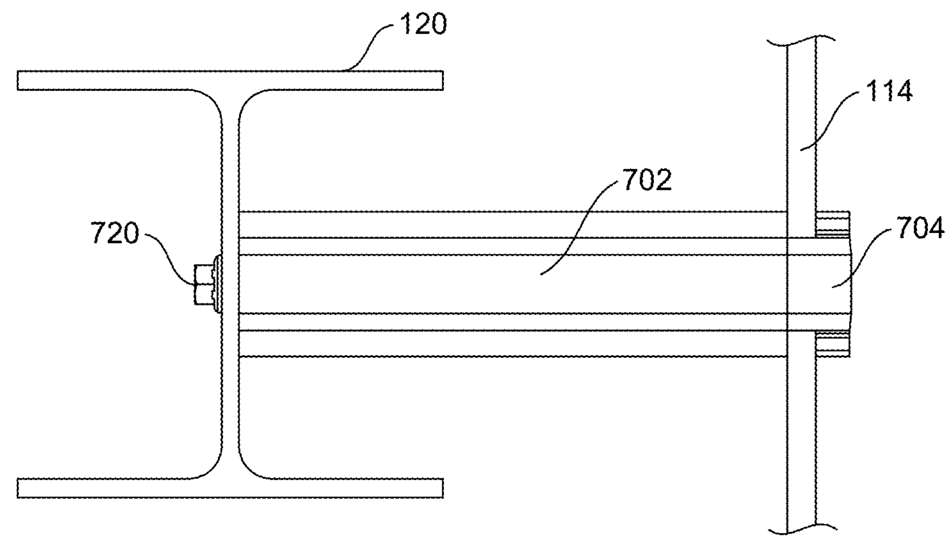
FIG. 82 is a top view of the extension member of FIG. 77 positioned on a support structure in a non-deformed position.
Figure 83:
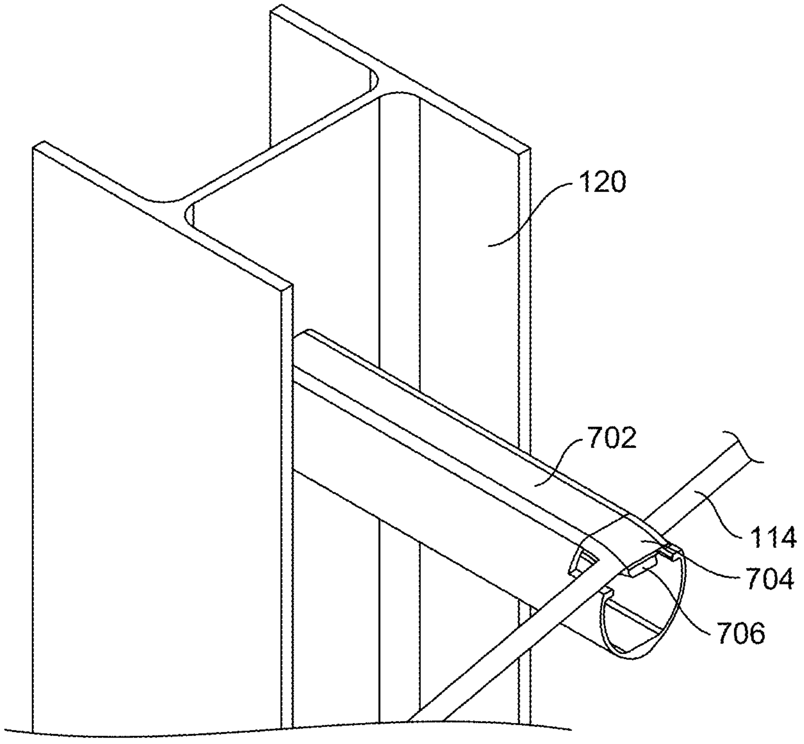
FIG. 83 is a perspective view of the extension member of FIG. 77 positioned on a support structure in a deformed position.
Figure 84:
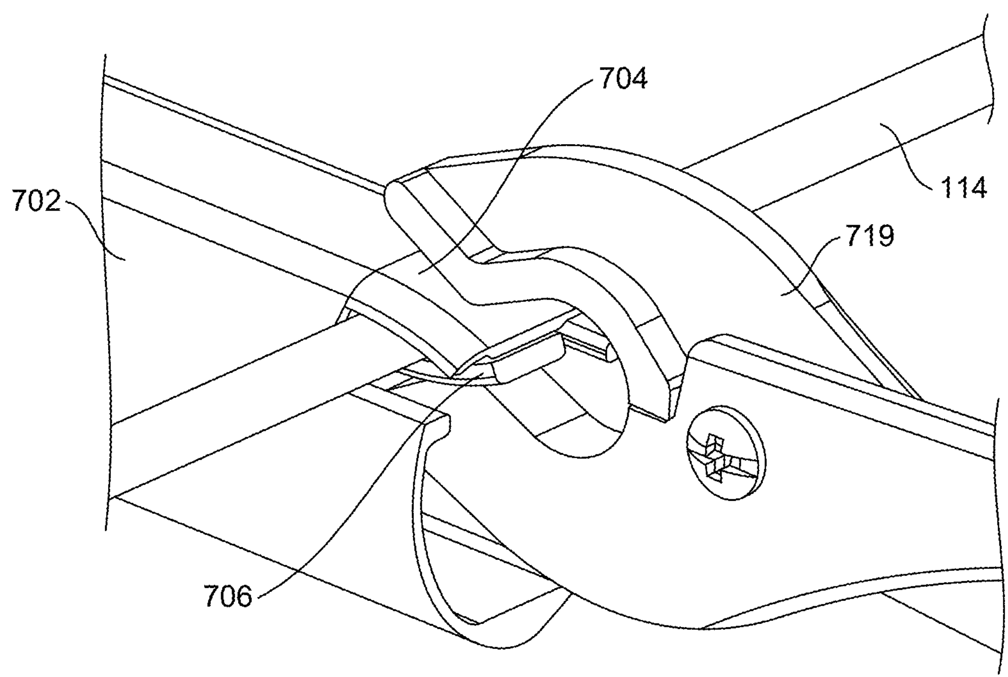
FIG. 84 is a detailed perspective view of the extension member of FIG. 77 in a non-deformed position.
Figure 85:
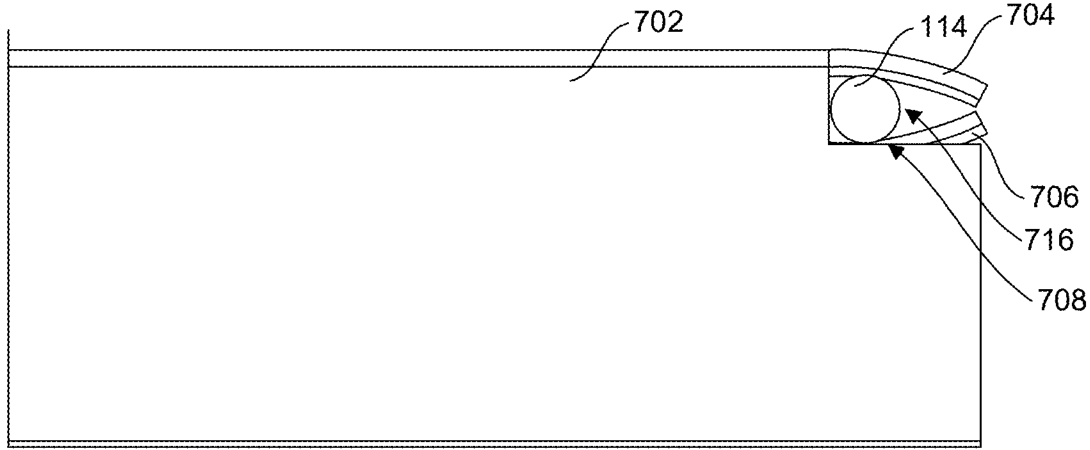
FIG. 85 is a side view of the extension member of FIG. 77 positioned on a support structure in a deformed position.
Figure 86:
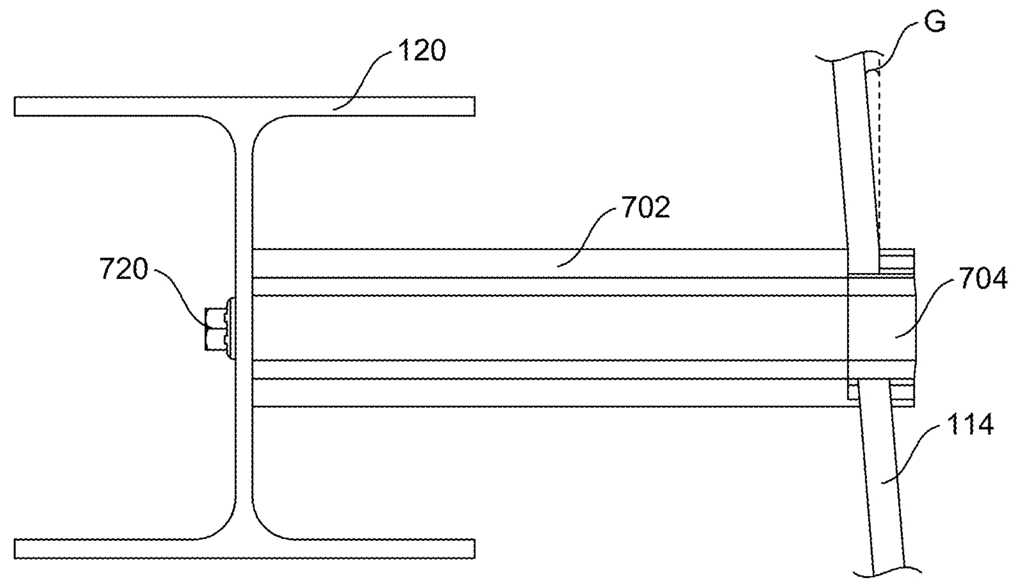
FIG. 86 is a top view of the extension member of FIG. 77 positioned on a support structure.
Figure 87:
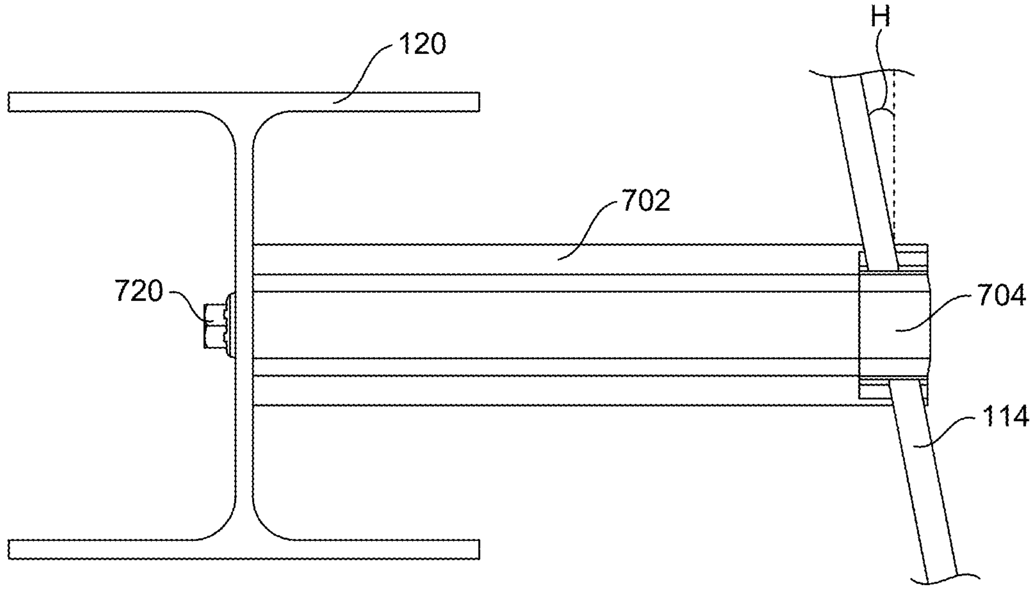
FIG. 87 is a top view of the extension member of FIG. 77 positioned on a support structure.

The spine 712 extends along the length of the body 702, and includes an aperture 614 that extends along the length of the spine 712. A portion of the aperture 714 can include a threaded inner surface for receiving a threaded bolt 720 for securing the extension member 700 to a support structure 120 (FIG. 82). As illustrated in FIGS. 83-85, the projections 804, 806 can be deformed using a tool 719 in order to encompass a cable 114 within the channel 716. A force can be applied to the projections 704, 706 by the tool 719 in order to bring the ends of the projections 704, 706 to contact one another to prevent the cable 114 from passing therebetween. Similar to the extension members described above, the cable 114 can be angled relative to the body 702 at a small angle G (FIG. 86) or can be angled relative to the body 702 at a large angle H (FIG. 87).

Figure 88:
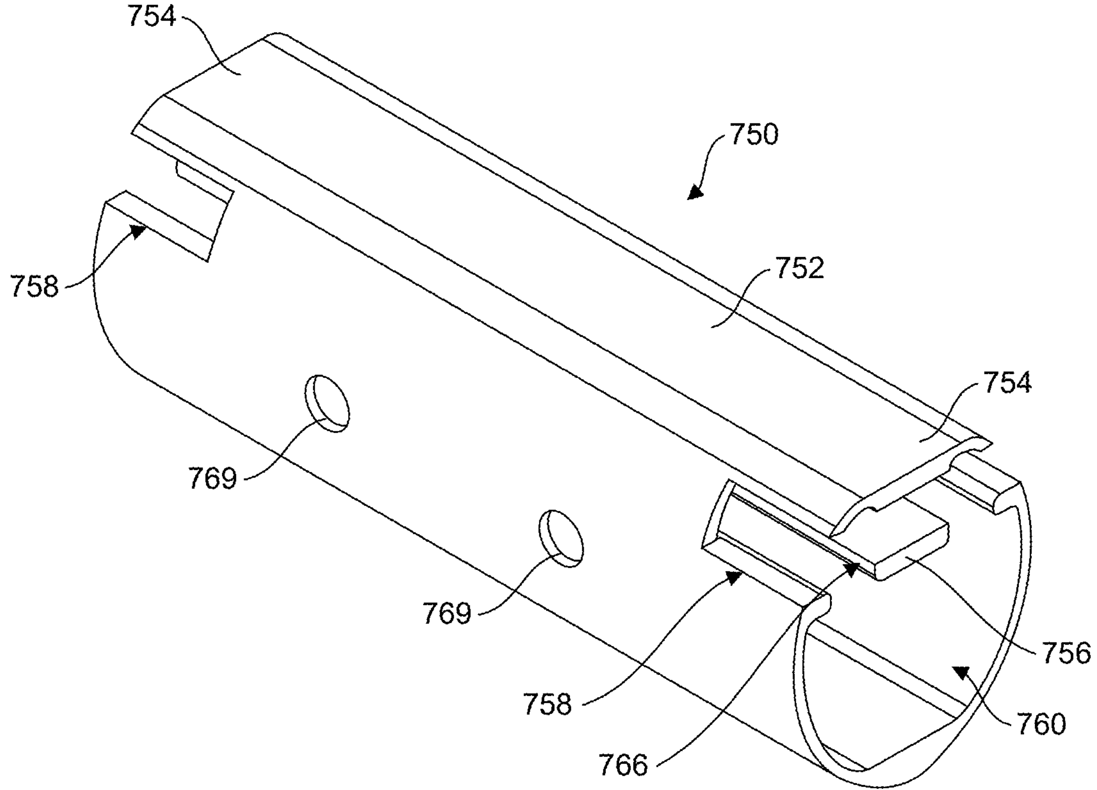
FIG. 88 is a perspective view of another aspect of an extension member.
Figure 89:
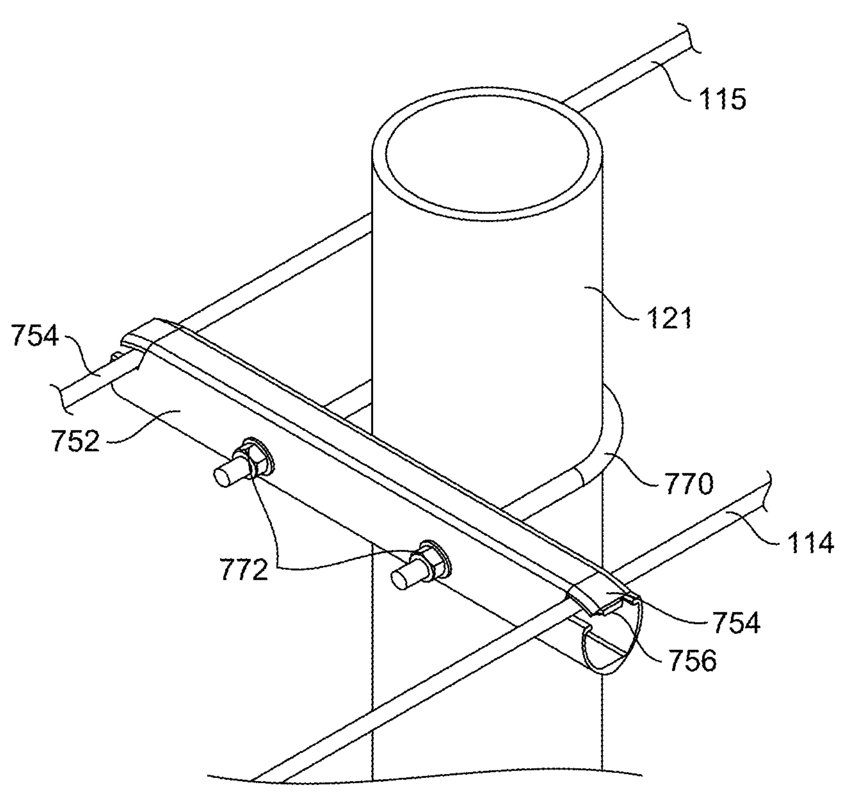
FIG. 89 is a perspective view of the extension member of FIG. 88 positioned on a support structure.
Figure 90:
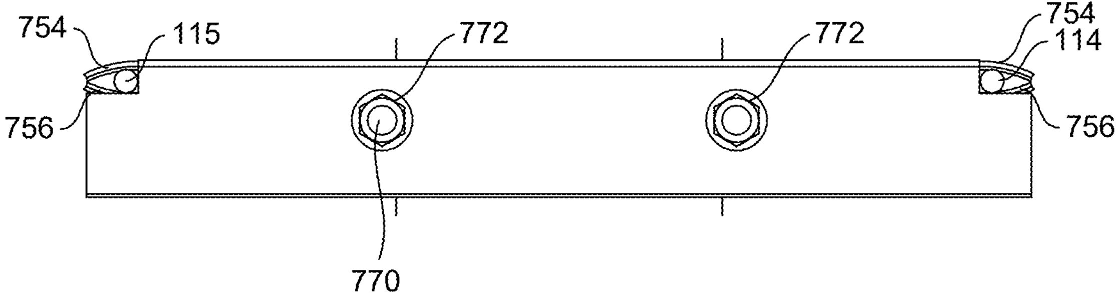
FIG. 90 is a front view of the extension member of FIG. 88 positioned on a support structure.
Figure 91:
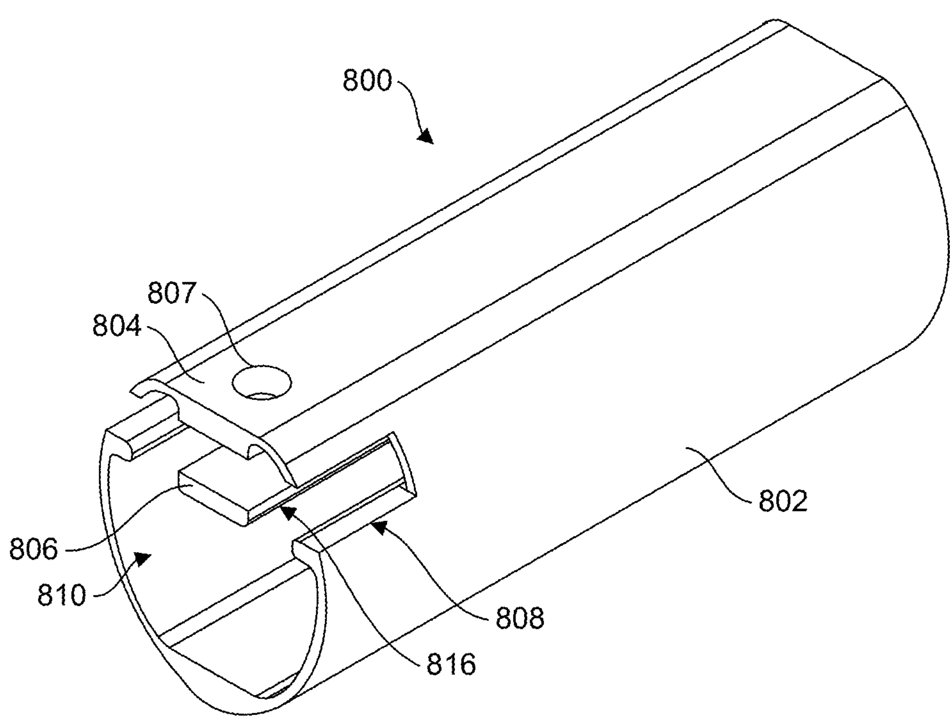
FIG. 91 is a front perspective view of another aspect of an extension member.
Figure 92:
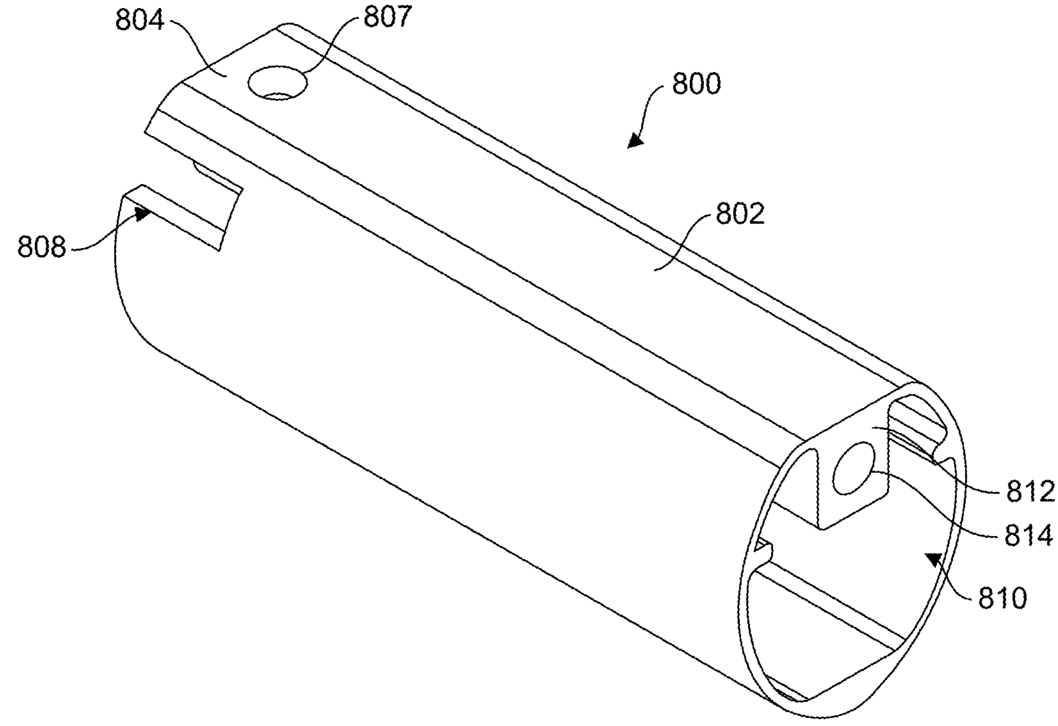
FIG. 92 is a rear perspective view of the extension member of FIG. 91.
Figure 93:
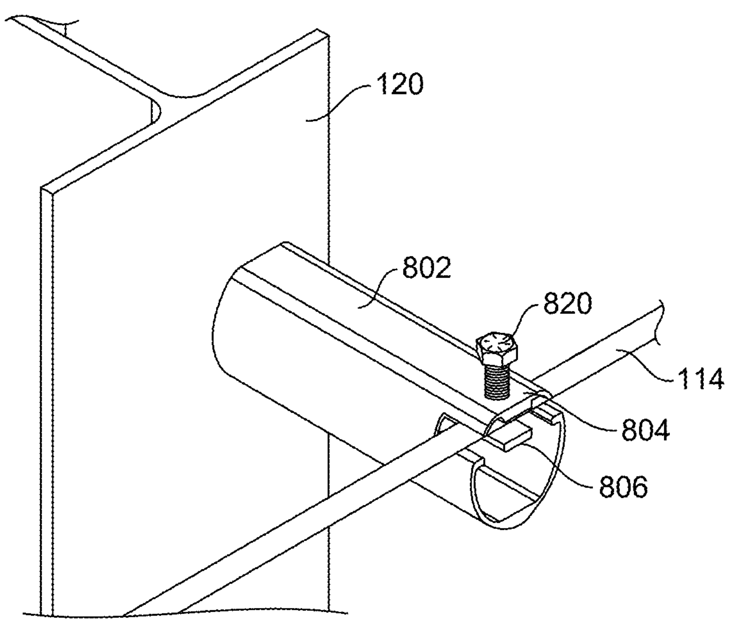
FIG. 93 is a perspective view of the extension member of FIG. 91 positioned on a support structure.

FIGS. 88-90 illustrate an aspect of an extension member 750. The extension member 750 is substantially similar to the extension member 700, and contains like components such that similar components will not be described in detail. The extension member 750 generally includes a body 752, projections 754, projections 756, channels 758, a through-bore 760, and channels 766. Unlike the extension member 700, the extension member 750 includes projections 754, 756, and channels 758, 766 on both ends of the body 752, which allows for two cables 114, 115 to be arranged on the same body 752 (FIG. 89) by deforming the projections 754, 756. The projections 754, 756 interact with the body 752 in a substantially similar manner as the extension member 700, in order to encompass cables 114, and 115. The apertures 769 are arranged on the body 752 between the proximal and distal end of the body 752. The apertures 769 are configured to allow a U-bolt 770 to pass therethrough in order to secure the body 752 to the support structure 121. Nuts 772 are positioned on the threaded ends of the U-bolt 770 to secure the body 752 to the U-bolt 770.

Figure 94:
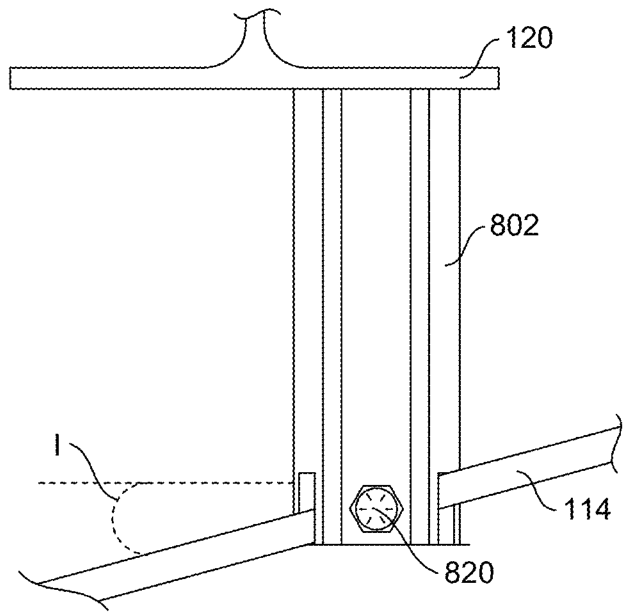
FIG. 94 is a top view of the extension member of FIG. 91 positioned on a support structure.
Figure 95:
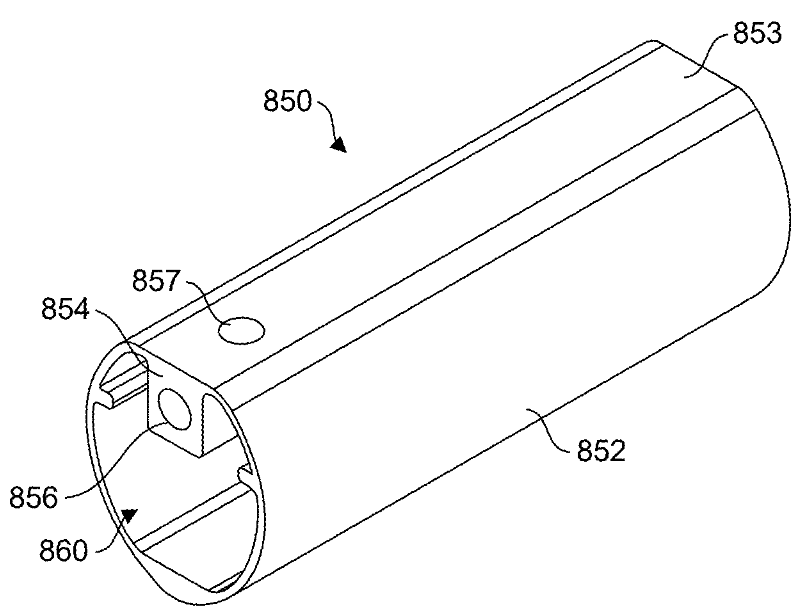
FIG. 95 is a front perspective view of another aspect of an extension member.
Figure 96:
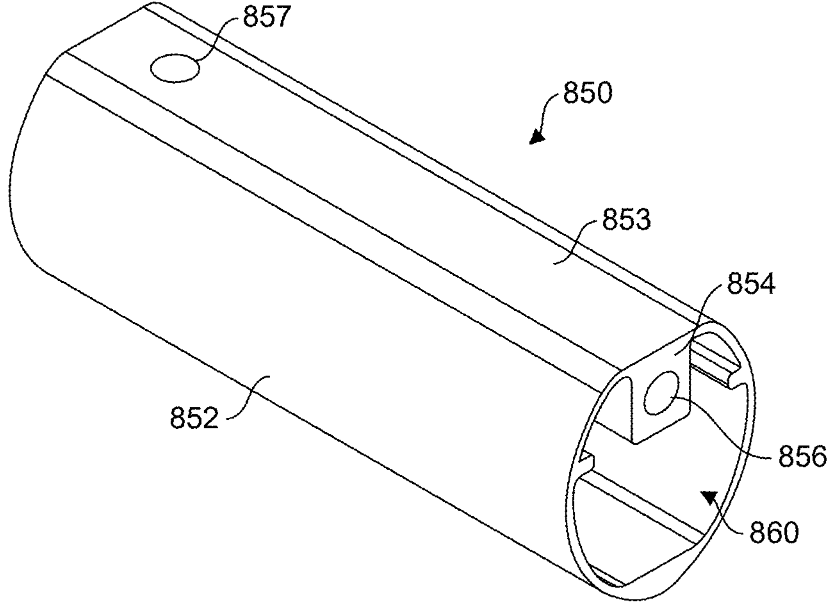
FIG. 96 is a rear perspective view of the extension member of FIG. 95.
Figure 97:
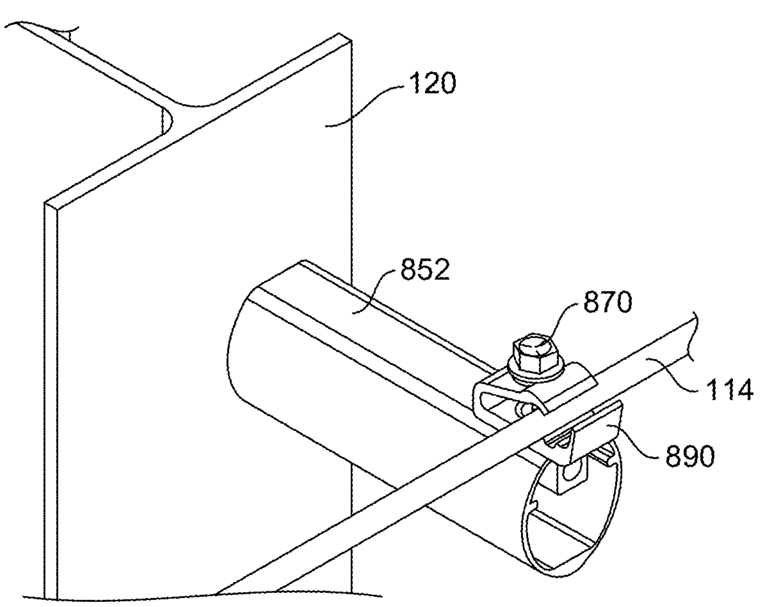
FIG. 97 is a perspective view of the extension member of FIG. 95 positioned on a support structure.

FIGS. 91-94 depict another aspect of an extension member 800. The extension member 800 is substantially similar to the extension member 650, and contains like components such that similar components will not be described in detail. The extension member 800 generally includes a body 802, a projection 804, a projection 806, a channel 808, a through-bore 810, a spine 812, an aperture 814, and a channel 816. A threaded hole 807 is arranged on the projection 804 and passes through the body 802. A threaded bolt 820 is received within the threaded hole 807, and can be tightened down in order to contact and secure a cable 114 within the channel 816. The bolt 820 can be tightened down after the cable 114 has been arranged within the channel 816, where the cable 114 can be perpendicular to the body 802, or at an angle I relative to the body 802 (FIG. 94).

Figure 98:
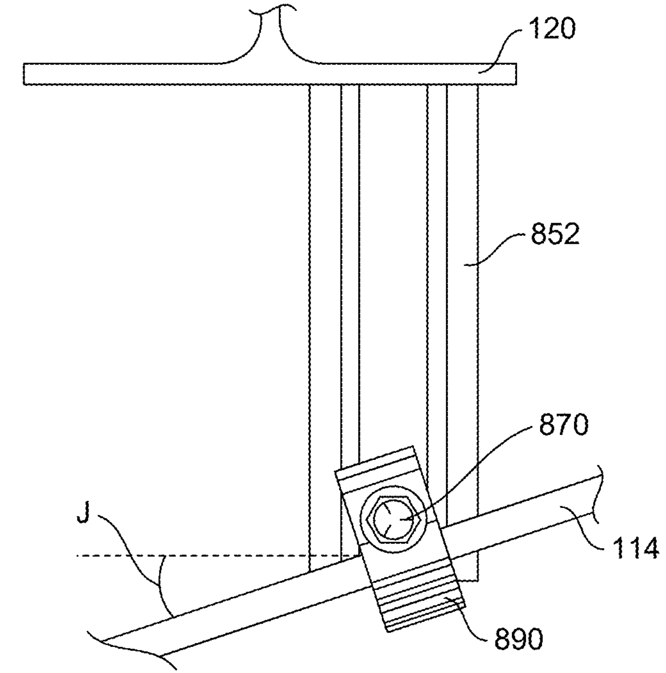
FIG. 98 is a top view of the extension member of FIG. 95 positioned on a support structure.

FIGS. 95-98 depict another aspect of an extension member 850. The extension member 850 is substantially similar to the extension member 650, and contains like components such that similar components will not be described in detail. The extension member 850 generally includes a body 852, a spine 854, an aperture 856, and a through-bore 860. A threaded hole 857 is arranged on the body 852 and passes through the body 852. A threaded bolt 870 is received within the threaded hole 857, and can be tightened down in order to secure a cable clamp 890 to the body 852. The bolt 870 can be tightened down after the cable 114 has been arranged within the cable clamp 890, where the tightening of the bolt 870 tightens the arms of the cable clamp 890 onto the cable 114. Additionally, the cable clamp 890 can rotate relative to the body 852 in order to prevent kinks or bends in the cable 114, such as being positioned at an angle J relative to the body 852 (FIG. 98).

Figure 99:
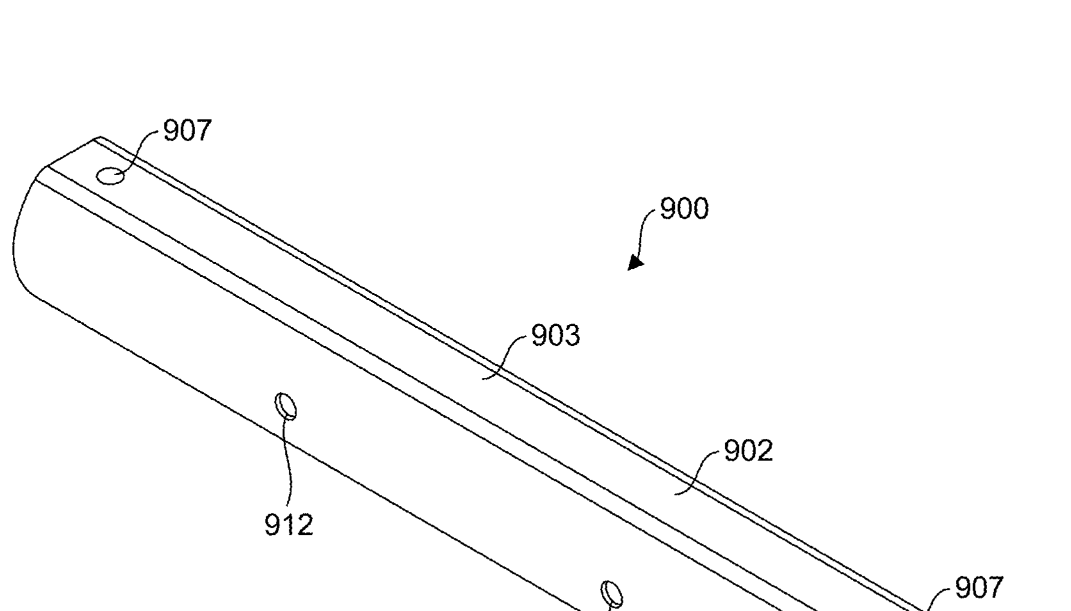
FIG. 99 is a perspective view of another aspect of an extension member.

FIG. 99 depicts an aspect of an extension member 900. The extension member 900 is substantially similar to the extension member 850, and contains like components such that similar components will not be described in detail. The extension member 900 generally includes a body 902, a spine 904, an aperture 906, and a through-bore 910. Unlike the extension member 850, the extension member 900 includes threaded holes 907 positioned on both ends of the body 902, which allows for two cables clamps 890 to be arranged on the same body 752 (not shown) The apertures 912 are arranged on the body 902 between the proximal and distal end of the body 902. The apertures 912 are configured to allow a U-bolt (not shown) to pass therethrough in order to secure the body 902 to the support structure.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An extension member, comprising:
- a body extending between a proximal portion and a distal portion;
- a fastener body positioned at the proximal portion of the body and configured to couple the body to a support structure;
- a first aperture positioned on the distal portion; and
- a cable clamp positioned on the distal portion, wherein the cable clamp comprises:
  - a channel configured to selectively receive a cable;
  - a second aperture positioned adjacent the channel, wherein the first aperture and the second aperture are configured to receive a fastener configured to couple the cable clamp to the body; and
  - at least one projection, wherein the fastener is configured to deform the projection to selectively secure the cable within the channel.

2. The extension member of claim 1, wherein the cable clamp is configured to allow the cable to be rigidly coupled within the channel at a plurality of angles relative to the width of the body within a horizontal plane parallel to the body.

3. The extension member of claim 1, wherein the fastener body is a projection extending from the proximal portion of the body and positioned within an aperture of the support structure.

4. The extension member of claim 1, wherein the fastener body is an aperture extending into the proximal portion of the body and configured to receive a fastener body extending from the support structure.

5. The extension member of claim 1, further comprising at least one mounting aperture positioned on the body between the distal portion and the proximal portion.

6. The extension member of claim 1, wherein the body is formed from the same material as the cable arranged within the channel.

7. The extension member of claim 1, wherein the projection is configured to at least partially encompass the cable within the channel.

8. The extension member of claim 7, wherein the cable is configured to move relative to the cable clamp while positioned within the channel.

9. The extension member of claim 1, wherein the cable clamp is integral with the body.

10. The extension member of claim 1, wherein the cable clamp is selectively removable from the body.

11. The extension member of claim 1, wherein the body includes a curved surface configured to abut against the cable positioned within the channel.

12. The extension member of claim 1, wherein the fastener comprises a setscrew, and wherein the apertures include internally threaded holes configured to receive the setscrew.

13. A method, comprising:
- positioning a body on a support structure via a fastener body arranged on the support structure or on a proximal portion of the body;
- positioning a cable clamp on a distal portion of the body, wherein the distal portion includes a first aperture and the cable clamp includes a second aperture, wherein the first aperture and the second aperture are configured to receive a fastener configured to couple to the cable clamp to the body;
- positioning a cable within a channel formed in the cable clamp; and
- deforming, using the fastener, a projection of the cable clamp such that the cable is at least partially encompassed by the projection within the channel, thereby securing the cable within the channel.

14. The method of claim 13, wherein deforming of the projection further comprises:
- deforming the projection to an installation position such that the gap is reduced to a value smaller than the diameter of the cable positioned within the channel, wherein the cable is configured to move relative to the body; and
- deforming the projection to a locked position, wherein the projection contacts the cable.

15. The method of claim 13, further comprising moving the cable relative to the body after securing of the cable within the channel.

16. The method of claim 13, further comprising reducing the length of the body.

17. The method of claim 16, wherein reducing the length of the body includes removing a portion of the body.

18. An extension member, comprising:

a body having a distal portion, a proximal portion, and an aperture extending therebetween along at least a portion of the body;

an internally threaded hole positioned on the proximal portion of the body and configured to receive a threaded body extending from a support structure;

a first aperture positioned on the distal portion of the body and configured to receive a fastener;

a channel positioned on the distal portion of the body and configured to receive a cable therein; and at least one projection extending from the distal portion of the body, the fastener configured to deform the projection to at least partially encompass the cable within the channel.

19. The extension member of claim 18, further comprising at least one mounting aperture positioned on the body between the distal portion and the proximal portion.

20. The extension member of claim 18, wherein the cable is configured to be rigidly coupled within the channel at a plurality of angles relative to the width of the body within a horizontal plane parallel to the body.

21. An extension member, comprising:

a body extending between a proximal portion and a distal portion;

at least one mounting aperture positioned on the body between the distal portion and the proximal portion, the mounting aperture configured to receive a projection extending from a support structure to secure the body to the support structure;

a first distal aperture positioned on the distal portion;

a first proximal aperture positioned on the proximal portion;

a first cable clamp positioned on the distal portion, wherein the first cable clamp comprises:

a first channel configured to selectively receive a first cable;

a second distal aperture positioned adjacent the first channel, wherein the first distal aperture and the second distal aperture are configured to receive a first fastener configured to couple the first cable clamp to the body; and at least one distal projection, wherein the first fastener is configured to deform the distal projection to selectively secure the first cable within the first channel;

a second cable clamp positioned on the proximal portion of the body, wherein the second cable clamp comprises:

a second channel configured to selectively receive a second cable;

a second proximal aperture positioned adjacent the second channel, wherein the first proximal aperture and the second proximal aperture are configured to receive a second fastener configured to couple the second cable clamp to the body; and at least one proximal projection, wherein the second fastener is configured to deform the proximal projection to selectively secure the second cable within the second channel.

22. The extension member of claim 21, wherein each of the first fastener and the second fastener comprises a set-screw, and wherein the first distal aperture, second distal aperture, first proximal aperture, and second proximal aperture include internally threaded holes.

* * * * *